US010167633B2

(12) United States Patent
Foderberg et al.

(10) Patent No.: US 10,167,633 B2
(45) Date of Patent: Jan. 1, 2019

(54) TIE SYSTEM FOR INSULATED CONCRETE PANELS

(71) Applicant: IconX, LLC, Kansas City, KS (US)

(72) Inventors: Joel Foderberg, Overland Park, KS (US); Keith Jensen, Overland Park, KS (US)

(73) Assignee: IconX, LLC, Kansas City, KS (US)

( * ) Notice: Subject to any disclaimer, the term of this patent is extended or adjusted under 35 U.S.C. 154(b) by 271 days.

(21) Appl. No.: 15/351,030

(22) Filed: Nov. 14, 2016

(65) Prior Publication Data

US 2017/0058519 A1    Mar. 2, 2017

Related U.S. Application Data

(63) Continuation of application No. 14/656,933, filed on Mar. 13, 2015, now Pat. No. 9,493,946, which is a
(Continued)

(51) Int. Cl.
*B29C 39/10* (2006.01)
*E04C 2/288* (2006.01)
(Continued)

(52) U.S. Cl.
CPC ............... *E04C 2/288* (2013.01); *B28B 1/16* (2013.01); *B28B 23/02* (2013.01); *B29C 39/10* (2013.01);
(Continued)

(58) Field of Classification Search
CPC ................. B28B 1/16; Y10T 29/49616; Y10T 29/49629; Y10T 29/49632;
(Continued)

(56) References Cited

U.S. PATENT DOCUMENTS 1,053,231 A    2/1913    Schweikert
1,088,290 A    2/1914    McAllister et al.
(Continued)

FOREIGN PATENT DOCUMENTS

| CN | 2695521 Y | 4/2005 |
| CN | 2771356 Y | 4/2006 |
| CN | 203008210 U | 6/2013 |
| EP | 2166178 A2 | 3/2010 |

(Continued)

OTHER PUBLICATIONS

Search Report and Written Opinion for related PCT Application No. PCT/US2014/067427 filed on Nov. 25, 2014, dated Feb. 20, 2015, 11 pages.
(Continued)

*Primary Examiner* — Jason L Vaughan
*Assistant Examiner* — Amanda J Meneghini
(74) *Attorney, Agent, or Firm* — Hovey Williams LLP

(57) ABSTRACT

An insulated concrete panel comprising an insulation layer having one or more openings extending therethrough, a first concrete layer adjacent to a first surface of the insulation layer, a second concrete layer adjacent to a second surface of the insulation layer, and a wall tie received within one or more of the openings. The wall tie includes a central section received within the one or more openings of the insulation layer, a first concrete engaging at least partially embedded within the first concrete layer, and a second concrete engaging section embedded within the second concrete layer. The second concrete engaging section has a maximum width that is larger than a maximum width of the central section. The central section of the wall tie is configured to transfer shear forces and resist delamination forces between the first and second concrete layers.

21 Claims, 38 Drawing Sheets

Related U.S. Application Data continuation-in-part of application No. 14/265,931, filed on Apr. 30, 2014, now Pat. No. 9,103,119.

(60) Provisional application No. 61/915,675, filed on Dec. 13, 2013, provisional application No. 61/953,372, filed on Mar. 14, 2014, provisional application No. 61/985,211, filed on Apr. 28, 2014.

(51) Int. Cl.
| | | |
|---|---|---|
| *E04C 2/04* | (2006.01) | |
| *E04B 2/84* | (2006.01) | |
| *E04B 1/76* | (2006.01) | |
| *E04B 1/41* | (2006.01) | |
| *E04C 5/16* | (2006.01) | |
| *B28B 1/16* | (2006.01) | |
| *B28B 23/02* | (2006.01) | |
| *B29L 9/00* | (2006.01) | |
| *B29K 105/06* | (2006.01) | |

(52) U.S. Cl.
CPC .............. *E04B 1/41* (2013.01); *E04B 1/7608* (2013.01); *E04B 2/847* (2013.01); *E04C 2/044* (2013.01); *E04C 2/049* (2013.01); *E04C 5/162* (2013.01); *B29K 2105/06* (2013.01); *B29L 2009/00* (2013.01); *E04C 2002/045* (2013.01)

(58) Field of Classification Search
CPC ......... Y10T 29/49982; Y10T 29/49984; Y10T 29/49993
See application file for complete search history.

(56) References Cited

U.S. PATENT DOCUMENTS

| | | |
|---|---|---|
| 1,302,727 A | 5/1919 | Thomas |
| 1,503,148 A | 7/1924 | Bernstrom |
| 1,700,889 A | 2/1929 | Heltzel |
| 1,801,273 A | 4/1931 | Himmel et al. |
| 1,975,156 A | 10/1934 | Knight |
| 2,178,782 A | 11/1939 | Dunlap |
| 2,400,670 A | 5/1946 | William |
| 2,412,253 A | 12/1946 | Diggs |
| 2,765,139 A | 10/1956 | White |
| 2,923,146 A | 2/1960 | Mayer |
| 2,018,080 A | 1/1962 | Loudon |
| 3,296,763 A | 1/1967 | Curl |
| 3,715,850 A | 2/1973 | Chambers |
| 3,832,817 A | 9/1974 | Martens |
| 3,925,595 A | 12/1975 | Hawkins |
| 3,940,553 A | 2/1976 | Hawkins |
| 4,027,988 A | 6/1977 | Kum |
| 4,037,978 A | 7/1977 | Connelly |
| 4,059,931 A | 11/1977 | Mongan |
| 4,107,890 A | 8/1978 | Seghezzi et al. |
| 4,157,226 A | 6/1979 | Reiter |
| 4,194,851 A | 3/1980 | Littlefield |
| 4,223,176 A | 9/1980 | Hawkins |
| 4,329,821 A | 5/1982 | Long et al. |
| 4,393,635 A | 7/1983 | Long |
| 4,445,308 A | 5/1984 | Taylor |
| 4,471,156 A | 9/1984 | Hawkins |
| 4,505,019 A | 3/1985 | Deinzer |
| 4,637,748 A | 1/1987 | Beavers |
| 4,640,074 A | 2/1987 | Paakkinen |
| 4,673,525 A | 6/1987 | Small et al. |
| 4,723,388 A | 2/1988 | Zieg |
| 4,765,109 A | 8/1988 | Boeshart |
| 4,805,366 A | 2/1989 | Long |
| 4,829,733 A | 5/1989 | Long |
| 4,852,324 A | 8/1989 | Page |
| 4,904,108 A | 2/1990 | Wendel |
| 4,932,808 A | 6/1990 | Bar et al. |
| 5,154,034 A | 10/1992 | Stanek |
| 5,252,017 A | 10/1993 | Hodel |
| 5,272,850 A | 12/1993 | Mysliwiec et al. |
| 5,302,039 A | 4/1994 | Omholt |
| 5,371,991 A | 12/1994 | Bechtel et al. |
| 5,440,845 A | 8/1995 | Tadros et al. |
| 5,456,048 A | 10/1995 | White |
| 5,517,794 A | 5/1996 | Wagner |
| 5,570,552 A | 11/1996 | Nehring |
| 5,606,832 A | 3/1997 | Keith et al. |
| 5,628,481 A | 5/1997 | Rinderer |
| 5,671,574 A | 9/1997 | Long |
| 5,673,525 A | 10/1997 | Keith et al. |
| 5,809,723 A | 9/1998 | Keith et al. |
| 5,899,033 A | 5/1999 | Merchlewitz |
| 5,996,297 A | 12/1999 | Keith et al. |
| 6,079,176 A | 6/2000 | Westra et al. |
| 6,088,985 A | 7/2000 | Clark |
| 6,116,836 A | 9/2000 | Long, Sr. |
| 6,138,981 A | 10/2000 | Keith et al. |
| 6,148,576 A | 11/2000 | Janopaul, Jr. et al. |
| 6,202,375 B1 | 3/2001 | Kleinschmidt |
| 6,263,638 B1 | 7/2001 | Long, Sr. |
| 6,276,104 B1 | 8/2001 | Long, Sr. et al. |
| 6,298,549 B1 | 10/2001 | Mangone, Jr. |
| 6,412,242 B1 | 7/2002 | Elmer |
| 6,467,227 B2 | 10/2002 | Elmer |
| 6,519,903 B1 | 2/2003 | Dirisamer et al. |
| 6,606,786 B2 | 8/2003 | Mangone, Jr. |
| 6,675,546 B2 | 1/2004 | Coles |
| 6,705,583 B2 | 3/2004 | Daniels et al. |
| 6,761,003 B2 | 7/2004 | Lind |
| 6,761,007 B2 | 7/2004 | Lancelot, III et al. |
| 6,779,241 B2 | 8/2004 | Mangone, Jr. |
| 6,817,156 B2 | 11/2004 | Mok |
| 6,860,454 B1 | 3/2005 | Gronowicz, Jr. |
| 6,915,613 B2 | 7/2005 | Wostal et al. |
| 6,945,506 B2 | 9/2005 | Long, Sr. |
| 7,104,718 B2 | 9/2006 | Stoeckler |
| 7,241,071 B2 | 7/2007 | Carraher et al. |
| 7,266,931 B2 | 9/2007 | Long, Sr. |
| 7,290,377 B2 | 11/2007 | Dupuis |
| 7,347,029 B2 | 3/2008 | Wostal et al. |
| 7,367,741 B2 | 5/2008 | Vogler |
| 7,469,514 B2 | 12/2008 | Luo |
| 7,654,056 B2 | 2/2010 | Luo |
| 8,083,432 B2 | 12/2011 | Limpert |
| 8,112,963 B2 | 2/2012 | Johnson |
| 8,215,075 B2 | 7/2012 | Bergman |
| 8,276,339 B2 | 10/2012 | Limburg |
| 8,312,683 B2 | 11/2012 | Tadros et al. |
| 8,365,501 B2 | 2/2013 | Long et al. |
| 8,479,469 B2 | 7/2013 | Ciccarelli |
| 8,555,584 B2 | 10/2013 | Ciuperca |
| 8,720,156 B2 | 5/2014 | Porter |
| 8,839,580 B2 | 9/2014 | Long, Sr. |
| 9,033,302 B2 | 5/2015 | Long, Sr. |
| 9,074,370 B2 | 7/2015 | Long et al. |
| 9,303,404 B2 | 4/2016 | Naito et al. |
| 2001/0037563 A1 | 11/2001 | Mangone, Jr. |
| 2002/0189178 A1 | 12/2002 | Lind |
| 2003/0208897 A1 | 11/2003 | Mangone, Jr. |
| 2004/0040251 A1 | 3/2004 | Mok |
| 2004/0101352 A1 | 5/2004 | Stoeckler |
| 2004/0103609 A1 | 6/2004 | Wostal et al. |
| 2004/0118067 A1 | 6/2004 | Keith |
| 2005/0108963 A1 | 5/2005 | Wostal et al. |
| 2005/0217198 A1 | 10/2005 | Carrher et al. |
| 2006/0032166 A1 | 2/2006 | Devalapura |
| 2007/0074478 A1 | 4/2007 | Dupuis |
| 2008/0028709 A1 | 2/2008 | Pontarolo |
| 2008/0240846 A1 | 10/2008 | Phillips |
| 2008/0295425 A1 | 12/2008 | Farag |
| 2009/0067918 A1 | 3/2009 | Luo |
| 2009/0301025 A1 | 12/2009 | Kodi |
| 2009/0324880 A1 | 12/2009 | Johnson |
| 2010/0043337 A1 | 2/2010 | Banks |
| 2010/0132290 A1 | 6/2010 | Luburic |
| 2011/0265414 A1 | 11/2011 | Ciccarelli |
| 2012/0135200 A1 | 5/2012 | Burvill et al. |

(56) References Cited

U.S. PATENT DOCUMENTS

| | | |
|---|---|---|
| 2012/0285108 A1 | 11/2012 | Long, Sr. |
| 2014/0075882 A1 | 3/2014 | Porter |
| 2014/0298743 A1 | 10/2014 | Long, Sr. |
| 2016/0010330 A1 | 1/2016 | Naito et al. |

FOREIGN PATENT DOCUMENTS

| | | |
|---|---|---|
| GB | 1549362 A | 8/1979 |
| WO | 99/34071 A1 | 7/1999 |

OTHER PUBLICATIONS

Search Report and Written Opinion dated Jun. 24, 2015 for related PCT Application No. PCT/US2015/020344 filed on Mar. 13, 2015, 14 pages.

Clay J. Naito et al., Evaluation of Shear Tie Connectors for Use in Insulated Concrete Sandwich Panels, Air Force Research Laboratory, Tyndall Air Force Base, FL, Jan. 1, 2009, AFRL-RX-TY-TR-2009-4600, 37 pages.

Amin Ainea et al., State-of-the-Art of Precast Concrete Sandwich Panels, PCI Journal, Nov.-Dec. 1991, pp. 78-98.

Clay J. Naito et al., Precast/Prestressed Concrete Experiments Performance on Non-load Bearing Sandwich Wall Panels, Air Force Research Laboratory, Tyndall Air Force Base, FL, Jan. 2011, AFRL-RX-TY-TR-2011-0021, 160 pages.

George Morcous et al., Optimized NU Sandwich Panel System for Energy, Composite Action and Production Efficiecy, 3rd fib International Congress, 2010, 13 pages.

European Search Report dated Oct. 17, 2017 for related European Patent Application No. 14869437.5, 7 pages.

Chinese Office Action dated Jan. 17, 2018 for related Chinese Patent Application No. 201480067897.8, 6 pages.

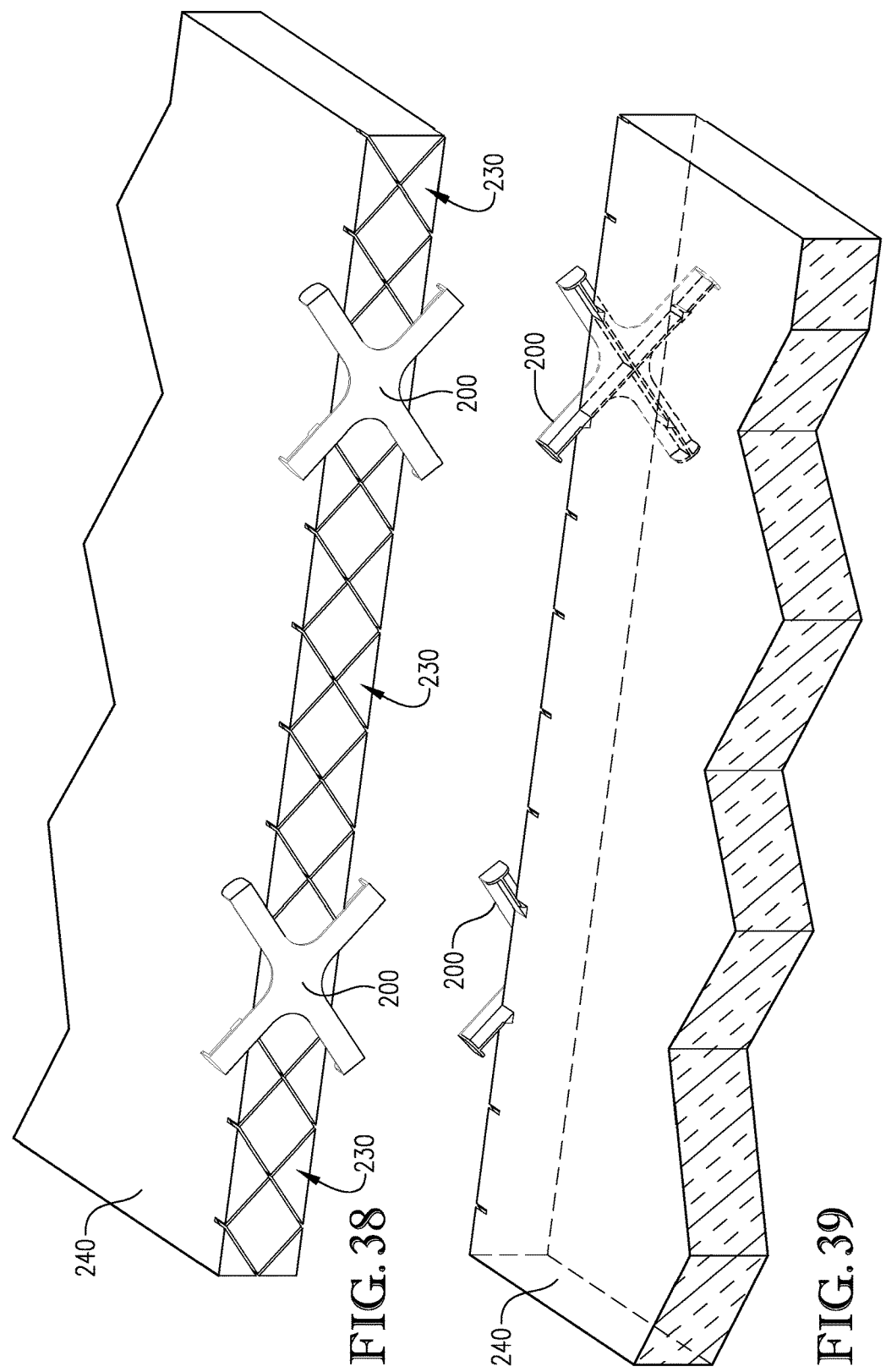

TIE SYSTEM FOR INSULATED CONCRETE PANELS

RELATED APPLICATIONS

This non-provisional patent application is a continuation application of co-pending U.S. patent application Ser. No. 14/656,933, filed Mar. 13, 2015, and entitled "TIE SYSTEM FOR INSULATED CONCRETE PANELS," which is a continuation-in-part application of U.S. patent application Ser. No. 14/265,935, filed Apr. 30, 2014, and is now U.S. Pat. No. 9,103,119, issued on Aug. 11, 2015, and entitled "TIE SYSTEM FOR INSULATED CONCRETE PANELS," which claims priority to U.S. Provisional Patent Application No. 61/915,675, filed Dec. 13, 2013, and entitled "TIE SYSTEM FOR INSULATED CONCRETE PANELS," which also claims priority to U.S. Provisional Patent Application 61/953,372 filed Mar. 14, 2014, and entitled "CONCRETE WYTHE CONNECTOR," and also claims priority to U.S. Provisional Patent Application 61/985,211 filed Apr. 28, 2014, and entitled "CONCRETE WYTHE CONNECTOR," the entireties of which are all hereby incorporated by reference into the present non-provisional application.

FIELD OF THE INVENTION

Embodiments of the present invention are direct generally to a new tie system and method for making insulated concrete panels. More specifically, embodiments of the present invention are directed to using the new tie system to more effectively and efficiently manufacture improved insulated concrete panels.

BACKGROUND OF THE INVENTION

Insulated concrete panels are well known in the construction industry. Such concrete panels are generally formed with insulation layers sandwiched between top and bottom concrete layers. To secure the concrete layers to the insulation layers, connectors (otherwise known as "ties") may be used. The ties will connect the two concrete layers together through the insulation layer. As such, the ties hold the components of the insulated concrete panels together and also provide a mechanism whereby loads can be transferred between the concrete layers.

Depending on the application, the ties may be formed in various shapes and from various materials. In the past, metals, such as iron or steel, have been used to form such ties. However, metals are high thermal conductors and, as such, permit undesirable thermal conduction through the concrete layers. Furthermore, the insulation layer that receives such ties will usually be formed with holes for receiving the ties. Often, such holes are formed much larger than the ties themselves. Such a mismatch between the size of the ties and the holes further decreases the thermal efficiency of the concrete wall panels.

Based on design considerations, the size (e.g., the thickness) of the insulation layers used in the insulated concrete panels may vary widely. For example, construction of a single building may require a plurality of different types of insulated concrete panels to be used, with each panel having a different insulation layer size. In more detail, a building may require that its exterior walls be constructed from insulated concrete panels having a very thick insulation layer, so as to reduce heat transfer to/from the ambient. Contrastingly, the building may have interior walls that are required to be constructed from insulated concrete panels having an insulation layer with a reduced thickness. Such an insulation layer with a reduced thickness may be used because the interior walls may not need to restrict heat transfer as much as the exterior walls. However, incorporating insulated concrete panels with insulation layers having varying sizes necessarily requires the use of ties of varying sizes. Specifically, thicker insulation layers require the use of larger ties, while thinner insulation layers require the use of smaller ties. The need to use varying sizes of ties can increase the complexity and decrease the efficiency of construction processes in building projects.

Accordingly, there is a need in the industry for a tie for an insulated concrete panel that provides the necessary strength for building applications, while at the same time, provides enhanced thermal insulation. Furthermore, there is a need for a single tie that is capable of being used with insulated concrete panels having insulation layers of various sizes.

SUMMARY OF THE INVENTION

In one embodiment of the present invention, there is provided an insulated concrete panel. The panel comprises an insulation layer having one or more openings extending therethrough, a first concrete layer adjacent to a first surface of the insulation layer, a second concrete layer adjacent to a second surface of the insulation layer, and a wall tie received within one of the openings in the insulation layer. The wall tie includes a central section received within one of the openings of the insulation layer and a first concrete engaging section comprised of first and second protrusion portions at least partially embedded within the first concrete layer. The first concrete engaging section extends from a first end of the central section. The wall tie further includes a second concrete engaging section comprising first and second end portions embedded within the second concrete layer. The second concrete engaging section extends from a second end of the central section. The second concrete engaging section has a maximum width that is larger than a maximum width of the central section. The central section of the wall tie is configured to transfer shear forces and resist delamination forces between the first and second concrete layers.

In another embodiment of the present invention, there is provided a method of making an insulated concrete panel. The method comprising the initial step of forming one or more tie openings through an insulation layer, with such insulation layer including a first surface and a second surface. An additional step includes inserting a wall tie into each of the tie openings, with each wall tie comprising first and second concrete engaging sections opposing a central section. The second concrete engaging section has a maximum width that is larger than a maximum width of the central section. An additional step includes pouring a first layer of concrete. An additional step includes placing the insulation layer on the first layer of concrete, such that the first surface of the insulation layer is in contact with the first layer of concrete. During the placing of step, the first concrete engaging section of the wall tie is at least partially embedded within the first layer of concrete. An additional step includes pouring a second layer of concrete over the second surface of the insulation layer. During such pouring step, the second concrete engaging portion of the wall tie is at least partially embedded within the second layer of concrete. The central section of the wall tie is configured to transfer shear forces and restrict delamination forces between the first and second layers of concrete.

In yet another embodiment of the present invention, there is provided a wall tie for use with insulated concrete panels, with the panels including first and second layers. The wall tie comprises a central section and a first concrete engaging section including first and second protrusion portions. The first concrete engaging section extends from a first end of the central section. The wall tie further comprises a second concrete engaging section including first and second end portions, with the second concrete engaging section extending from a second end of the central section. The second concrete engaging section has a maximum width that is larger than a maximum width of said central section, and the central section is configured to transfer shear forces and restrict delamination forces between the first and second layers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 38 is a partial front perspective view of an insulation layer including a plurality of X-shaped grooves on a side edge, and illustrating two tie systems from FIG. 29 installed in two of the X-shaped grooves;

FIG. 39 is a partial rear perspective view of the insulation layer from FIG. 38;

Figure 1:
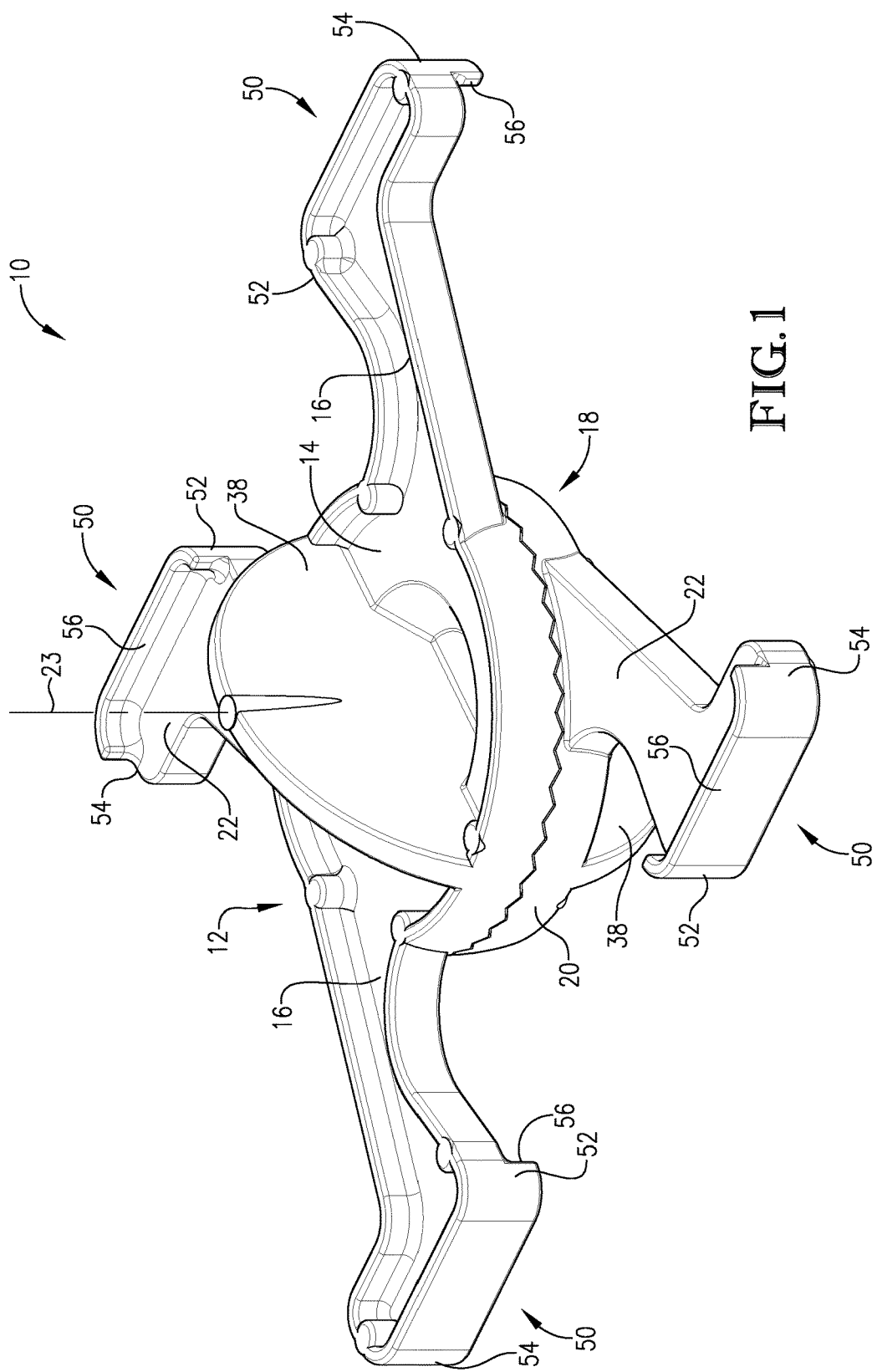
FIG. 1 is a top perspective view of a tie system in an assembled configuration according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 14:
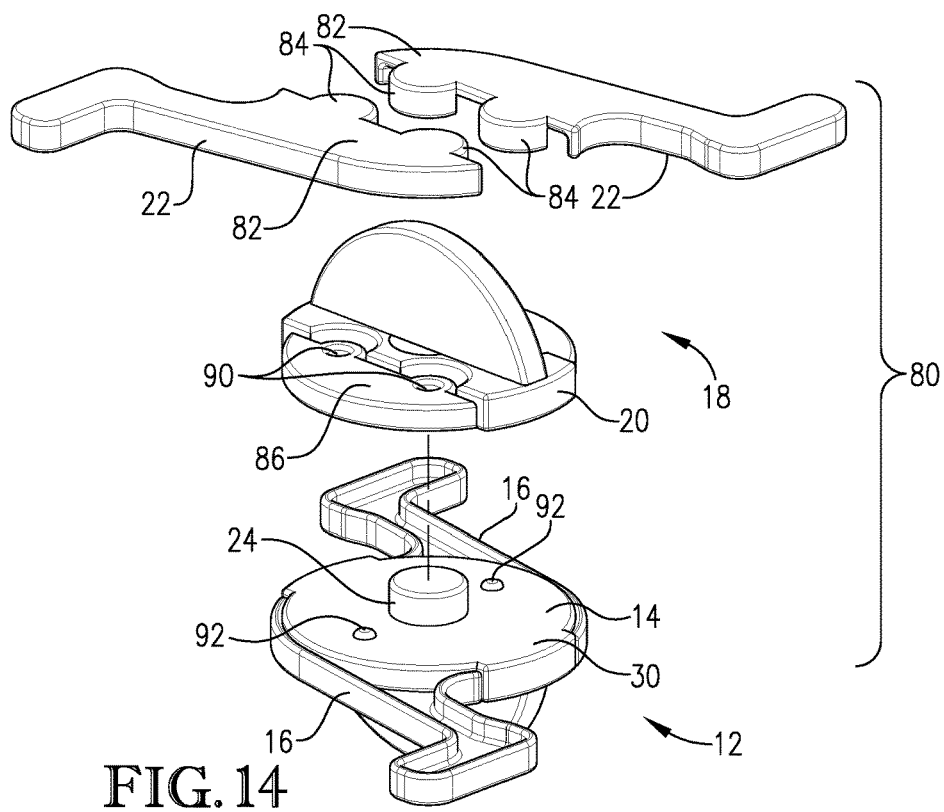
FIG. 14 is a bottom exploded view of an additional embodiment of a tie system in a disassembled configuration according to embodiments of the present invention, with the tie system having extension members and hubs, and with the extension members being separable from the hubs.
Figure 15:
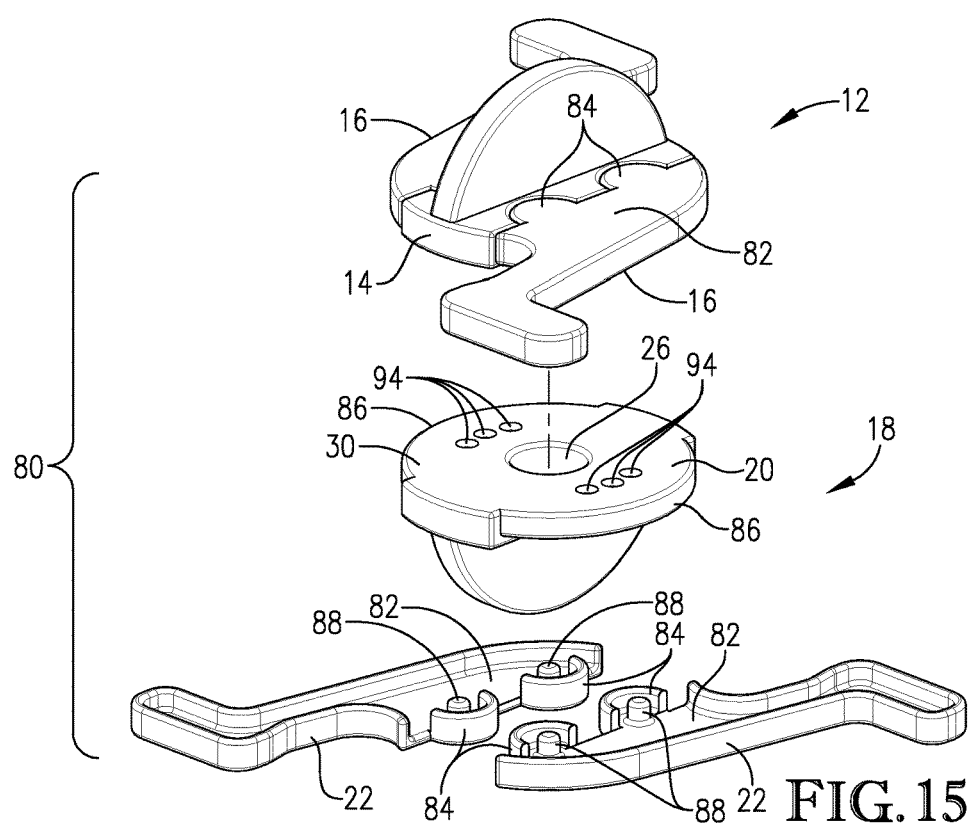
FIG. 15 is top exploded view of the tie system of FIG. 14 in a disassembled configuration.

As will be described in more detail below, FIGS. 1-12 show an embodiment of the invention where structural members of a tie system are integrally formed of a single material having a low thermal conductivity, such as non-metallic composite material. Alternatively, FIGS. 14-15 show an embodiment of the invention where structural members of a tie system are formed of two different materials, such as a first material having a high thermal conductivity (e.g., steel) and a second material having a low thermal conductivity (e.g., a non-metallic composite material). The single-material tie system of FIG. 1-12 will be described first, followed by a description of the multi-material tie system of FIGS. 14-15.

Nevertheless, in this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Single-Material Tie System

Figure 2:
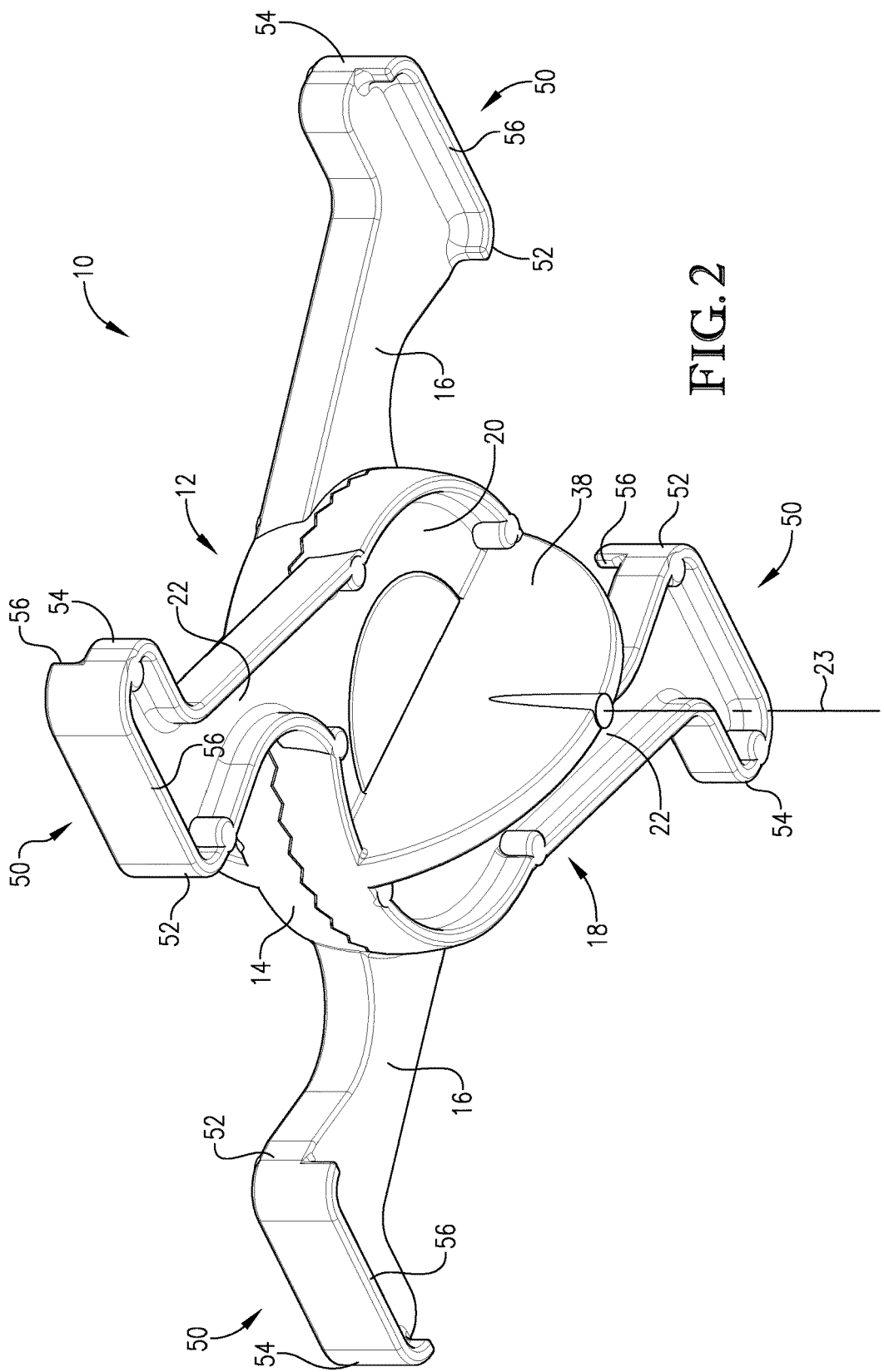
FIG. 2 is a bottom perspective view of the tie system of FIG. 1 in the assembled configuration.
Figure 3:
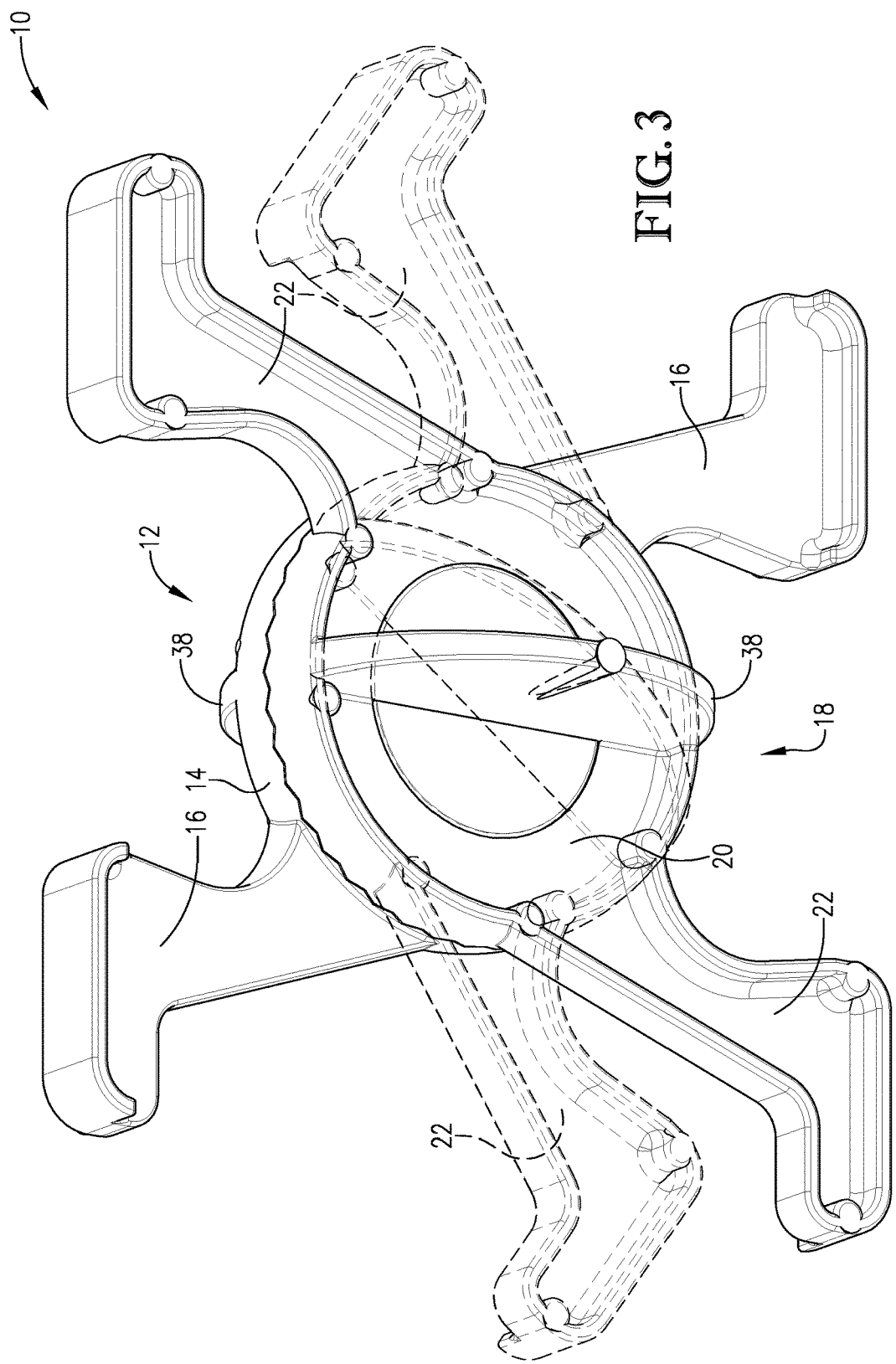
FIG. 3 is a bottom perspective view of the tie system of FIGS. 1-2 in the assembled configuration and having a first structural member and a second structural member, with the tie system being shown in a first and second rotational position, and with the second structural member being shown in dashed-line in the second rotational position.
Figure 4:
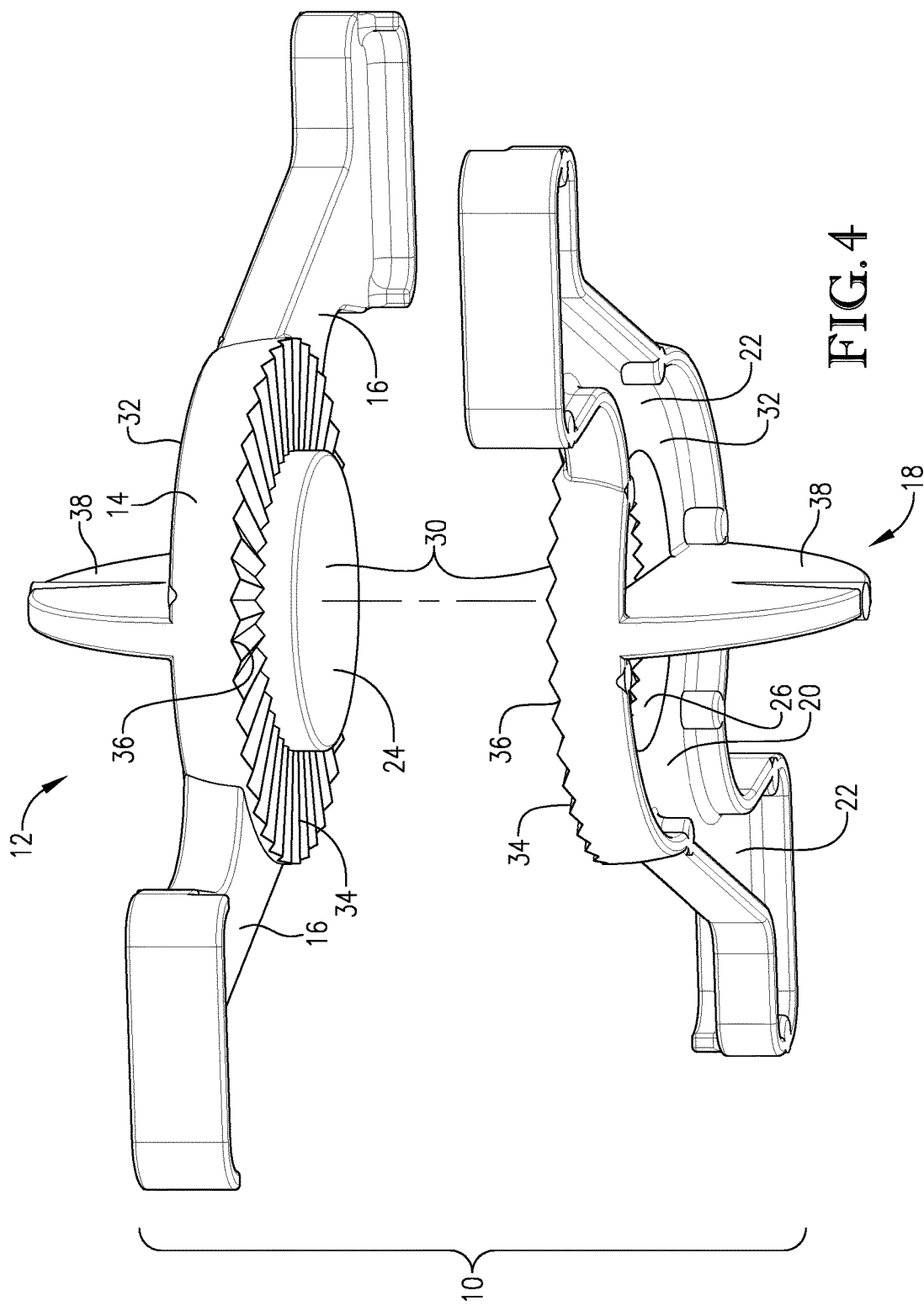
FIG. 4 is a side perspective view of the tie system of FIGS. 1-3 in a disassembled configuration.
Figure 5:
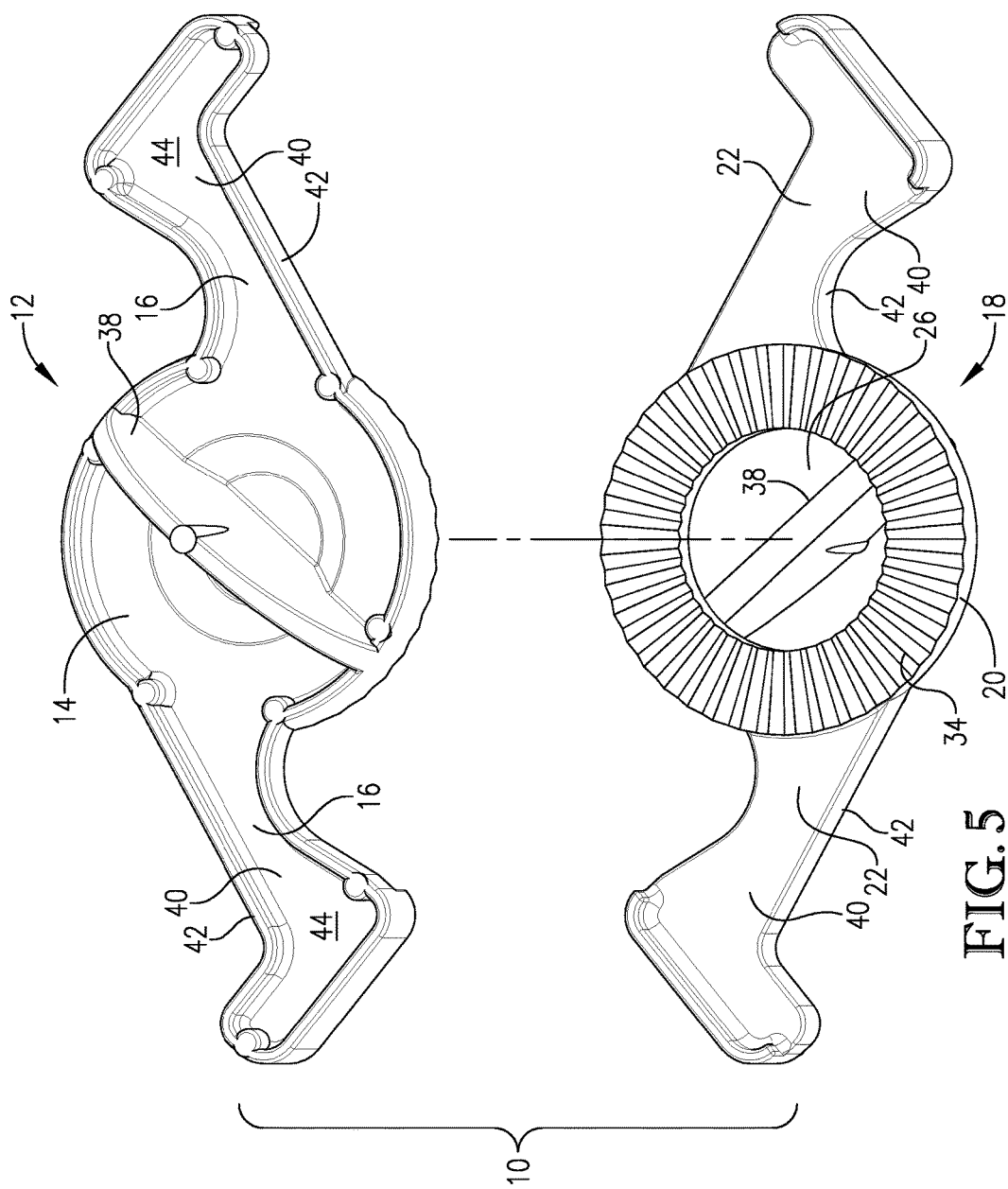
FIG. 5 is a top perspective view of the tie system of FIGS. 1-4 in a disassembled configuration.
Figure 6:
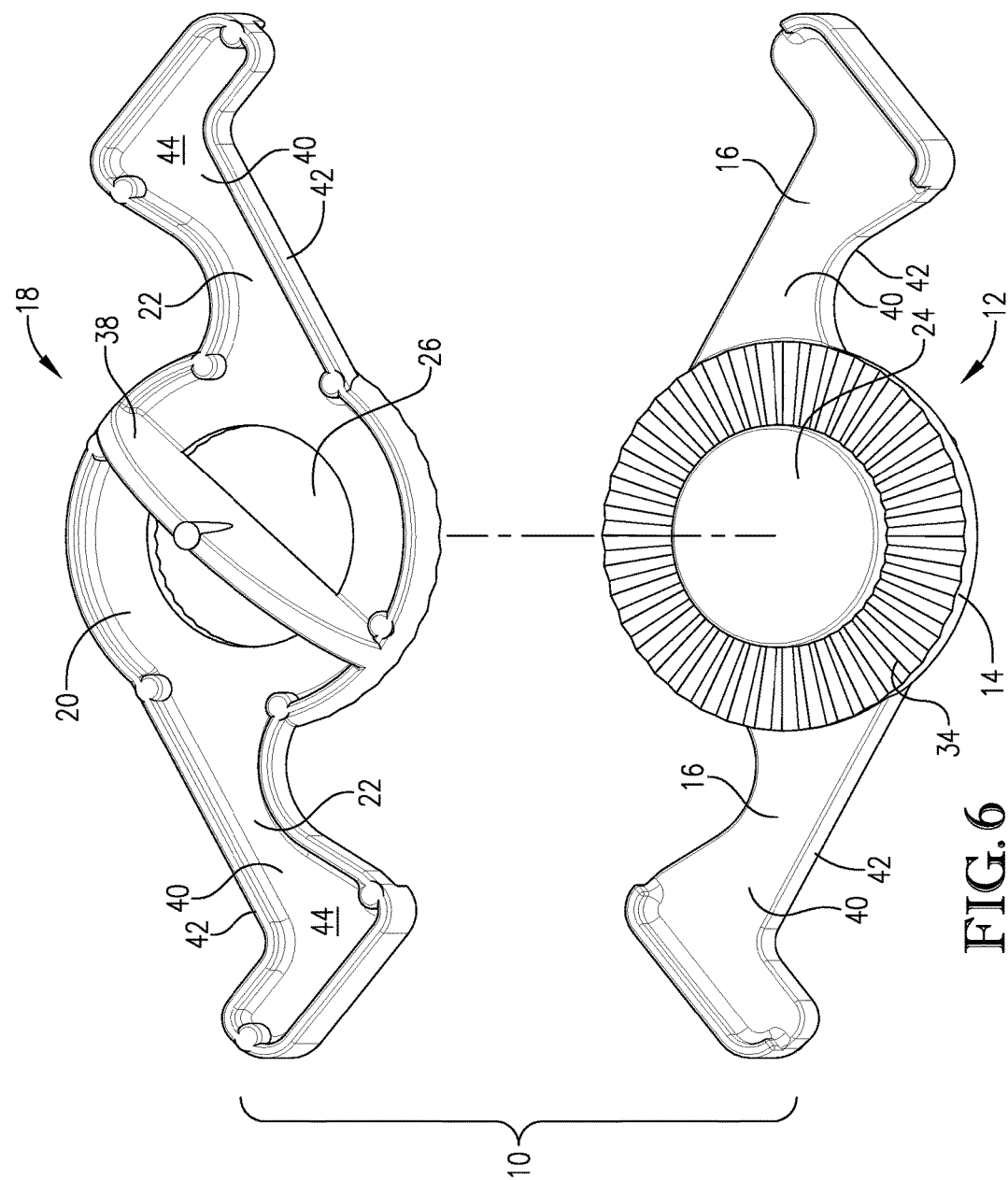
FIG. 6 is a bottom perspective view of the tie system of FIGS. 1-5 in a disassembled configuration.

With reference to FIGS. 1-6, embodiments of the present invention include a tie system 10 for use in forming an insulated concrete panel. The tie system 10 includes a first structural member 12 comprising a first hub 14 and a pair of first extension members 16 coupled to said first hub 14, such that the first extension members 16 extend outwardly from the first hub 14 in generally opposite directions. The tie system 10 further includes a second structural member 18 comprising a second hub 20 and a pair of second extension members 22 coupled to the second hub 20, such that the second extension members 22 extend outwardly from the second hub 20 in generally opposite directions. The first and second hubs 14, 20 are configured to be rotatably coupled to one other (when coupled together the hubs 14, 20 may define a hub portion) in a manner that permits rotation of the first and second structural members 12, 18 relative to one another about an axis of rotation 23 (See FIGS. 1-2) extending through the first and second hubs 14, 20. In more detail, as illustrated by FIGS. 4-6, the hub 14 of the first structural member 12 may be equipped with a hub projection 24, and the hub 20 of the second structural member 18 may be equipped with a hub recess 26. Embodiments provide for the hub projection 24 to be received within the hub recess 26 so as to rotatably couple the first and second structural members 12, 18 together. Such a configuration provides for the tie system 10 to be capable of shifting between a collapsed configuration and an expanded configuration (as will be discussed in more detail below) by rotating the first and second structural members 12, 18 relative to one another about the axis of rotation 23.

The tie system 10, as described above, is further operable to be configured in an assembled and disassembled configuration. In FIGS. 1-3, the tie system 10 is shown in the assembled configuration, where the first and second structural members 12, 18 are rotatably coupled to one another in a scissor-like configuration. As illustrated in FIG. 3, when the tie system 10 is assembled, the first and second structural members 12, 18 can rotate relative to one another on an axis of rotation that extends through the coupled first and second hubs 14, 20. This manner of rotatably coupling the first and second structural members 12, 18 gives the tie system 10 the scissor-like configuration. As used herein, the term "scissor-like configuration" means a configuration of two elongated components, where the elongated components are rotatably coupled to one another at a connection location that is spaced from ends of both the elongated components, so that expansion or contraction of the ends of the components on one side of the connection location causes corresponding expansion or contraction of the ends of the components on the other side of the connection location. FIGS. 4-6 show the tie system 10 in a disassembled configuration, where the first and second structural members 12, 18 are not coupled to one another.

As illustrated in the drawings, certain embodiments provide for the first and second structural members 12, 18 to each have substantially the same shape. Furthermore, each of the first and second structural members 12, 18 may be substantially symmetrical about the axis of rotation 23. In some embodiments, the first and second structural members 12, 18 may each have a length of between 3 to 18 inches, between 4 to 15 inches, between 5 to 12 inches, or between 6 to 9 inches. Additionally, in some embodiments, the first and second structural members 12, 18 may each have a width of between 1 to 6 inches, between 2 to 5 inches, or between 3 to 4 inches. Finally, in some embodiments the hubs 14, 20 will have a width (e.g., an outer diameter) of between 1 to 12 inches, between 2 to 6 inches, between 2.5 to 4 inches, or between 2.75 to 3.25 inches.

As best illustrated in FIG. 4, each of the first and second structural members 12, 18 of the tie system 10 presents an inwardly-facing side 30 and an outwardly-facing side 32, with the inwardly and outwardly-facing sides 30, 32 of each structural member 12, 18 facing an opposite direction. In the assembled configuration of FIGS. 1-3, such as when said first and second hubs 14, 20 are rotatably coupled to one another, the inwardly-facing sides 30 of the first and second structural members 12, 18 engage one another.

Returning to FIGS. 4-6, the hub 14 of the first structural member 12 may be formed with the hub projection 24 and the hub 20 of the second structural member 18 may be formed with the hub recess 26. The hub projection 24 may extend from a portion of the inwardly-facing side 30 of the first structural member 12. In some embodiments, the hub projection 24 may form at least a portion of the inwardly-facing side 30 of the first structural member 12. Contrastingly, the hub recess 26 penetrates within the second hub 20 from the inwardly-facing side 30 of the second structural member 18. In some embodiments, the hub recess 26 extends through an entire width of the second hub 20, such that the hub recess 26 presents an opening through the second hub 20. Embodiments provide for the hub projection 24 and the hub recess 26 to be complementary sized, such that the hub projection 24 can be received within the hub recess 26 in the assembled configuration, such as shown in FIGS. 1-3. For example, in some embodiments, the hub projection 24 has a cross-sectional area of 0.1, 0.25, 0.5, 0.75, 1, or more square inches. Similarly, the hub recess 26 may present a cross-sectional open area of at least 0.1, 0.25, 0.5, 0.75, 1, or more square inches. As such, the tie system 10 can be assembled by inserting the hub projection 24 into the hub recess 26. In such an assembled configuration, the receipt of the hub projection 24 in the hub recess 26 inhibits translation of the first and second structural members 12, 18, while permitting rotation of the first and second structural members 12, 18 relative to one another on the axis of rotation 23.

As best illustrated in FIGS. 4-6, embodiments of the present invention further provide for each of the first and second structural members 12, 18 to include a plurality of radially-extending ribs 34 extending about at least a portion of the inwardly-facing sides 30 of the members' hubs 14, 20. With particular reference to FIG. 4, each of the ribs 34 is separated by a gap 36. In the assembled configuration, such as when first and second hubs 14, 20 are rotatably coupled to one another, the ribs 34 of the first structural member 12 are configured to engage within the gaps 36 of the second structural member 18, and the ribs 34 of the second structural member 18 are configured to engage within the gaps 36 of the first structural member 12. As such, the ribs 34 and gaps 36 are configured engage with each other so as to hold the first and second structural members 12, 18 relative to one another in a plurality of different rotational positions. As such, the first and second structural members 12, 18 may be "locked" in various relative rotational positions. Such a configuration provides for a single tie system 10 to be used with insulation layers of varying sizes (e.g., varying thicknesses). It is understood that a greater number of ribs 34 facilitates the first and second structural members 12, 18 to be held in a correspondingly greater number of different rotational positions. Certain embodiments may provide for each of the first and second structural members 12, 18 to include between 10 and 200 ribs 34, between 20 and 100 ribs 34, or between 40 and 60 ribs 34. As will be discussed in more detail below, in addition to the ribs 34 and gaps 36, certain embodiments will provide for the first and second structural members 12, 18 to be held in a plurality of different rotational positions via positioning nubs and corresponding positioning notches.

As shown in FIGS. 1-6, each of the first and second hubs 14, 20 includes a barrier 38 extending generally perpendicularly from a portion of the hubs' outwardly-facing sides 32. In some embodiments, the barriers 38 may present a rounded outer profile that forms at least a portion of the outwardly-facing sides 32. The barriers 38 may each comprise a substantially planar member having two substantially flat sides. As such, the barriers 38 may each have the general shape of a half disk. In other embodiments, the barriers 38 may each have the general shape of a half sphere.

In some embodiments, as best illustrated in FIGS. 5-6, the first and second extension members 16, 22 will each comprise a main sidewall 40 and a perimeter wall 42. The perimeter sidewalls 42 may extend away from the outwardly-facing sides 32 of their respective extension member 16, 22. Furthermore, in some embodiments, the perimeter sidewalls 40 may be generally perpendicular to their respective main sidewall 40. As such, the main sidewall 40 and perimeter sidewall 42 of each of the first and second extension members 16, 22 present an open void 44 bounded by the sidewalls 40, 42.

As shown in FIGS. 1-2, embodiments further provide for the first and second extension members 16, 22 to each comprise an enlarged end portion 50, with the end portions 50 including oppositely facing heel portions 52 and toe portions 54. In some embodiments, the end portions 50 will include an end wall 56 that extends from the inwardly-facing side 30 of the first and second extension members 16, 22. The end walls 56 of each of the first and second extension members 16, 22 are configured to facilitate receipt of concrete when portions of the first and second extension members 16, 22 are embedded in concrete (as discussed in more detail below), so as to prevent pullout of the tie system 10 from the concrete. In other embodiments (not shown in the figures), each end portion 50 may further comprise a holding aperture extending through a thickness of the end portion 50. As such, the holding apertures may be configured to receive concrete when the end portions 50 are embedded in concrete, so as to prevent pullout of the tie system 10 from the concrete.

Turning to FIG. 3, the tie system 10, as described above, is capable of being held in a plurality of different rotational positions. For example, FIG. 3 illustrates the tie system 10 in an expanded configuration, i.e., with both the first and second structural members 12, 18 in solid-line. Alternatively, FIG. 3 also illustrates the tie system 10 in a partially-collapsed configuration, i.e., with the first structural member 12 in solid line and the second structural member 18 in dashed-line. As will be discussed in more detail below, in a collapsed configuration, the tie system 10 can be inserted into an opening formed in an insulation layer used in an insulated concrete panel. After the tie system 10 has been inserted in the opening of the insulation layer, the tie system can be transitioned to the expanded configuration where concrete can be poured about the tie system 10 and the insulation layer for manufacturing the insulated concrete panel.

The first and second structural members 12, 18 of the tie system 10 can be supplied to an insulated concrete panel maker (e.g., a "pre-caster") in the disassembled configuration (i.e., with the first and second structural members 12, 18 decoupled from one another). In general, a plurality of the tie systems 10 can used by the panel maker to rigidly connect two layers of concrete that have an insulation layer, such as an expanded or extruded polystyrene board, positioned between the concrete layers. In other embodiments, insulation layers can be formed from expanded polystyrene, polyisocyanurate, expanded polyethylene, extruded polyethylene, or expanded polypropylene. To initiate manufacture of the insulated concrete panel, the panel maker can select the unassembled first structural member 12 and the second structural member 18 and then connect them to one another, as previously described, by inserting the hub projection 24 of the first structural member 12 into the hub recess 26 of the second structural member 18.

Figure 7:
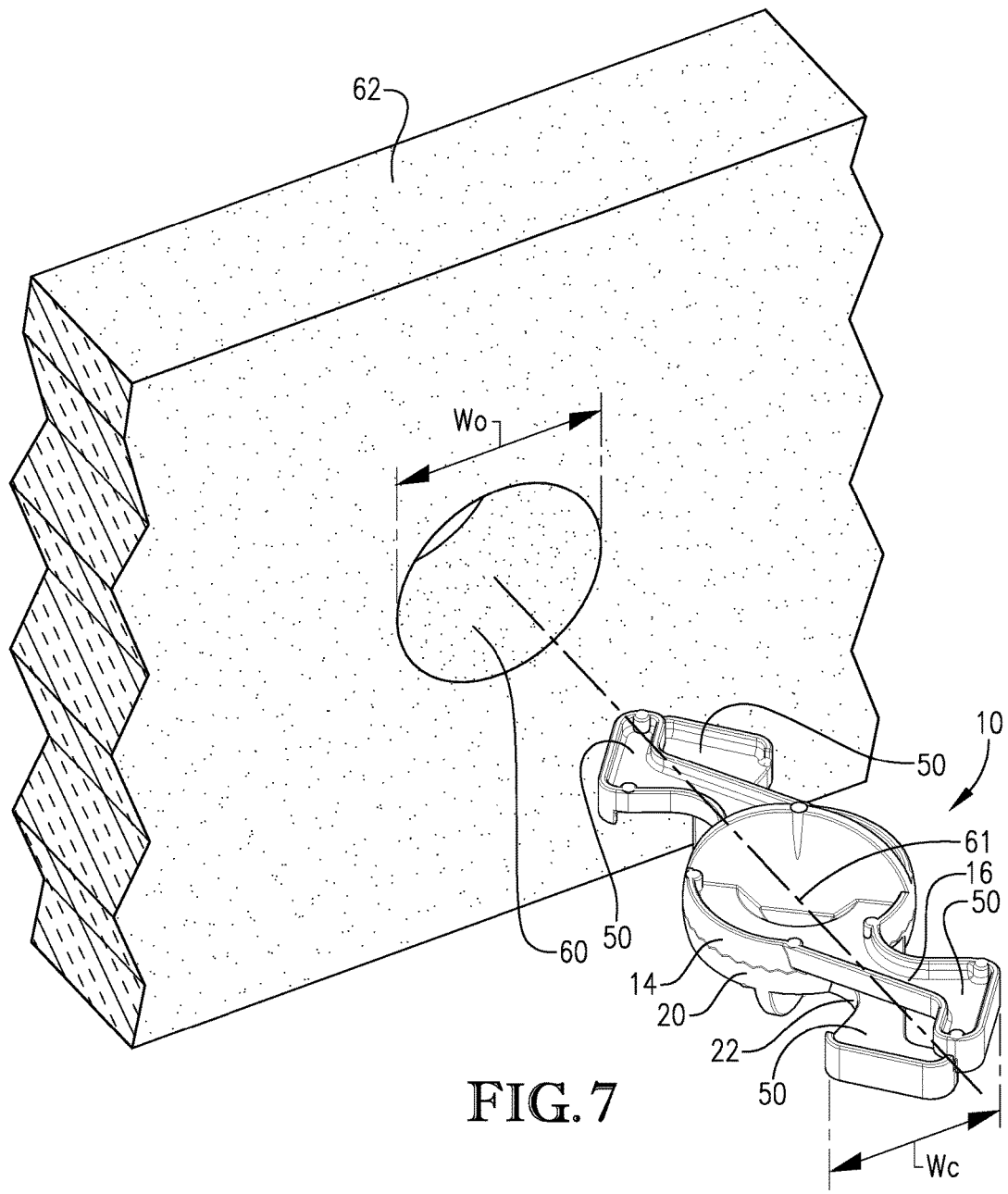
FIG. 7 is an illustration of the tie system of FIGS. 1-6 in a collapsed configuration and prepared for insertion into a tie opening of an insulation layer.
Figure 8:
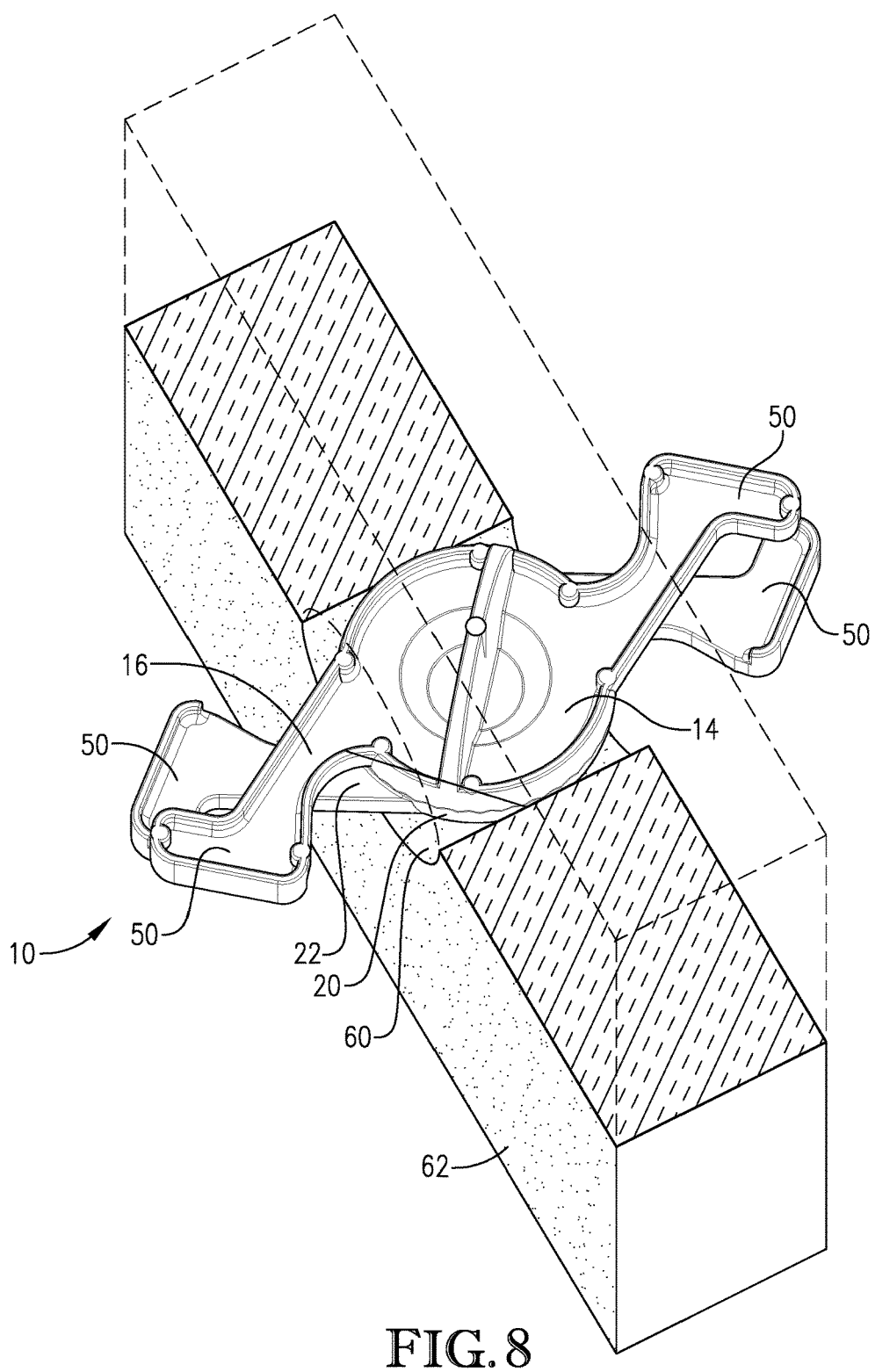
FIG. 8 is an illustration of the tie system of FIGS. 1-6 in a collapsed configuration and inserted into the tie opening of the insulation layer from FIG. 7, with a portion of the insulation layer removed at a horizontal cross-section for clarity.

As illustrated by FIG. 7, once the tie system 10 is assembled, it can be prepared for insertion into a tie opening 60 that has been formed in an insulation layer 62 (e.g., a panel or a board) so as to manufacture an insulated concrete panel. The tie opening 60 may be substantially cylindrical and may be formed using a hand drill and a core bit. However, embodiments may provide for the tie opening 60 to have other shapes and to be formed from other methods. Prior to insertion into the tie opening 60, the tie system 10 is shifted into a collapsed configuration, where a width Wc between adjacent end portions 50 of each of the first and second extensions members 16, 22 is minimized to be less than a width Wo of the tie opening 60 and/or less than a width of the hubs 14, 20 of the structural members 12, 18. As best illustrated by FIGS. 7-9, when the tie system 10 is in the collapsed configuration, its length (measured along an axis of elongation 61) is maximized and its width is minimized so that it can then be inserted into tie opening 60 of the insulation layer 62 until the hubs 14, 20 of the tie system are substantially centered in the tie opening 60.

Figure 10:
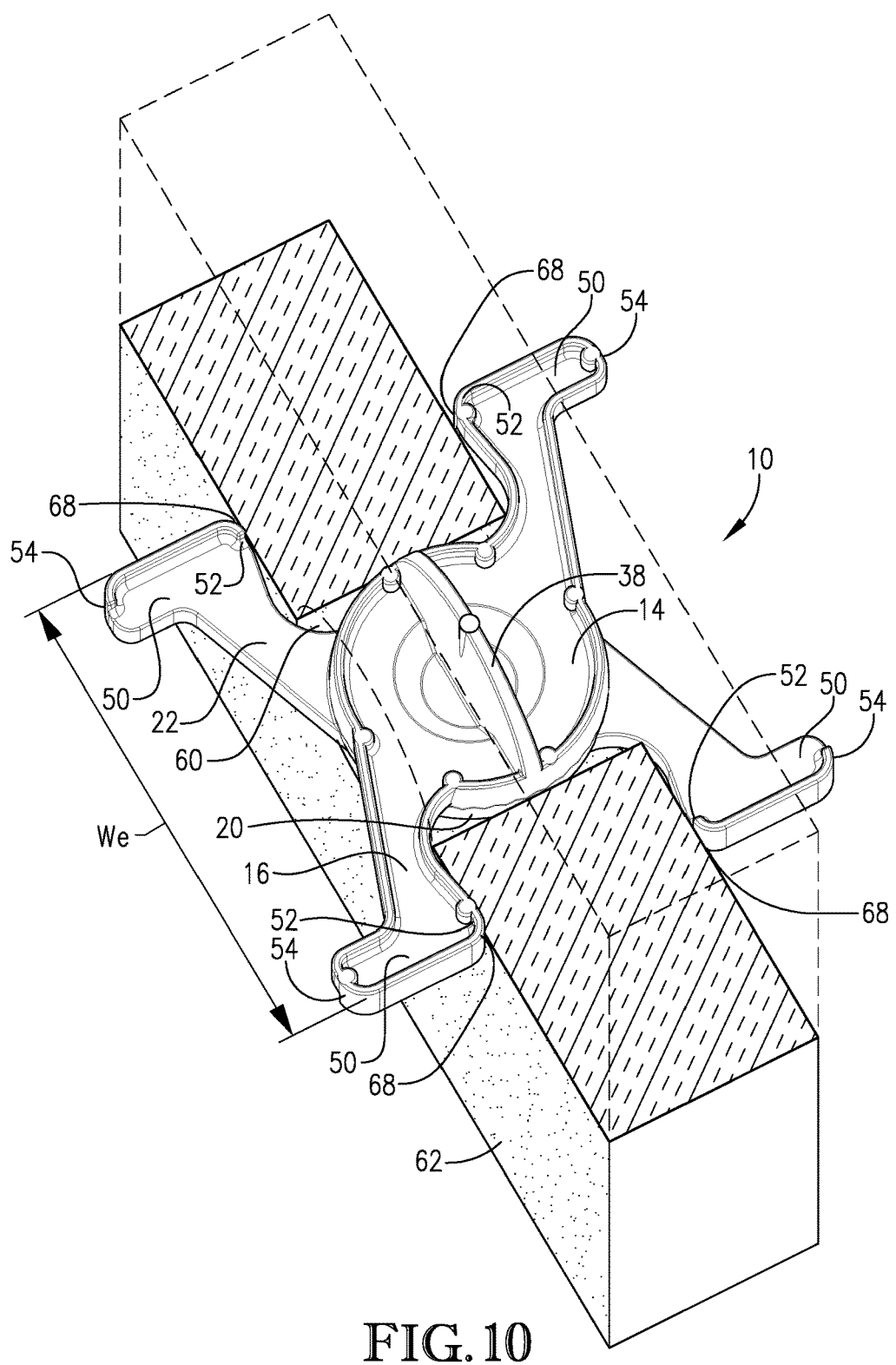
FIG. 10 is an illustration of the tie system of FIGS. 1-6 in an expanded configuration and inserted into the tie opening of the insulation layer from FIGS. 7-9, with a portion of the insulation layer removed at a horizontal cross-section for clarity.
Figure 11:
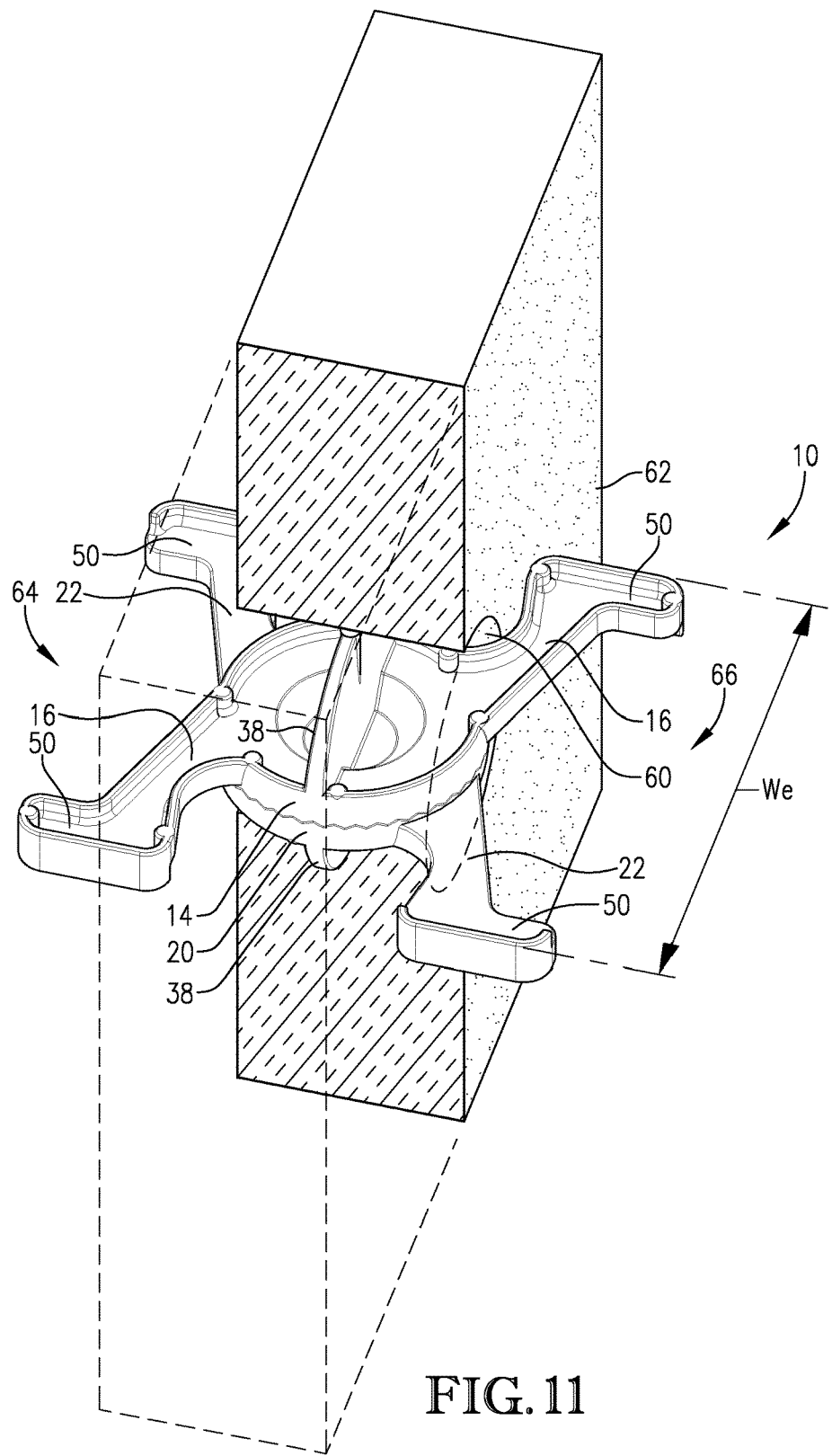
FIG. 11 is an additional illustration of the tie system of FIGS. 1-6 in an expanded configuration and inserted into the tie opening of the insulation layer from FIGS. 7-10, with a portion of the insulation layer removed at a vertical cross-section for clarity.

As illustrated by FIGS. 10-11, once the hubs 14, 20 of the tie system 10 are received in the tie opening 60, the tie system 10 can be shifted into the expanded configuration. As shown in FIG. 10, in the expanded configuration, a width Wc between the adjacent end portions 50 of each of the first and second extension members 16, 22 is maximized to be greater than the width Wo of the tie opening 60 (see FIG. 7) and/or greater than the width of the hubs 14, 20. In certain embodiments, a ratio of We to Wc of the tie system 10 is at least 1.2:1, 1.5:1, 2:1, or 3:1. As such, shifting of the tie system 10 from the collapsed configuration to the expanded configuration increases a maximum width of the tie system 10 and decreases a maximum length of the tie system 10. As such, when the tie system 10 is in the collapsed configuration a maximum width of the tie system 10 is less than a maximum width of the first and second hubs 14, 20 and the tie opening 60, and when the tie system 10 is in the expanded configuration the maximum width of the tie system 10 is greater than the maximum width of the first and second hubs 14, 20 and the tie opening 60.

Figure 9:
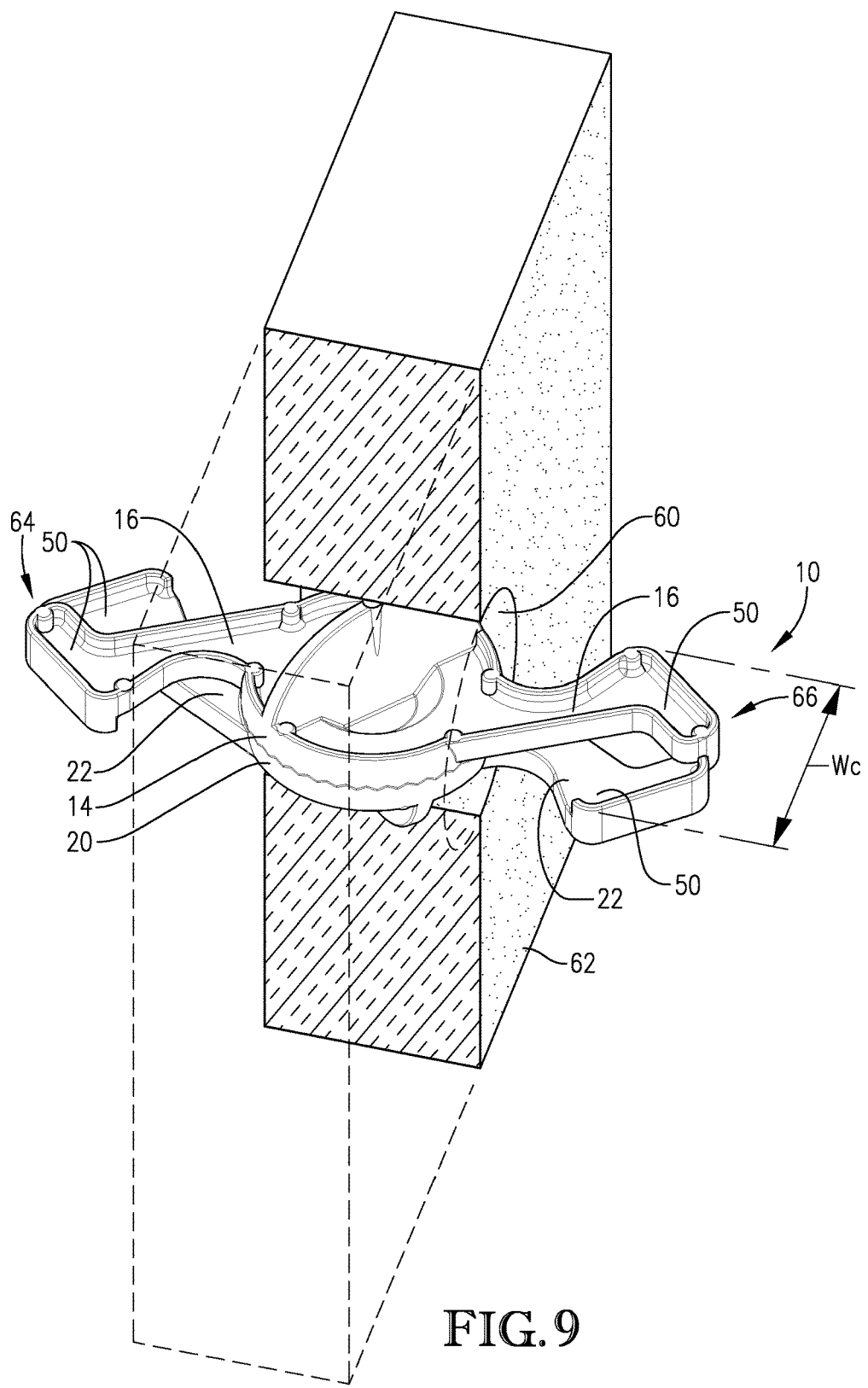
FIG. 9 is an additional illustration of the tie system of FIGS. 1-6 in a collapsed configuration and inserted into the tie opening of the insulation layer from FIGS. 7-8, with a portion of the insulation layer removed at a vertical cross-section for clarity.

As best illustrated in FIGS. 9 and 11, in certain embodiments, the tie system 10 may be described as having first and second end sections 64, 66. The first end section 64 may comprise one of the end portions 50 of the first extension member 16 and the adjacent end portion 50 of the second extension member 22. Similarly, the second end section 66 may comprise the other end portion 50 of the first extension member 16 and the adjacent end portion 50 of the second extension members 22. Given such definitions, the width of the first and second end sections 64, 66 are defined as the width Wc when the tie system is in the collapsed configuration, and the width of the first and second end sections 64, 66 are defined as the width Wc when the tie system 10 is in the expanded position. As such and in the expanded configuration, maximum widths of the first and second end sections 64, 66 are each greater than the maximum width of the tie opening 60, and in the collapsed configuration, maximum widths of the first and second end sections 64, 66 are each less than the maximum width of the tie opening 60.

As illustrated in FIG. 10, in the expanded configuration, the end portions 50 of the extension members 16, 22 engage the insulation layer 62 in four contact locations 68 located outside of, but proximate to, the tie opening 60. Two of these contact locations 68 are on one side of the insulation layer 62 and the other two of the contact locations 68 are on the opposite side of the insulation layer 62. As previously described, the end portions 50 of each extension member 16, 22 are enlarged relative intermediate portions of the extension members 16, 22. Such an enlargement provides for the heel 52 to engage a surface of the insulation layer 62 and the toe 54 to extend outwardly from the surface of the insulation layer 62.

In certain embodiments, as shown in FIGS. 10-11, the rounded outer profiles of the barriers 38 of each of the hubs 14, 20 substantially conform to a cross-sectional shape of the tie opening 60. When the tie system 10 is received in the tie opening 60 and placed in the expanded configuration, the hubs 14, 20, including the barriers 38, fill up a substantial portion of the cross-sectional area of the tie opening 60. Such filling up being due, in part, to the barriers 38 of the first and second hubs 14, 20 being more closely aligned with one another when the tie system 10 is in said expanded configuration (i.e., FIGS. 10-11) than when the tie system 10 is in said collapsed configuration (i.e., FIGS. 8-9). In certain embodiments, the hubs 14, 20, including the barriers 38, fill at least 70%, 80%, 90%, or 100% of the cross-sectional area of the tie opening 60 when the tie system 10 is in the expanded configuration. By filling up a substantial portion of the cross-section area of the tie opening 60, the barriers 38 are configure to thermally isolate layers of concrete that will be placed on opposite sides of the insulation layer 62.

To further enhance the thermal isolation properties of the tie system 10, it is preferred for the barriers 38, the hubs 14, 20, and/or the entire tie system 10 to be formed of, or coated with, a material having a thermal conductivity that is less than steel, preferably less than concrete. For instance, the barriers 38, the hubs 14, 20, and/or the entire tie system 10 may be formed of, or coated with, a material having a thermal conductivity less than 10, 5, 1, 0.5, or 0.1 W/(m·K). In some embodiments, the barriers 38, the hubs 14, 20, and/or the entire tie system 10 may formed from a synthetic resin, such as an epoxy. In further embodiments, the synthetic resin may include reinforcing fibers, such as glass fibers and/or carbon fibers.

Figure 12:
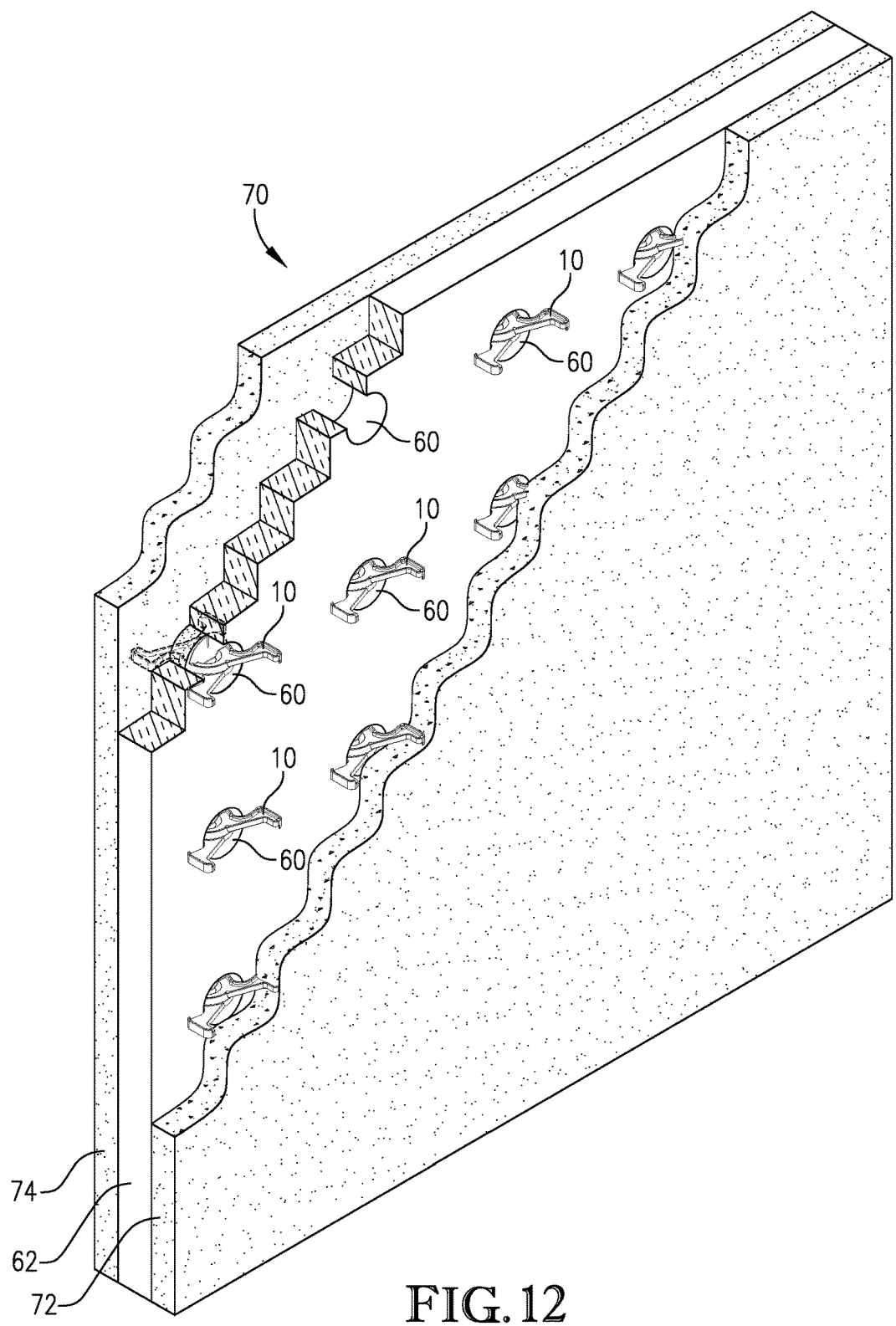
FIG. 12 is an illustration of an insulated concrete panel formed from an insulation layer, a top layer of concrete, a bottom layer of concrete, and a plurality of the tie systems from FIGS. 1-6.

As illustrated in FIG. 12, after the tie system 10 has been inserted into a tie opening 60 of an insulation layer 62, and after the tie system 10 has been shifted into the expanded configuration so as to engage the insulation layer 62, an insulated concrete panel 70 can be manufacture by pouring top and bottom concrete layers 72, 74 on opposite sides of the insulation layer 62. The insulated concrete panel can have a variety of sizes. For some insulated concrete panels, tie systems 10 will be positioned throughout the insulated concrete panels approximately every 8 to 10 square feet (FIG. 12 may not be drawn to scale, but is provided for illustration of an insulated concrete panel having a plurality tie systems 10 included therein). In some cases of high loading, the tie systems 10 will need to be positioned closer together. Typical insulated concrete panels can include between 10 to 100, between 20 to 80, or between 25 to 40 tie systems 10 within each insulated concrete panel. In some embodiments, the plurality of tie systems 10 can be arranged in rows or columns that are aligned along a longitudinal or transverse direction of the insulated concrete panel 70 or at any other angle as deemed necessary by an engineer. Furthermore, each of the individual tie systems 10 can be aligned (i.e., the first and second end sections 64, 66 can be aligned) along a longitudinal or transverse direction of the insulated concrete panel 70 or at any other angle as deemed necessary by an engineer. In other embodiments, outer panels, such as facades may be positioned exterior of the top and bottom layers of concrete 72, 74.

With continued reference to FIG. 12, to form the insulated concrete panel 70, the bottom layer of concrete 74 is poured in a concrete form. Immediately following pouring the bottom layer of concrete 74, the insulation layer 62 with tie systems 10 coupled thereto can be lowered into engagement with the bottom layer of concrete 74. The end portions 50 of the tie systems 10 that extend down from a bottom surface of the insulation layer 62 become inserted into and embedded in the bottom layer of concrete 74. The bottom surface of the insulation layer 62 may be inserted within at least a top surface of the bottom layer of concrete 74. Reinforcement in the form of rebar, steel mesh, or prestress strand may also be inserted into the bottom layer of concrete 74. In some cases the tie systems 10 may need to be turned in the tie opening 60 or even relocated a few inches away, so as to avoid contact with any such reinforcements. The tie system 10 may be flexible enough to accommodate such turning and/or relocation.

Subsequent to placing the insulation layer 62 and tie systems 10 on and/or in the bottom layer of concrete 74, the top layer of concrete 72 can be poured on a top surface of the insulation layer 62. When the top layer of concreted 72 is poured, the end portions 50 of the tie systems 10 that extend up from the top surface of the insulation layer 62 become embedded in the top layer of concrete 72. During pouring of the top layer of concrete 72, the barriers 38 of the tie systems 10 inhibit passage of concrete from the top layer 72 entirely through the tie opening 60 in the insulation layer 62 and into contact with the bottom layer of concrete 74. As such, a continuous air void can be maintained in the tie opening 60, above the bottom layer of concrete 74 and below the barriers 38. In some embodiments, however, at least a portion of the tie opening 60 will be filled with concrete from the first and/or second layers of concrete 72, 74. Nevertheless, embodiments provide for at least 10%, 20%, 30%, or 40% of a volume of the tie opening 60 to be filled with the air void. Such an air void improves thermal isolation between the top and bottom layers of concrete 72, 74, even with such top and bottom layers 72, 74 being indirectly connected via the tie systems 10.

As such, embodiments of the present invention include an insulated concrete panel 70 comprising: an insulation layer 62 with a tie opening 60 extending therethrough, first and second concrete layers 72, 74 disposed on generally opposite sides of the insulation layer 62, and at least one tie system 10 interconnecting the concrete layers. As discussed above, the tie system 10 may comprise: hubs 14, 20 (collectively, a "hub portion") at least partly receive in the tie opening 60 of the insulation layer 62, a first end section 64 at least partly embedded in the first concrete layer 72, and a second end section 66 at least partly embedded in the second concrete layer 74, with the tie system 10 being capable of shifting from a collapsed configuration, in which a maximum width Wc of the first and second end sections 64, 66 is less than a maximum width Wo of the tie opening 60, to an expanded configuration, in which the maximum width Wc of the first and second end sections 64, 66 is greater than the maximum width Wo of the tie opening 60.

Figure 13:
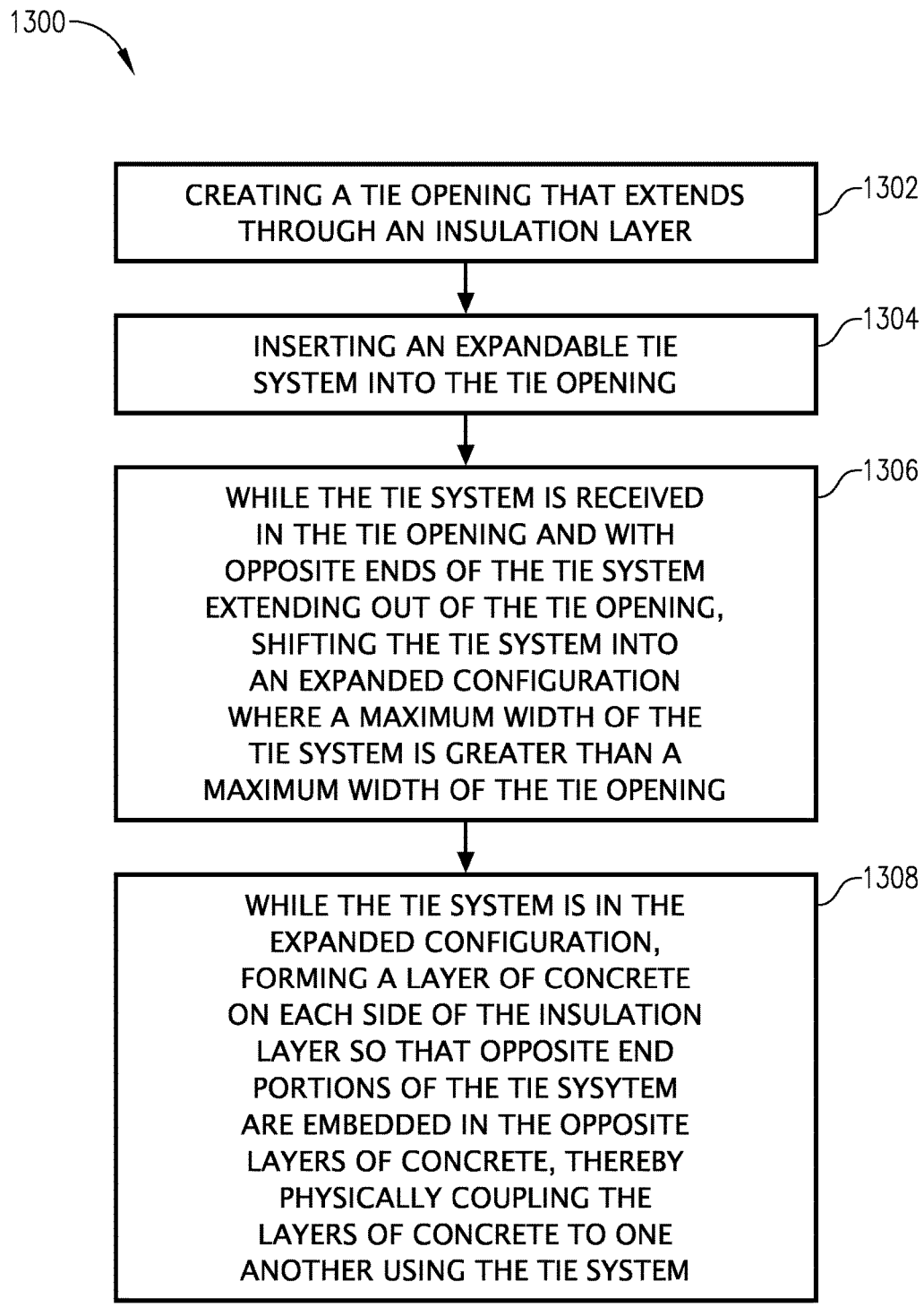
FIG. 13 is a flow chart illustrative of a method for making an insulated concrete panel according to embodiments of the present invention.

Thus, as illustrated in FIG. 13, embodiments of the present invention include a method 1300 of making an insulated concrete panel. The method 1300 includes the initial Step 1302 of creating a tie opening that extends through an insulation layer. A next Step 1304 includes inserting an expandable tie system into the tie opening. Thereafter, in Step 1306, while the tie system is received in the tie opening and with opposite ends of the tie system extending out of the tie opening, shifting the tie system into an expanded configuration where a maximum width of the tie system is greater than a maximum width of the tie opening. In final Step 1308, while the tie system is in the expanded configuration, a layer of concrete is formed on each side of the insulation layer so that opposite end portions of the tie system are embedded in the opposite layers of concrete, thereby physically coupling the layers of concrete to one another using the tie system. Once the top and bottom layers of concrete 72, 74 have at least partially cured, the concrete form(s) (if used) can be removed and the concrete insulation panel 70 is prepared to be lifted and or shipped to a jobsite for installation.

As illustrated in the drawings, the tie systems 10 are generally formed so as to present an "X" shape with an intersection of the X-shape being located at the hubs 14, 20. The "X" shape of the tie systems 10 allows for the tie systems 10 to effectively transfer shear forces between the layers of concrete 72, 74 without deforming the insulation layer 62 therebetween. As such, the resulting insulated concrete panel 70 is configured as a composite panel. The tie system 10 is also configured to act as a tension member that will prevent the top and bottom layers of concrete 72, 74 from delamination during lifting and shipping. Further, as mentioned, the insulated concrete panel 70 can be reinforced with rebar, steel mesh, post tension cables, prestress strand, or a combination of reinforcement as needed by the particular job requirements so as to further reinforce the insulated concrete panel 70.

Multi-Material Tie Device and System

Embodiments of the present invention provide for an additional embodiment of a tie system, which is illustrated as tie system 80 in FIGS. 14-15. The additional tie system 80 functions in substantially the same manner as the tie system 10 depicted in FIGS. 1-13; however, each structural member 12, 18 of the additional tie system 80 is formed from more than one material. In more detail, in the additional tie system 80 depicted in FIGS. 14-15, a material of construction of each of the tie system's 80 hubs 14, 20 is different that a material of construction of each of the extension members 16, 22. Specifically, the extension members 16, 22 may be separable from the hubs 14, 20, respectively.

For example, each of the extension members 16, 22 may include a base 82 comprising extension connection elements 84. In certain embodiments, such connection elements 84 of the extension members 16, 22 will further include protrusions 88 (See FIG. 15). Correspondingly, each of the hubs 14, 20 may include connection elements 86. Such connection elements 86 of the hubs 14, 20 may be formed with cavities 90 (See FIG. 14). In such embodiments, the protrusions 88 may be configured to be received within the cavities 90, such that the extension members 16, 22 can be removable secured to the hubs 14, 20.

Given the above, each of the extension members 16, 22 can be formed of a material of high thermal conductivity (e.g., steel), while each of the hubs 14, 20 can be formed of a material of low thermal conductivity (e.g., a synthetic resin or fiber-reinforced composite material). Such a configuration allows for an ultra-high strength, thermally conductive material to be used for the extension members 16, 22 (for transmitting shear forces though a relatively small section), and for a thermally insulating material to be used for the hubs 14, 20 (for inhibiting heat transfer). In certain embodiments, the high strength material (e.g., steel) used for the extension members 16, 22 will provide for the tie systems 80 to have a tensile strength of at least 10,000 psi. The insulating material used for the hubs 14, 20 may include a synthetic resin, such as an epoxy. In some embodiments, a ratio of the thermal conductivity of the material used in the extension members 16, 22 to the material used for the hubs 14, 20 can be at least 2:1, at least 5:1, at least 10:1, or at least 50:1. For instance, the thermal conductivity of the extension members 16, 22 can be at least 1, at least 5, at least 10, or at least 20 W/(m·K), while the thermal conductivity of the hubs 14, 20 can be less than 5, less than 2, less than 1, less than 0.5, or less than 0.1 W/(m·K).

As shown in FIGS. 14-15, the inwardly-facing side 30 of the first structural member 12 can include one or more positioning nubs 92 (See FIG. 14), while the inwardly facing side 30 of the second structural member 18 can be configured with a plurality of spaced-apart positioning notches 94 (See FIG. 15). The positioning notches 94 are sized and located to receive the positioning nubs 92 as the first and second structural members 12, 18 are rotated relative to one another. When the positioning nubs 92 are received in the positioning notches 94, relative rotation of the first and second structure members 12, 18 is inhibited. As with the previously-described ribs 34, having a plurality of positioning notches 94 at different locations enables the first and second structural members 12, 18 of the additional tie system 80 to be "locked" in various relative rotational positions. As such, the additional tie system 80 can be used with insulation layers of varying thickness.

In certain embodiments, the extension members 16, 22 are manufactured first and then placed in a mold for connection with the hubs 14, 20 while the hubs 14, 20 are being manufactured. In this manner, the hubs 14, 20 can be formed around connection elements 84 at the base 82 of each extension member 16, 22 to ensure a strong and secure connection between the extension members 16, 22 and the hubs 14, 20. When the hubs 14, 20 are formed of a synthetic resin material, the extension members 16, 22 can be coupled to the hubs 14, 20 by first inserting the bases 82 of the extension members 16, 22 into a mold (e.g., an injection molding form) and then introducing the synthetic into the form so that the resin surrounds the connection elements 84 at the base 82 of the extension members 16, 22. If it is desired for the hub to be formed of a fiber-reinforce composite material, the reinforcing fibers can be placed in the mold before and/or during addition of the synthetic resin. In other embodiments, the extension members 16, 22 and hubs 14, 20 can be separately manufactured and then later attached to one another via any know fastening mechanisms such as, for example, screws, bolts, press-fitting, etc.

In further embodiments, each of the four extension members 16, 22 that make up the additional tie system 80 can have an identical configuration, thereby reducing manufacturing costs. Additionally, each of the two hubs 14, 20 of the additional tie system 80 can initially be manufactured with an identical configuration and then later modified to mate with one other. For example, both hubs 14, 20 of the additional tie system 80 can be being identically manufactured with the hub recess 26 and no hub projection 24. As such, when both hubs 14, 20 are identically manufactured with a hub recess 26, a separately manufactured hub projection 24 can be inserted (e.g., press-fit) into one of the hub recesses 26 after initial manufacturing of the hubs 14, 20, thus allowing one of the hubs 14, 20 to be provided with a hub projection 24 that can be matingly received in the hub recess 26 of the other hub 14, 20.

As previously described, the extension members (e.g., 16 or 22) can be formed of a metallic material, such as steel. Although not illustrated in the drawings, in certain embodiments, the extension members (e.g., 16 or 22) may be formed by cutting an initial flat elongated member from a large sheet and then bending the flat member into the final shape of an extension member (e.g., 16 or 22). Such cutting may include stamping the elongated flat member out of the metallic sheet. The bending forms the perimeter sidewalls 42 at the outer perimeter of the extension members (e.g., 16 or 22) and also forms the connection elements 84 at the base 82 of the extension members (e.g. 16, 22). As such, the two extension members (e.g., 16 or 22) can be rigidly connected via a hub (e.g., 14 or 20).

For instance, in some embodiments, the hub (e.g., 14 or 20) can be formed around the base 82 of the extension members (e.g., 16 or 22) so that said base 82 of each of the extension members (e.g., 16 or 22) is at least partly embedded in the hub (e.g., 14 or 20). In more detail, the base 82 of each of the extension members (e.g., 16 or 22) may be placed in a hub form and thereafter the hub form may be filled with a synthetic resin to thereby form the hub (e.g., 14 or 20). As previously described, the synthetic resin may include an epoxy. In further embodiments, reinforcing fibers (e.g., glass fibers and/or carbon fibers) can be included in the hub form before and/or during filling of the hub form with said synthetic resin. Furthermore, in some embodiments the hub (e.g., 16 or 22) may include a hub recess 26. As such, a hub projection 24 may be inserted into the hub recess 26 and attached to the hub recess 26 via press-fitting.

The previously-described bending of the flat members forms the perimeter sidewalls 42 which may be bent substantially perpendicular to the main sidewall 40 of the extension members (e.g., 16 or 22). As such, an open void 44 is defined within the perimeter sidewalls 42 of the extension members (e.g., 16 or 22). In certain embodiments, the bending further forms the connection elements 84 at the base 82 of the extension members (e.g., 16, 22), with such connection elements 84 being used to secure the extension members (e.g., 16, 22) to the hub (e.g., 14 or 20), as previously described.

The multi-material tie system shown in FIGS. 14-15 can be used to form an insulated concrete panel 70 in the same manner as describe above with respect to the single-material tie system shown in FIGS. 1-13. Thus, a description of how the multi-material tie system is positioned into the insulation layer 62 and then used to connect top and bottom concrete layers 72, 74 on each side of the insulation layer 62 is the same as described above for tie system 10.

Although the invention has been described with reference to the embodiments illustrated in the attached drawing figures, it is noted that equivalents may be employed and substitutions made herein without departing from the scope of the invention as recited in the claims.

Additional Embodiments

In addition to the embodiments described above, embodiments of the present invention include a tie system 100, as illustrated in FIGS. 16-19, for use in forming an insulated concrete panel. The tie system 100 may be similar in many respects to the tie system 10 of FIGS. 1-6. For instance, any one or more of the dimensions, features, components, and functionalities of the tie system 10 may be applicable to and/or included within the tie system 100 illustrated in FIGS. 16-19. For instance, the tie system 100 may include the first structural member 12 comprising first hub 14 and pair of first extension members 16. The tie system 100 may also include the second structural member 18 comprising second hub 20 and pair of second extension members 22. In some embodiments, as illustrated in the drawings, the tie system 100 will have a generally C-shaped cross section. As with tie system 10, the first and second hubs 14, 20 of the tie system 100, are rotatably coupled with one other in a manner that permits rotation of the first and second structural members 12, 18 relative to one another about an axis of rotation extending through the first and second hubs 14, 20. As a result, the first and second structural members 12, 18 of the tie system 100 can be rotatably coupled to one another in a similar scissor-like configuration as the tie system 10 from FIGS. 1-6, such that the tie system 100 is capable of shifting between collapsed and expanded configurations.

Figure 16:
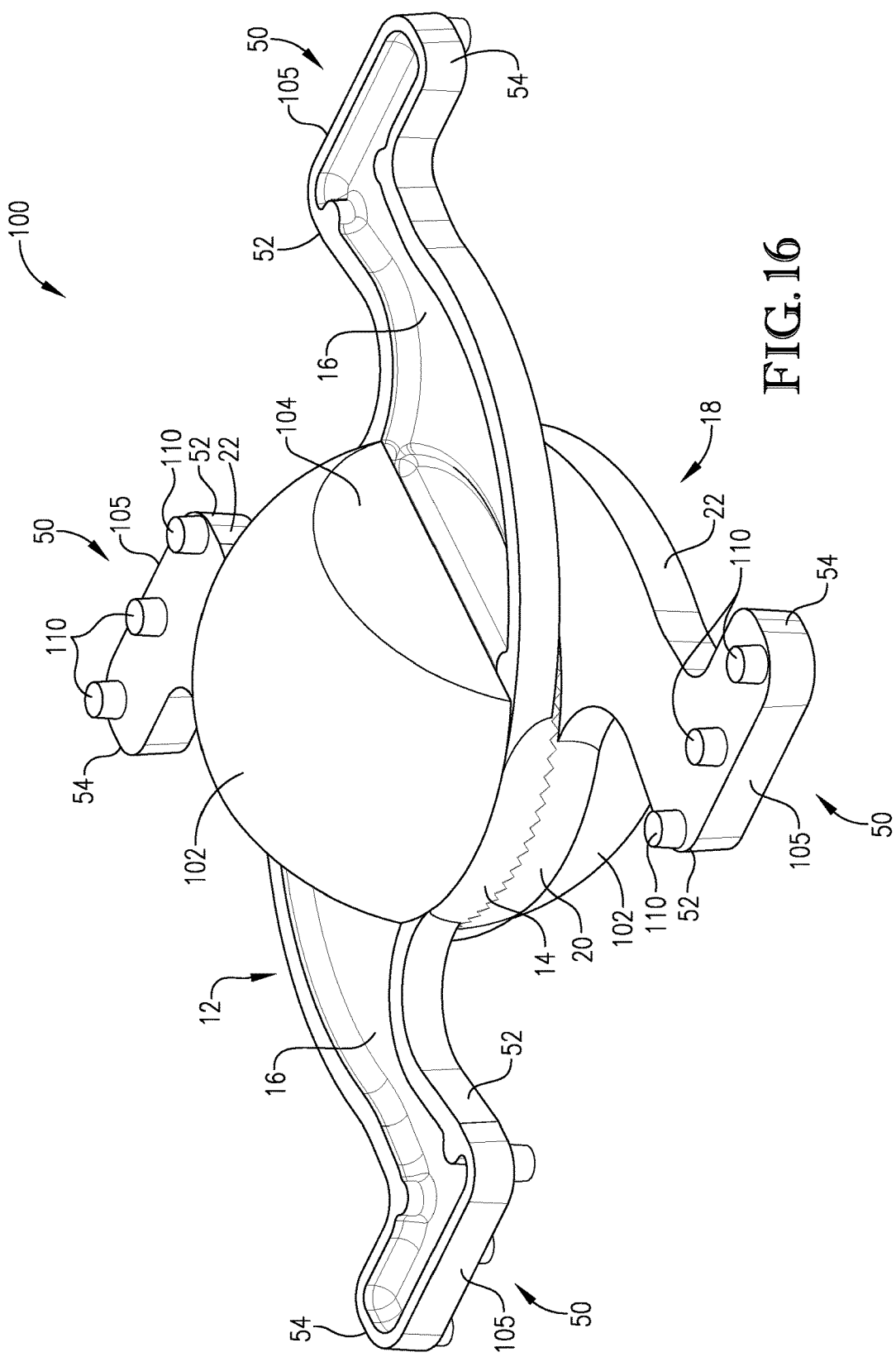
FIG. 16 is a top perspective view of a tie system according to embodiments of the present invention, with the tie system particularly illustrating spherical barriers extending from hub sections of the tie system.
Figure 17:
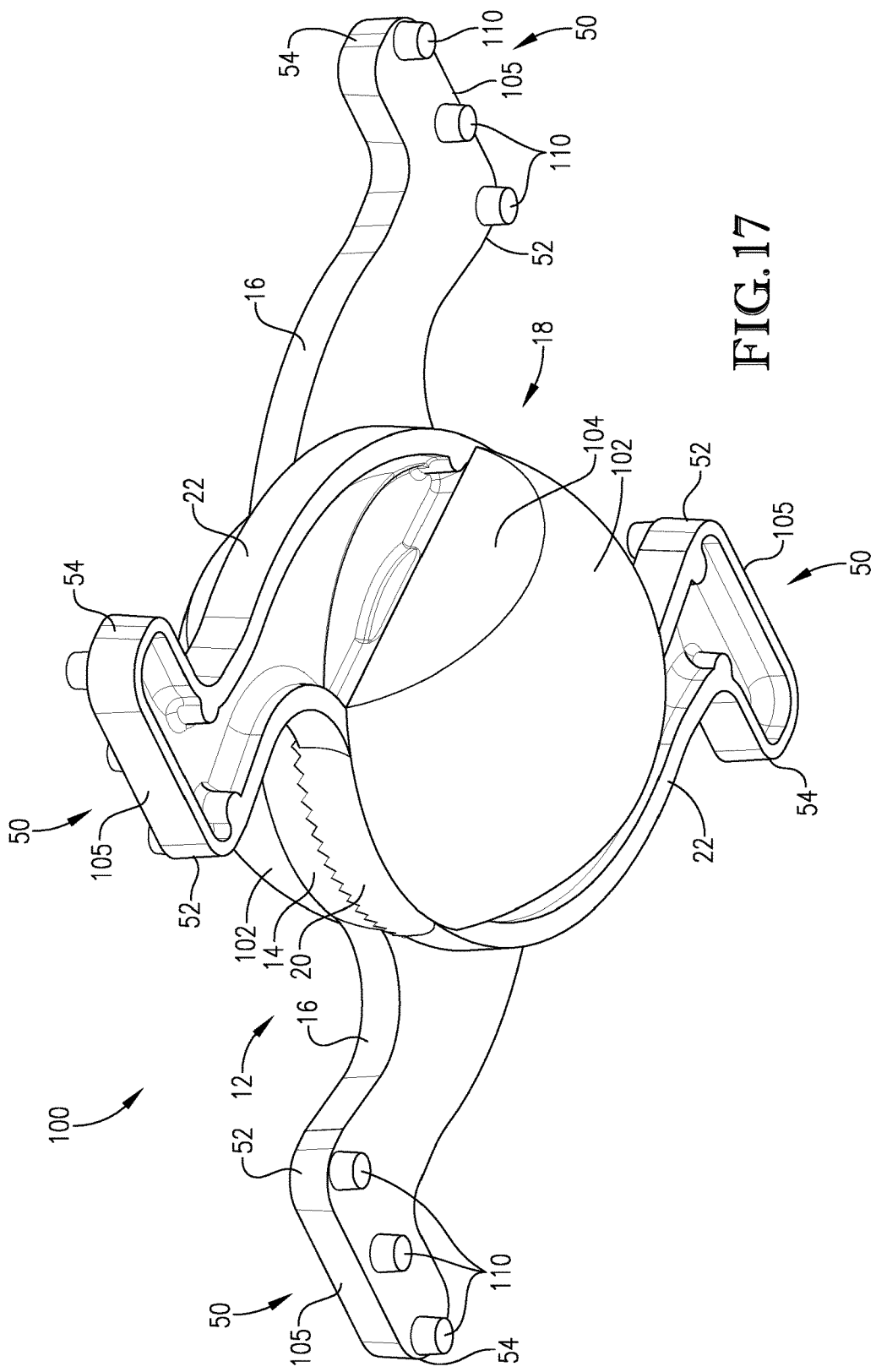
FIG. 17 is a bottom perspective view of the tie system of FIG. 16.
Figure 18:
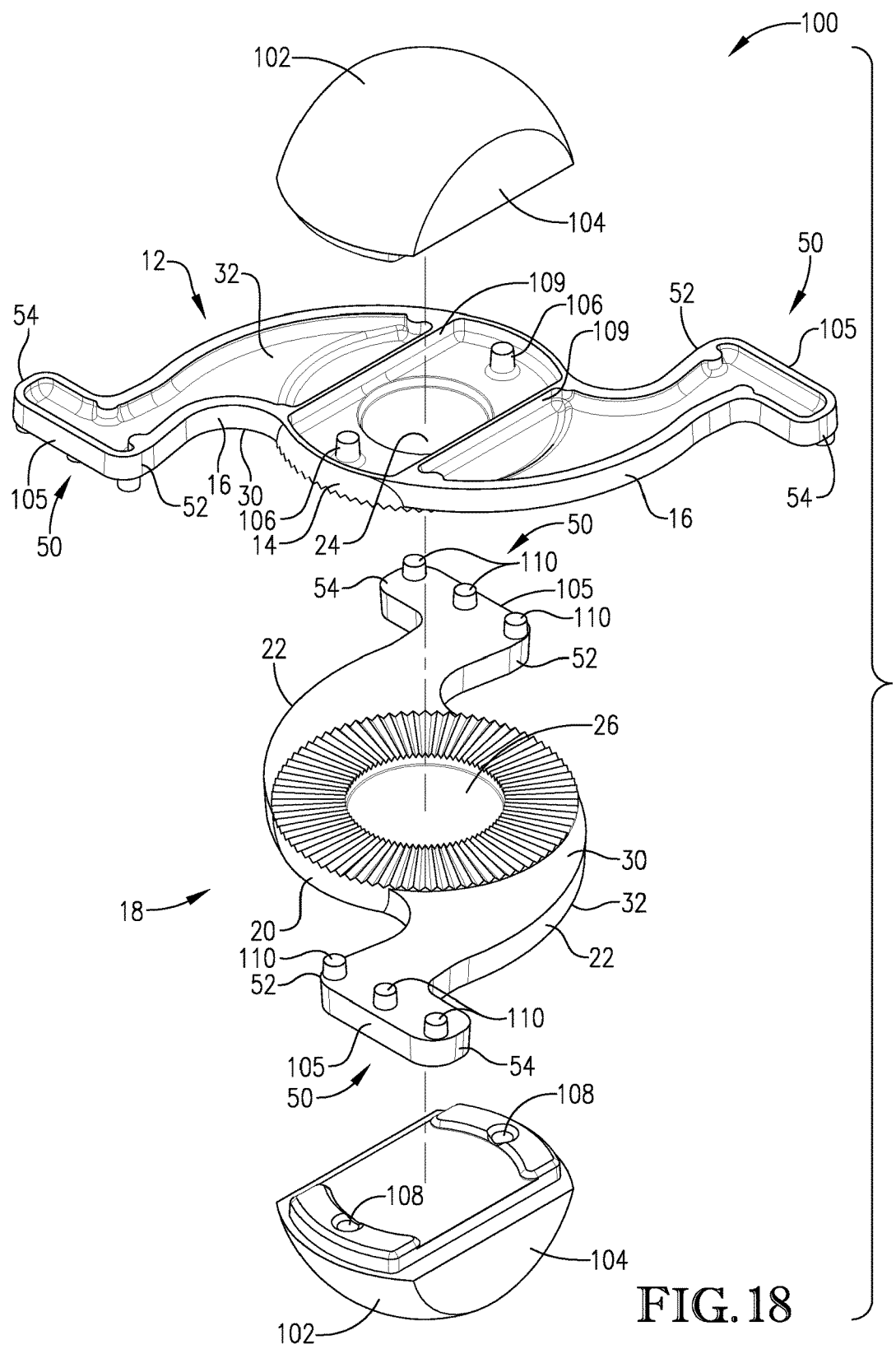
FIG. 18 is a top exploded view of the tie system of FIGS. 16-17.
Figure 19:
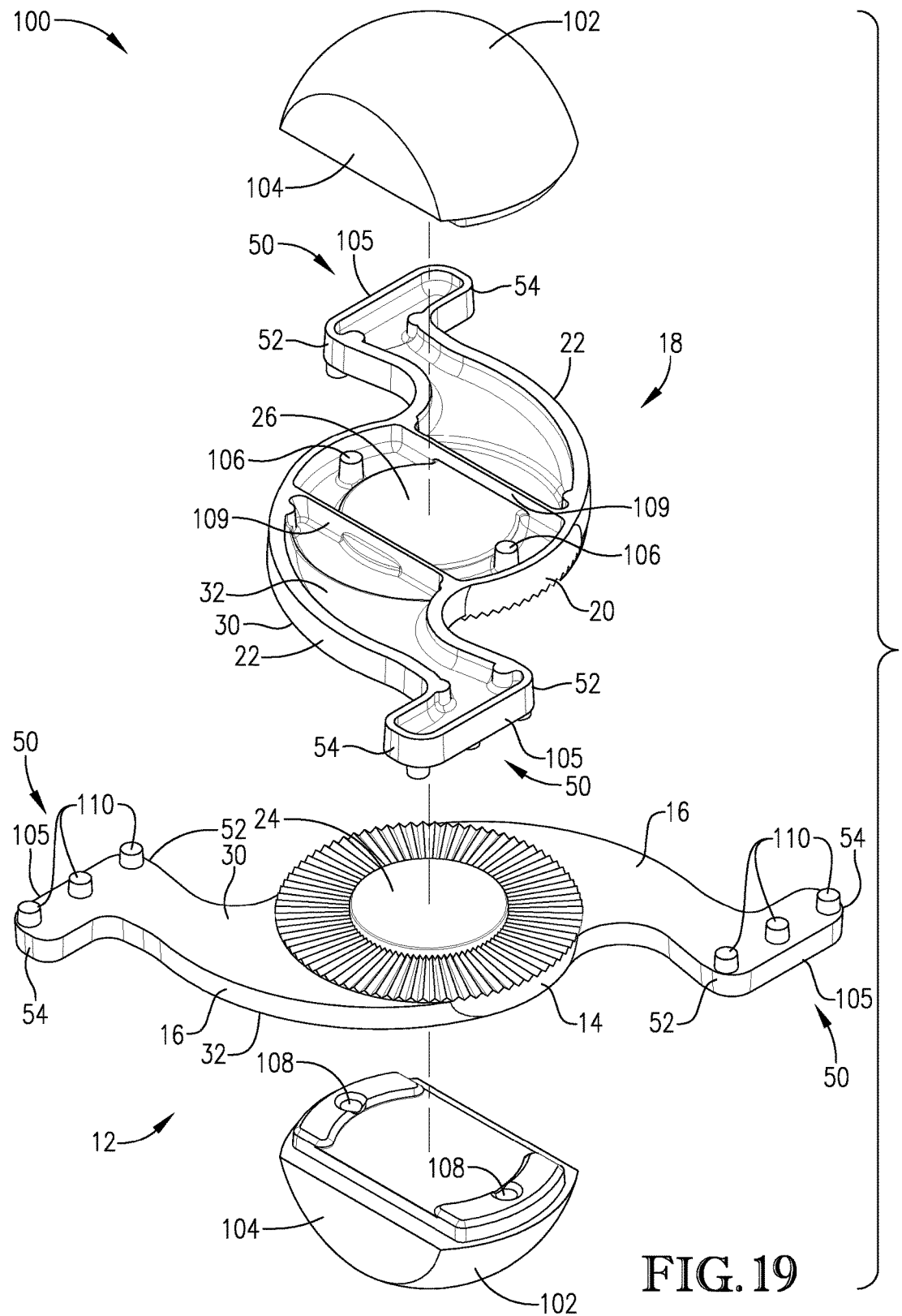
FIG. 19 is a bottom exploded view of the tie system of FIGS. 16-18.

Furthermore, with respect to the tie system 100 and as perhaps best illustrated by FIGS. 18 and 19, the hub 14 of the first structural member 12 may be equipped with hub projection 24, and the hub 20 of the second structural member 18 may be equipped with hub recess 26. In contrast to the tie system 10 illustrated in FIGS. 1-6, however, the hub recess 26 of tie system 100 may not extend entirely through the thickness of the second structural member 18. Instead, the hub recess 26 may extend only partially from inwardly-facing side 30 of the second structural member 18. As such, the outwardly-facing side 32 of the second structural member 18 may not have an openings extending entirely therethrough the hub 20. Nevertheless, the hub projection 24 and the hub recess 26 may be formed with complementary sizes, such that the hub projection 24 can be received within the hub recess 26 in the assembled configuration, such as shown in FIGS. 16-17. As such, the tie system 100 can be assembled by inserting the hub projection 24 into the hub recess 26. In such an assembled configuration, the receipt of the hub projection 24 in the hub recess 26 inhibits translation of the first and second structural members 12, 18, while permitting rotation of the first and second structural members 12, 18 relative to one another via the axis of rotation.

Embodiments of the present invention provide for one or more of the components of the tie system 100 to be formed from compression molding, in which the material of the tie system 100 is positioned within a steel form and placed under high temperatures (e.g., over 300 degrees Fahrenheit) and high pressures (e.g., over 100 tons). In some alternative embodiments, one or more components of the tie system 100 may be formed by injection molding. In some embodiments, the first and second structural members 12, 18 of the tie system 100 may formed from a resin, such as a vinyl resin. In some embodiments, the first and second structural members 12, 18 (including the hubs 14, 20) of the tie system 100 to be formed from and/or coated with a material having a thermal conductivity that is less than steel and less than concrete. For instance, the first and second structural members 12, 18 of the tie system 100 may be formed of, or coated with, a material having a thermal conductivity less than 10, 5, 1, 0.5, or 0.1 W/(m·K). In certain embodiment, the material will have a thermal conductivity of about 0.3 W/(m·K). In some embodiments, the resin may include reinforcing fibers, such as glass fibers and/or carbon fibers. In some embodiments, the first and second structural members 12, 18 of the tie system 100 may be formed from a material having between 15 to 65 or between 20 to 50 percent vinyl ester resins and between 35 to 85 or between 50 to 80 percent long glass fibers, such that the tie system 100 comprises a strong, alkali resistant composite. In some specific embodiments, the first and second structural members 12, 18 of the tie system 100 may be formed from a material having 35 percent vinyl ester resins and 65 percent long glass fibers. In certain embodiments, molding forms for each of the first and second extension members 12, 18 may be filled with the vinyl ester resin to thereby form the extension members 12, 18. In certain embodiments, reinforcing fibers (e.g., glass fibers and/or carbon fibers) can be included in the molding forms before and/or during filling of the molding form with the vinyl ester resin.

Additionally, in contrast to the tie system 10 that includes the generally planar barriers 38 illustrated in FIGS. 1-6, the tie system 100 may comprise spherical barriers 102 having a three-dimensional spherical shape. For instance, as illustrated by FIGS. 16-19, the barriers 102 may have the general form of a half-sphere. In other embodiments, the barriers 102 may have other shapes, such as a partial sphere, a partial oval, or the like. In some embodiments, the each of the barriers 102 may have portions their surfaces flattened so as to present planar side surfaces 104. The tie system 100 may include two barriers 102, with one operable to extend from the outwardly-facing sides 32 of each of the first and second structural members 12, 18. The barriers 102 may be positioned on the first and second structural member 12, 18, such that the side surfaces 104 are generally perpendicularly with an exterior surface 105 of the end portions 50 that connects the heel and toe portions 52, 54. The barriers 102 may not be integral with the first and second structural member 12, 18, such that the barriers 102 can be selectively engaged with and removed from the first and second structural member 12, 18. To accomplish such engagement, the first and second structural member 12, 18 may include protrusions 106 that extend from the outwardly-facing surfaces 32 of the hub portions of the first and second structural member 12, 18. Such protrusions 106 may be sized to form a friction fit with openings 108 formed through a portion of the barriers 102. As such, the protrusions 106 will be engaged with the openings 108 to secure the barriers 102 to the first and second structural member 12, 18. In some additional embodiments, each of the first and second structural member 12, 18 may also include one or more gussets 109 on the outwardly-facing surfaces 32 of the hubs 14, 20 of the first and second structural member 12, 18, with such gussets bounding a seating area for receiving the barriers 102. With the barriers 102 positioned within such seating areas, the gussets 109 may overlap at least a portion of the barrier 102 so as to provide a partial seal or a dam, for inhibiting fluid, liquid, or concrete from passing between the barriers 102 and the first and second structural members 12, 18.

The barriers 102 may be formed from materials that are different than the materials form which the first and second structural member 12, 18 are formed. Specifically, the barriers 102 may be formed from foam or other insulation type material, such extrude or expanded polystyrene, polyisocyanurate, expanded polyethylene, extruded polyethylene, or expanded polypropylene. Alternatively, the first and second structural member 12, 18 may be formed from various types of polymers. In further alternatives, the barriers 102 may be formed from the same material of which the insulation layers are formed (e.g., fiber-reinforced vinyl).

Finally, in contrast to the end walls 56 of the tie system 10, the tie system 100 may include one or more pegs 110 that extend out from the inner-facing surfaces 30 of the end portions 50 of the first and second extension members 16, 22 of the first and second structural member 12, 18. The pegs 110 are configured to facilitate engagement with concrete when portions of the first and second extension members 16, 22 are embedded in such concrete (as discussed in more detail below), so as to prevent pullout of the tie system 100 from the concrete. In some embodiments, the pegs 110 will extend from the inner-facing surfaces 30 in a tapered manner.

As with tie system 10, in a collapsed configuration, the tie system 100 can be inserted into an opening formed in an insulation layer used in an insulated concrete panel. In some embodiments, the insulation layer may comprise expanded or extruded polystyrene board. In other embodiments, the insulation layer can be formed from expanded polystyrene, polyisocyanurate, expanded polyethylene, extruded polyethylene, or expanded polypropylene. The insulation layers used in the insulated concrete panels may come in various standard sizes, such as insulation layers having thicknesses of about 2, 3, or 4 inches. After the tie system 100 has been inserted into the opening of the insulation layer, the tie system 100 can be transitioned to the expanded configuration and concrete can then be poured about the tie system 100 and both sides of the insulation layer for manufacturing the insulated concrete panel. The concrete used in the production of the insulated concrete panel can include fine and coarse aggregates and may comprise clean, hard, strong, and durable inert material, which is free of injurious amounts of deleterious substances. In some embodiments, the concrete should have a minimum twenty-eight day concrete strength of at least 2,000, at least 4,000, or at least 5,000 pounds per square inch.

In more detail, to initiate manufacture of an insulated concrete panel, the panel maker can select the unassembled first and second structural members 12, 18 and then connect them to one another, as previously described, by inserting the hub projection 24 of the first structural member 12 into the hub recess 26 of the second structural member 18. Next, a barrier 102 can be securely engaged with each of the first and second structural members 12, 18, such that the tie system 100 is assembled as shown in FIGS. 16-17. Thereafter, the tie assembly 100 can be inserted into a tie opening 60 that has been formed in an insulation layer 62 (e.g., a panel or a board) so as to manufacture an insulated concrete panel. The tie opening 60 may be formed in a generally cylindrically shape using a hand drill and a core bit as was previously described. The tie opening 60 may be formed spaced apart from a side edge of the insulation layer. Prior to insertion into the tie opening 60, the tie system 100 is shifted into a collapsed configuration, where it can then be inserted into tie opening 60 of the insulation layer 62. The tie system 100 is inserted until the hubs 14, 20 of the tie system are substantially centered in the tie opening 60. With the hubs 14, 20 substantially centered, the barriers 102 may also be substantially centered.

Figure 20:
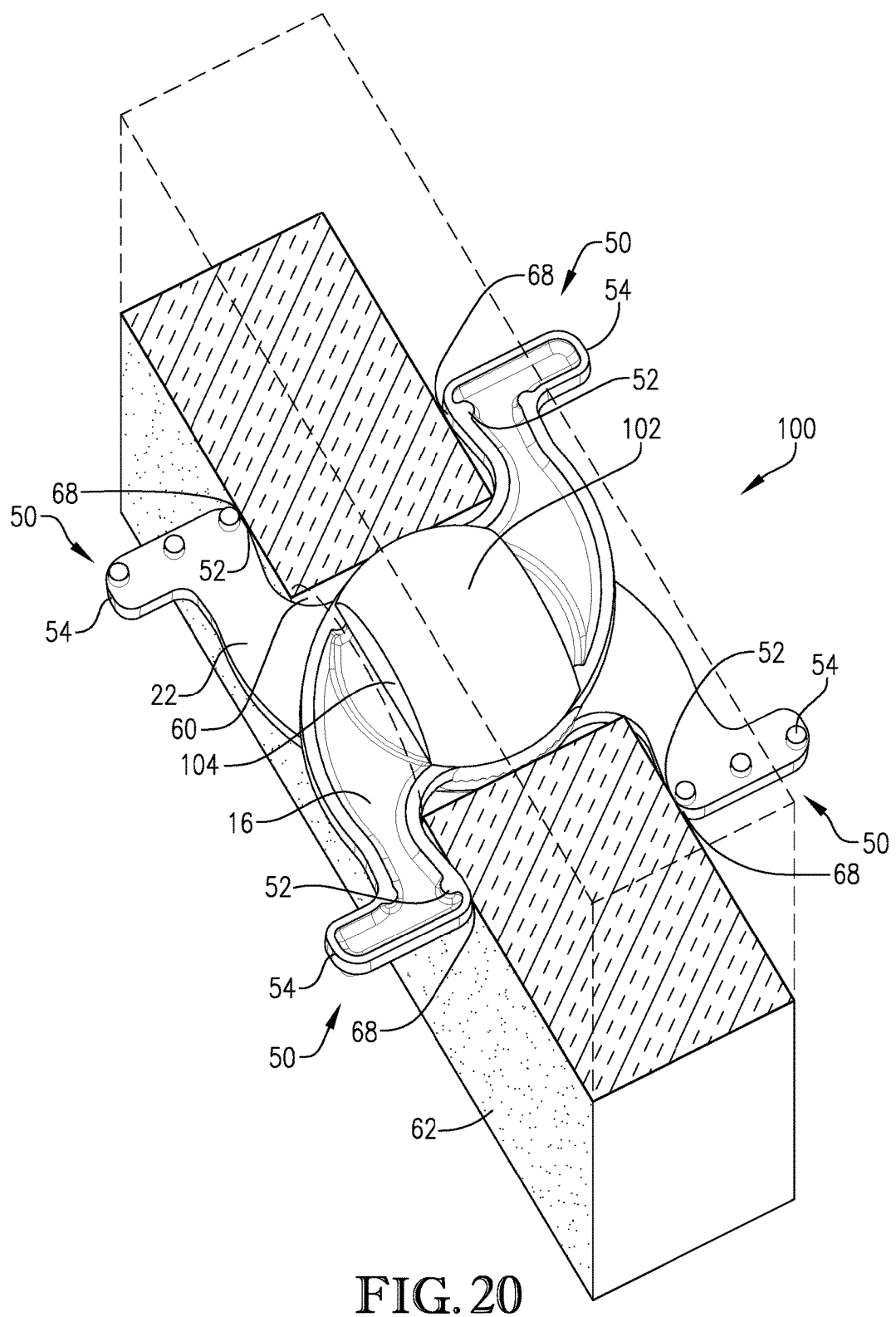
FIG. 20 is an illustration of the tie system of FIGS. 16-19 inserted into a tie opening of an insulation layer, with a portion of the insulation layer removed at a horizontal cross-section for clarity.
Figure 21:
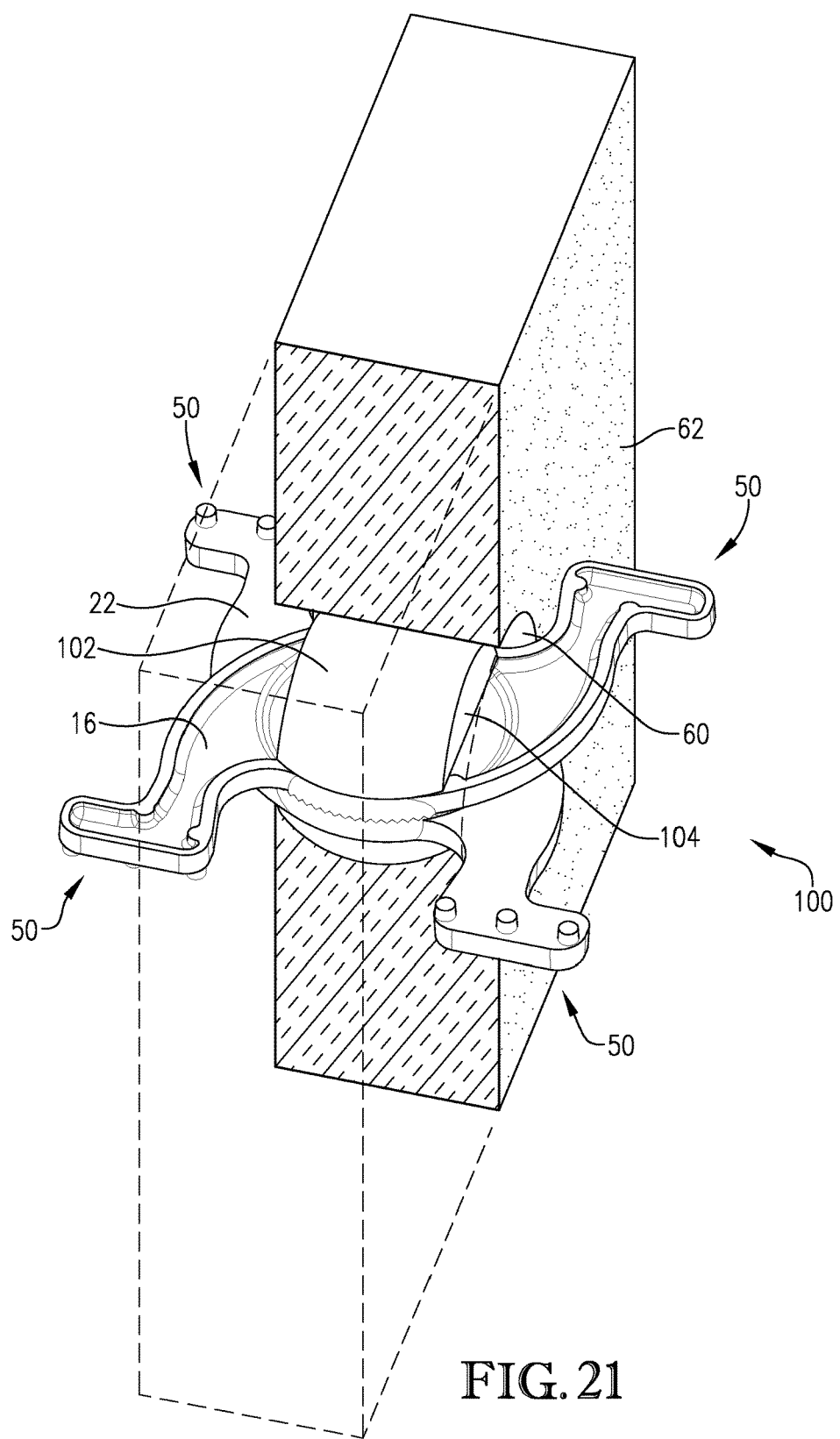
FIG. 21 is an illustration of the tie system of FIGS. 16-19 inserted into a tie opening of an insulation layer, with a portion of the insulation layer removed at a vertical cross-section for clarity.

With reference to FIGS. 20-21, once the hubs 14, 20 and the barriers 102 of the tie system 100 are received in the tie opening 60, the tie system 10 can be shifted into the expanded configuration. In the expanded configuration, the end portions 50 of the extension members 16, 22 engage and/or contact the insulation layer 62 in four contact locations 68 positioned outside of, but proximate to, the tie opening 60. Two of these contact locations 68 are on one side of the insulation layer 62 and the other two of the contact locations 68 are on the opposite side of the insulation layer 62. As previously described, the end portions 50 of each extension member 16, 22 are enlarged relative intermediate portions of the extension members 16, 22. Such an enlargement provides for the heel 52 to engage a surface of the insulation layer 62 and the toe 54 to extend outwardly from the surface of the insulation layer 62. Advantageously, the tie system 100 of embodiments of the present invention allows for self-centering of the ties system 100 within the tie opening 60 regardless of the thickness of the insulation layer 62. Particularly, with the tie system 100 in the collapsed configuration and at least partially inserted within the tie opening 60, the tie system 100 will automatically center itself when transitioned to the expanded configuration such that it can have each of its end portions 50 being engaged with the surfaces of the insulation layer 62.

As illustrated in FIGS. 20-21, with the end portions 50 engaged with the surfaces of the insulation layer 62, the side surfaces 104 of the barriers 102 will be generally parallel with the surfaces of the insulation layer 62. As such, the rounded outer profiles of the barriers 102 on each of the hubs 14, 20 will substantially conform to a cross-sectional shape of the tie opening 60. When the tie system 100 is received in the tie opening 60 and placed in the expanded configuration, the hubs 14, 20, including the barriers 102, fill up a substantial portion of the cross-sectional area of the tie opening 60. In certain embodiments, the hubs 14, 20, including the barriers 102, fill at least 80%, 90%, 95% or 100% of the cross-sectional area of the tie opening 60 when the tie system 100 is in the expanded configuration. By filling up a substantial portion of the cross-section area of the tie opening 60, the barriers 104 are configure to thermally isolate layers of concrete that will be placed on opposite sides of the insulation layer 62.

Figure 22:
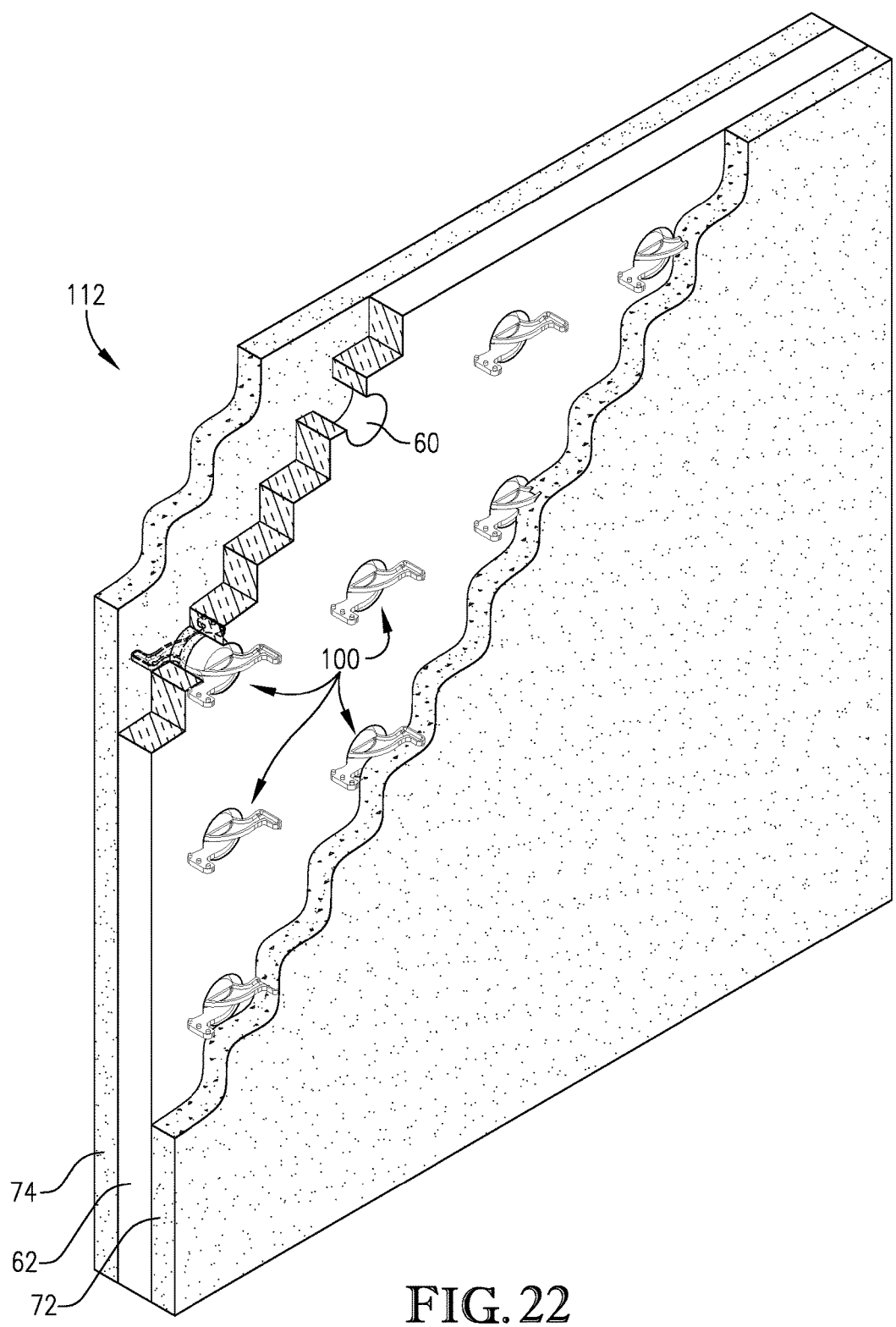
FIG. 22 is an illustration of an insulated concrete panel formed from an insulation layer, a top layer of concrete, a bottom layer of concrete, and a plurality of the tie systems from FIGS. 16-19.

As illustrated in FIG. 22, after the tie system 100 has been inserted into a tie opening 60 of an insulation layer 62, and after the tie system 100 has been shifted into the expanded configuration so as to engage the insulation layer 62, an insulated concrete panel 112 can be manufacture by pouring top and bottom concrete layers 72, 74 on opposite sides of the insulation layer 62. The insulated concrete panel 112 can have a variety of sizes and/or shapes. For some insulated concrete panels, tie systems 100 will be positioned throughout the insulated concrete panels approximately every 5 to 15 square feet, every 6 to 12 square feet, or every 8 to 10 square feet (FIG. 22 may not be drawn to scale, but is provided for illustration of an insulated concrete panel 112 having a plurality tie systems 100 included therein). Typical insulated concrete panels can include between 10 to 100, between 20 to 80, or between 25 to 40 tie systems 100 within each insulated concrete panel. In some embodiments, the plurality of tie systems 100 can be arranged in rows or columns that are aligned along a longitudinal or transverse direction of the insulated concrete panel 112 or at any other angle as deemed necessary by an engineer. Furthermore, each of the individual tie systems 100 can be aligned (i.e., end sections of the tie systems 100 can be aligned) along a longitudinal or transverse direction of the insulated concrete panel 70 or at any other angle as deemed necessary by an engineer. In other embodiments, outer panels, such as facades, may be positioned exterior of the top and bottom layers of concrete 72, 74.

With continued reference to FIG. 22, to form the insulated concrete panel 112, the bottom layer of concrete 74 is poured in a bottom concrete form (not shown). In some embodiments, the concrete form will have interlaced rows and/or columns of reinforcement materials, such as rebar, steel mesh, or prestress strand positioned therein so as to provide for additional support for the concrete panel 112. In some embodiments, the bottom layer of concrete 74 will undergo vibration to ensure proper settling of the concrete. Immediately following pouring the bottom layer of concrete 74, the insulation layer 62 with tie systems 100 inserted therein can be lowered into engagement with the bottom layer of concrete 74. The end portions 50 of the tie systems 100 that extend down from a bottom surface of the insulation layer 62 become inserted into and embedded in the bottom layer of concrete 74. In some embodiments, one or more of the ties systems 100 may need to be adjusted so as to avoid interference with reinforcements materials (e.g., rebar) that may be positioned in the bottom layer of concrete 74. Furthermore, pressure may be exerted on the insulation layer 62 (such as by walking on the insulation layer 62) so that the bottom surface of the insulation layer 62 will be inserted at least partially within a top surface of the bottom layer of concrete 74.

Subsequent to placing the insulation layer 62 and tie systems 100 on and/or into the bottom layer of concrete 74, a top concrete form (not shown) can be positioned over the insulation layer 62, and reinforcement materials can be positioned in the top form. Thereafter, the top layer of concrete 72 can be poured on a top surface of the insulation layer 62. In some embodiments, the top layer of concrete 72 will not be poured until the bottom layer of concrete 74 has time to cure, such as for at least three hours. When the top layer of concreted 72 is poured, the end portions 50 of the tie systems 100 that extend up from the top surface of the insulation layer 62 become embedded in the top layer of concrete 72. During pouring of the top layer of concrete 72, the barriers 102 of the tie systems 100 inhibit passage of concrete through the tie openings 60 in the insulation layer. As such, a separation can be maintained in the tie openings 60 between the top and bottom layers of concrete 72, 74. Such a separation enhances thermal isolation between the top and bottom layers of concrete 72, 74, even with such top and bottom layers 72, 74 being indirectly connected via the tie systems 100.

As illustrated in the drawings, the tie systems 100 are generally formed so as to present an X-shape with an intersection of the X-shape being located at the hubs 14, 20. The first and second structural members 12, 18 of the tie systems 100 provide for the effective transfer of shear forces and restriction of delamination forces between the layers of concrete 72, 74 without deforming the insulation layer 62 therebetween. Specifically, the first and second structural members 12, 18 are configured to act similar to web members of a truss, with the concrete panels acting as the flanges (i.e., truss cords). Thus, the first and second structural members 12, 18 are configured to transfer tensile and compressive forces between the layers of concrete 72, 74. In some embodiments, the tie system 100 is also configured to transfer bending moments. Furthermore, however, the hubs 14, 20 in particular are configured to act as interlocking shear plates capable of transferring shear forces and being moments between the first and second extension members 16, 22 and, thus, the layers of concrete 72, 74. For instance, the hub 14 is engaged with the hub 20, via the projection/hub recess 24, 26 and the ribs 34, such that the first and second structural members 12, 18 are configured to transfer shear forces and restrict delamination forces between the layers of concrete 72, 74. In particular, the tie system 100 is configured to transfer at least 500 pounds, at least 1,000 pounds, at least 2,000 pounds, at least 5,000 pounds, at least 10,000 pounds, at least 15,000 pounds, or at least 20,000 pounds and/or between 500 to 20,000 pounds, between 1,000 and 15,000 pounds, or between 2,000 and 10,000 pounds of shear force between the layers of concrete. In addition, the tie system 100 is configured to resist at least 500 pounds, at least 1,000 pounds, at least 2,000 pounds, or at least 4,000 pounds and/or between 500 to 4,000 pounds or between 1,000 and 2,000 pounds of delamination force between the layers of concrete. In addition, the tie system 100 is configured to include a tensile strength of at least 10,000 psi, at least 20,000 psi, at least 30,000 psi, at least 40,000 psi, at least 50,000 psi, or at least 60,000 psi and/or between 10,000 and 60,000 psi, between 20,000 and 50,000 psi, or between 30,000 and 40,000 psi. Furthermore, the tie system 100 is configured to include a tensile modulus of at least 1 million psi, at least 2 million psi, at least 3 million psi, at least 5 million psi, at least 6 million psi, or at least 8 million psi and/or between 1 to 8 million psi, between 2 to 6 million psi, or between 3 and 5 million psi.

As such, the resulting insulated concrete panel 112 is configured as a composite panel, in which the tie systems 100 prevent the top and bottom layers of concrete 72, 74 from delamination during lifting and shipping. Further, as mentioned, the insulated concrete panel 112 can be reinforced with rebar, steel mesh, post tension cables, prestress strand, or a combination of reinforcement as needed by the particular job requirements so as to further reinforce the insulated concrete panel 112.

Figure 23:
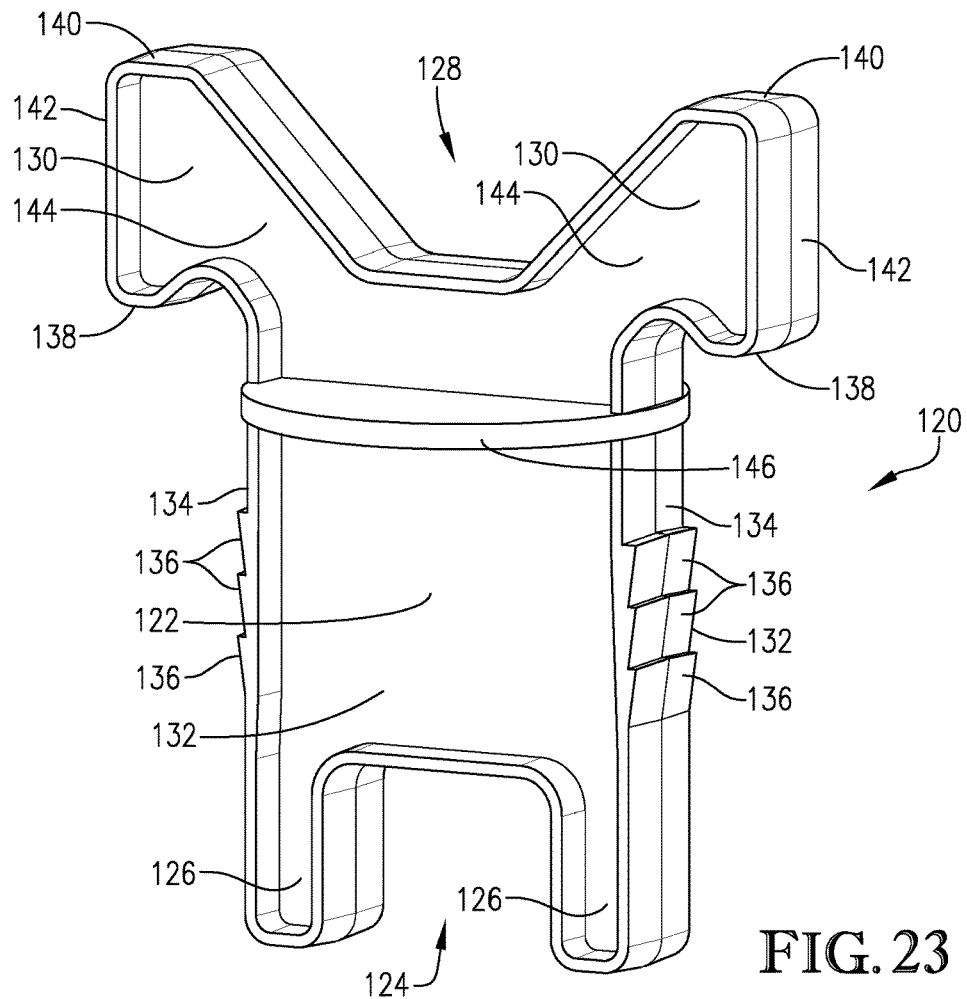
FIG. 23 is a front perspective view of a tie system according to embodiments of the present invention, with the tie system particularly illustrating a central section opposed by first and second concrete engaging sections.
Figure 24:
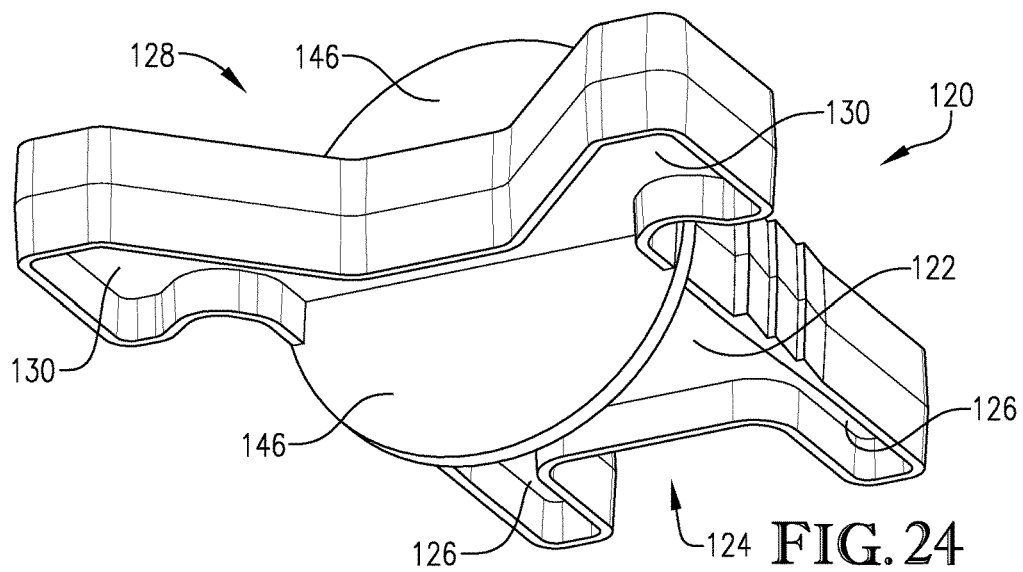
FIG. 24 is a top perspective view of the tie system of FIG. 23.

Embodiments of the present invention additionally comprise a tie system 120, as illustrated in FIGS. 23-24, for use in forming an insulated concrete panel. In contrast to the tie systems 10 and 100 described above, the components of the tie system 120 may be formed as integral, monolithic unit. In particular, the tie system 120 may comprise a central section 122, a first concrete engaging section 124 extending from a first end of the central section 122 and comprising first and second protrusion portions 126, and a second concrete engaging section 128 extending from a second end of said central section 122 and comprising first and second end portions 130. In some embodiments, as illustrated in the drawings, the tie system 120 will have a generally I-shaped cross section. As will be described in more detail below, the tie system 120 can be used in an insulated concrete panel to structurally connect layers of concrete separated by an insulation layer. Beneficially, the tie system 120 of embodiments of the present invention is configured to transfer shear forces and restrict delamination forces between such layers of concrete.

The central section 122 may be a shaped generally rectangular, so as to present opposite main surfaces 132, as well as opposite side surfaces 134. The central section 122 may have a length (i.e., a length of the side surfaces 134 between the first and second concrete engaging sections 124, 128) of between 2 to 6 inches, between 3 to 5 inches, or about 5 inches, a width (i.e., a distance between the side surfaces 134) of between 3 to 6 inches, between 4 to 5 inches, or about 4.5 inches, and a thickness (i.e., a distance between the main surfaces 132) of between about 0.5 to 3 inches, 1 to 2 inches, or about 1.5 inches. In some embodiments, the width of the central section 122 is dependent on a size of the opening in the insulation layer in which the tie system 120 will be positioned. In particular, and as will be described in more detail below, the central section 122 of the tie system 120 will be received within a tie opening in an insulation layer, such that the central section's 122 width will be the same size (or slightly smaller in size) as a diameter of such tie opening in the insulation layer. In some embodiments, the tie system 120 will be at least partially retained within the tie opening via a friction fit, such that the width of the central section 122 will be about the same size as the diameter of the tie opening. To further enhance the ability of the tie system 120 to be retained within the opening, certain embodiments of the present invention provide for the central section 122 to include one or more tapered shim elements 136 positioned on its side surfaces 134. In particular, the shim elements 136 may be tapered such that a portion of the shim elements 136 nearest the first end of the central section 122 extend from the side surfaces 134 less than a portion of the shim elements 136 nearest the second end of the central section 122 extends from side surfaces 134.

The first concrete engaging section 124 includes the first and second protrusion portions 126 that extend generally from the central section 122. The first and second protrusion portions 126 may extend from the central section 122 in a direction that is generally parallel with a longitudinal axis of the tie system 120. However, in other embodiments, the protrusion portions 126 may extend from the central section 122 at various different angles. In addition, the first and second protrusion portions 126 may be spaced apart from each other, such that the protrusion portions 126 have widths that are less than about one-half the width of the central section 122. As such, the first concrete engaging section 124 may have a maximum width that is generally the same as the maximum width of the central section 122, i.e., between 3 to 6 inches, between 4 to 5 inches, or about 4.5 inches. Beneficially, the maximum width of the first concrete engaging section 124 is configured to allow for insertion of the tie system 120 within an opening in an insulation layer, as is described in more detail below.

The second concrete engaging section 128 includes the first and second end portions 130 that extend from the central section 122 in a direction generally opposite the first and second protrusion portions 126 of the first concrete engaging section 124. In some embodiments, the end portions 130 may be configured and sized similar to the end portions 50 of tie systems 10 and 100. In such embodiments, the end portions 130 will include opposite heal and toe portions 138, 140. In certain embodiments, connecting surfaces 142 of the end portions 130 that connect each of the heel and toe portions 138, 140 will be generally parallel with the longitudinal axis of the tie system 120. In addition, the second concrete engaging section 128 may include extension arms 144 that connect the end portions 130 to the central portion 122. The extension arms 144 may extend from the central section 122 at an angle with respect to the longitudinal axis of the tie system 120. As such, the end portions 130 may extend out further from the longitudinal axis than the central section 122, such that a maximum width of the second concrete engaging section 128 is larger than a maximum width of the central section 122 and/or the first concrete engaging section 124. In particular, the end portions 130 may extend away from each other, such that the second concrete engaging section 128 has a width of between 4 to 8 inches, between 5 to 7 inches, or about 6 inches. Beneficially, the maximum width of the second concrete engaging section 128 is configured to inhibit rotation of the tie system 120 when it is positioned within an opening of an insulation layer, as is described in more detail below.

In some embodiments, as shown in FIGS. 23-24, the tie system 120 may include barriers 146 that extend generally perpendicularly from the main surfaces 132 of the central section 122. The barriers 146 may be positioned on the central section 122 adjacent to the second concrete engaging section 128. In some embodiments, the barriers 146 may present a rounded outer profile. The barriers 122 may each comprise a substantially planar member having two substantially flat sides. As such, the barriers 146 may each have the general shape of a half disk. In other embodiments, the barriers 146 may each have the general shape of a half sphere.

Embodiments of the present invention provide for the tie system 120 to be formed from and/or coated with a material having a thermal conductivity that is less than steel and less than concrete. For instance, the tie system 110 may be formed of, or coated with, a material having a thermal conductivity less than 10, 5, 1, 0.5, or 0.1 W/(m·K). In certain embodiment, the material will have a thermal conductivity of about 0.3 W/(m·K). In some embodiments, tie system 120 may formed from a resin, such as a vinyl resin. In further embodiments, the synthetic resin may include reinforcing fibers, such as glass fibers and/or carbon fibers. In some embodiments, the tie system 120 may be formed from a material having between 15 to 65 or between 20 to 50 percent vinyl ester resins and between 35 to 85 or between 50 to 80 percent long glass fibers, such that the tie system 120 comprises a strong, alkali resistant composite. In some specific embodiments, the tie system 120 may be formed from a material having 35 percent vinyl ester resins and 65 percent long glass fibers. Such a tie system 120 can be formed from compression molding, in which the material is placed within a steel form and placed under high temperatures (e.g., over 300 degrees Fahrenheit) and high pressures (e.g., over 100 tons). In other embodiments, the tie system 200 may be injection molded.

As with tie systems 10 and 100, the tie system 120 can be inserted into an opening formed in an insulation layer used in an insulated concrete panel. The insulation layer may comprise expanded or extruded polystyrene board. In other embodiments, insulation layers can be formed from expanded polystyrene, polyisocyanurate, expanded polyethylene, extruded polyethylene, or expanded polypropylene. The insulation layers may include standard sizes, such as insulation layer having 2, 3, or 4 inch thicknesses. After the tie system 120 has been inserted in the opening of the insulation layer, concrete can be poured about the tie system 120 and the insulation layer for manufacturing the insulated concrete panel. The concrete can include fine and coarse aggregates that comprise clean, hard, strong, and durable inert material, which is free of injurious amounts of deleterious substances. In some embodiments, the concrete should have a minimum twenty-eight day concrete strength of at least 2,000, at least 4,000, or at least 5,000 pounds per square inch.

Figure 25:
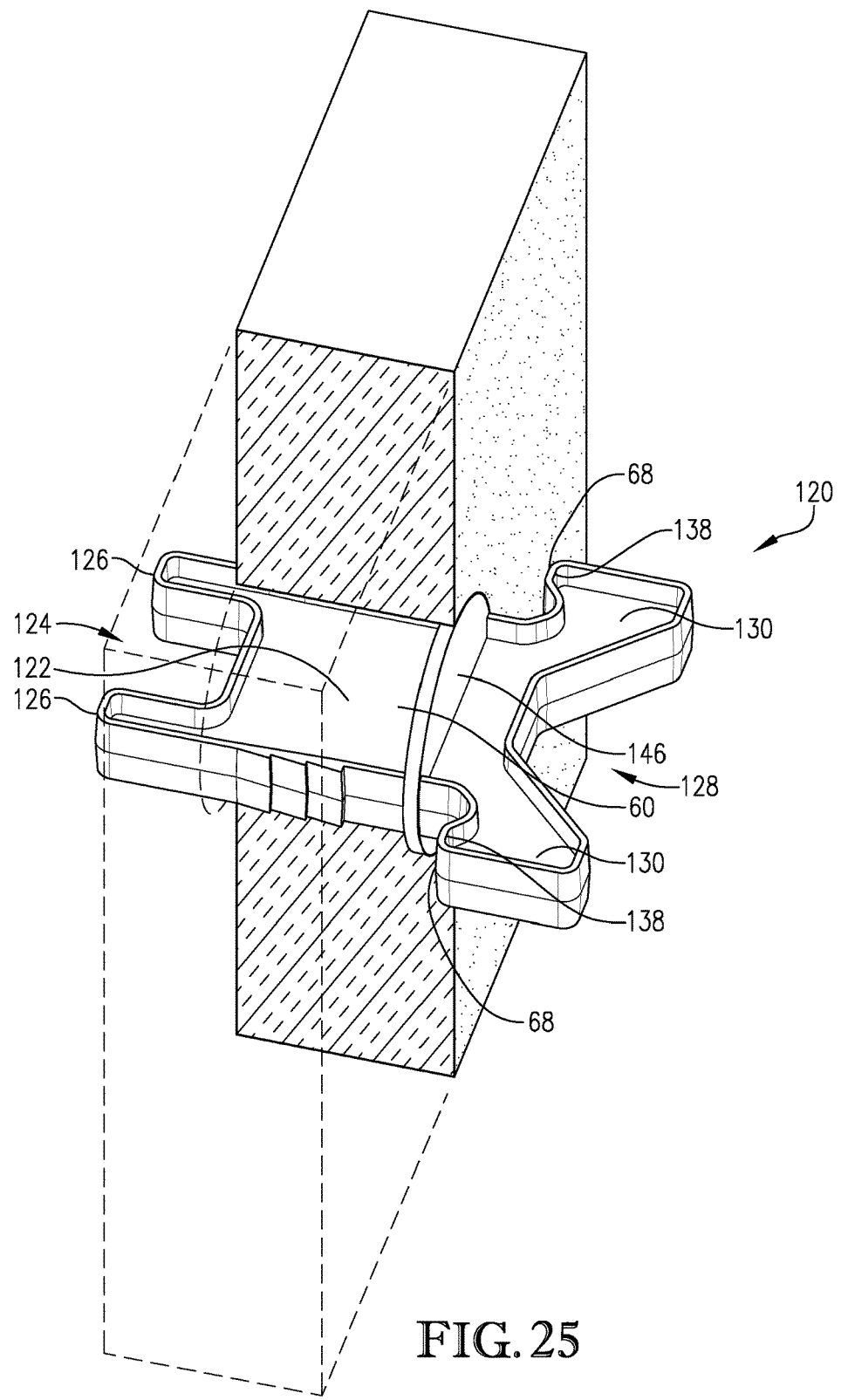
FIG. 25 is an illustration of the tie system of FIGS. 23-24 inserted into a tie opening of an insulation layer, with a portion of the insulation layer removed at a horizontal cross-section for clarity.
Figure 26:
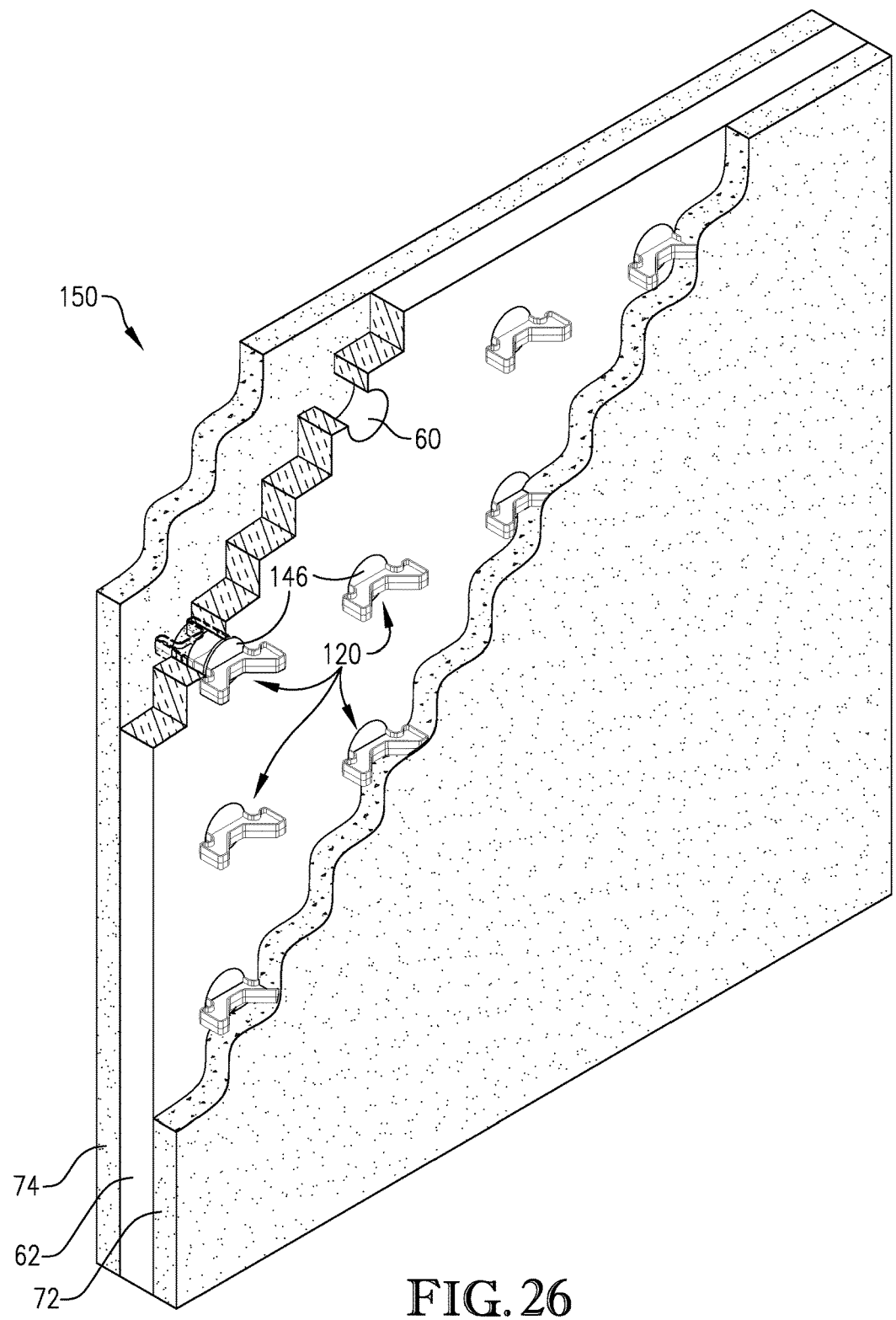
FIG. 26 is an illustration of an insulated concrete panel formed from an insulation layer, a top layer of concrete, a bottom layer of concrete, and a plurality of the tie systems from FIGS. 23-24.
Figure 27:
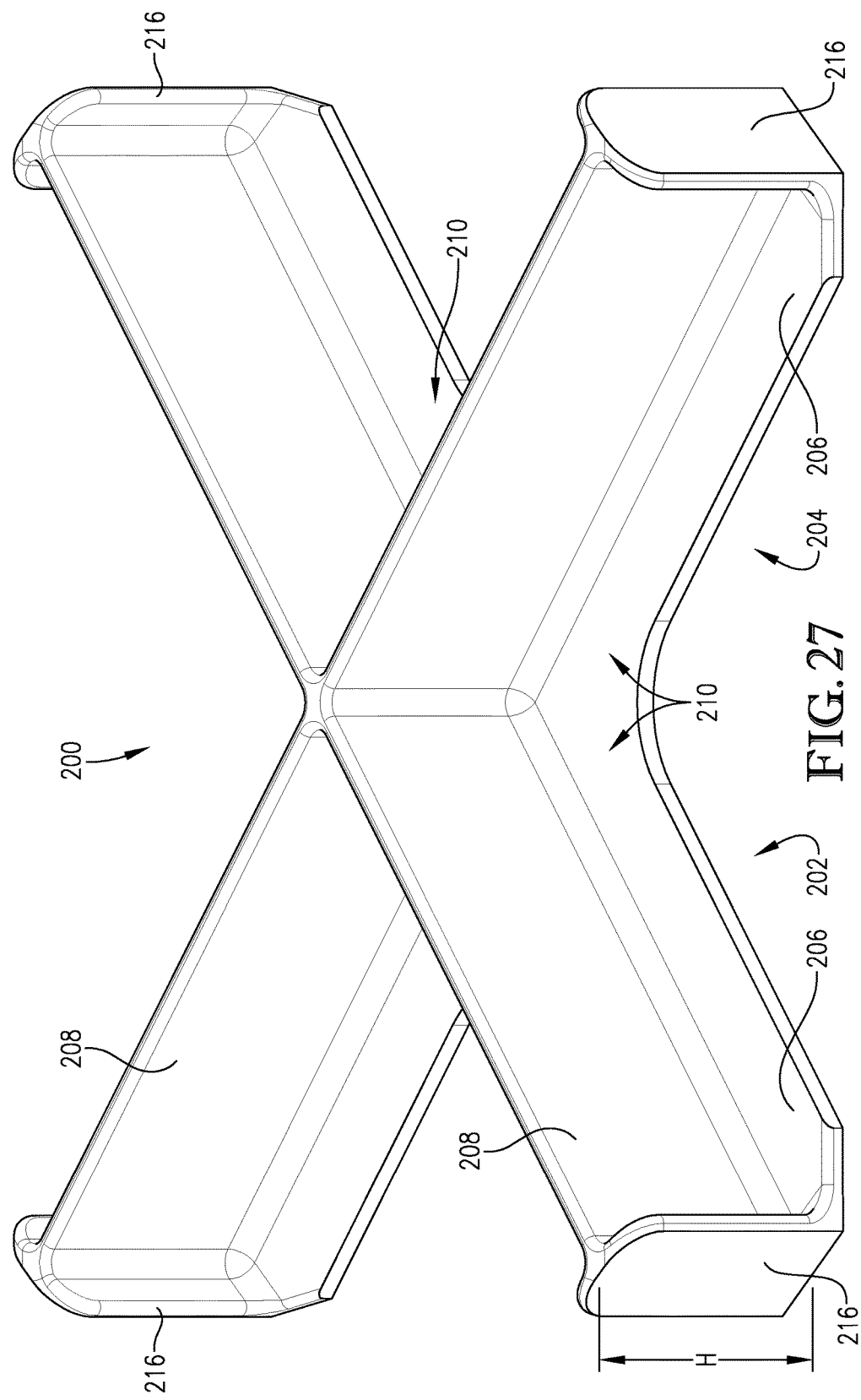
FIG. 27 is a perspective view of an X-shaped tie system with a T-shaped cross-section according to embodiments of the present invention.
Figure 28:
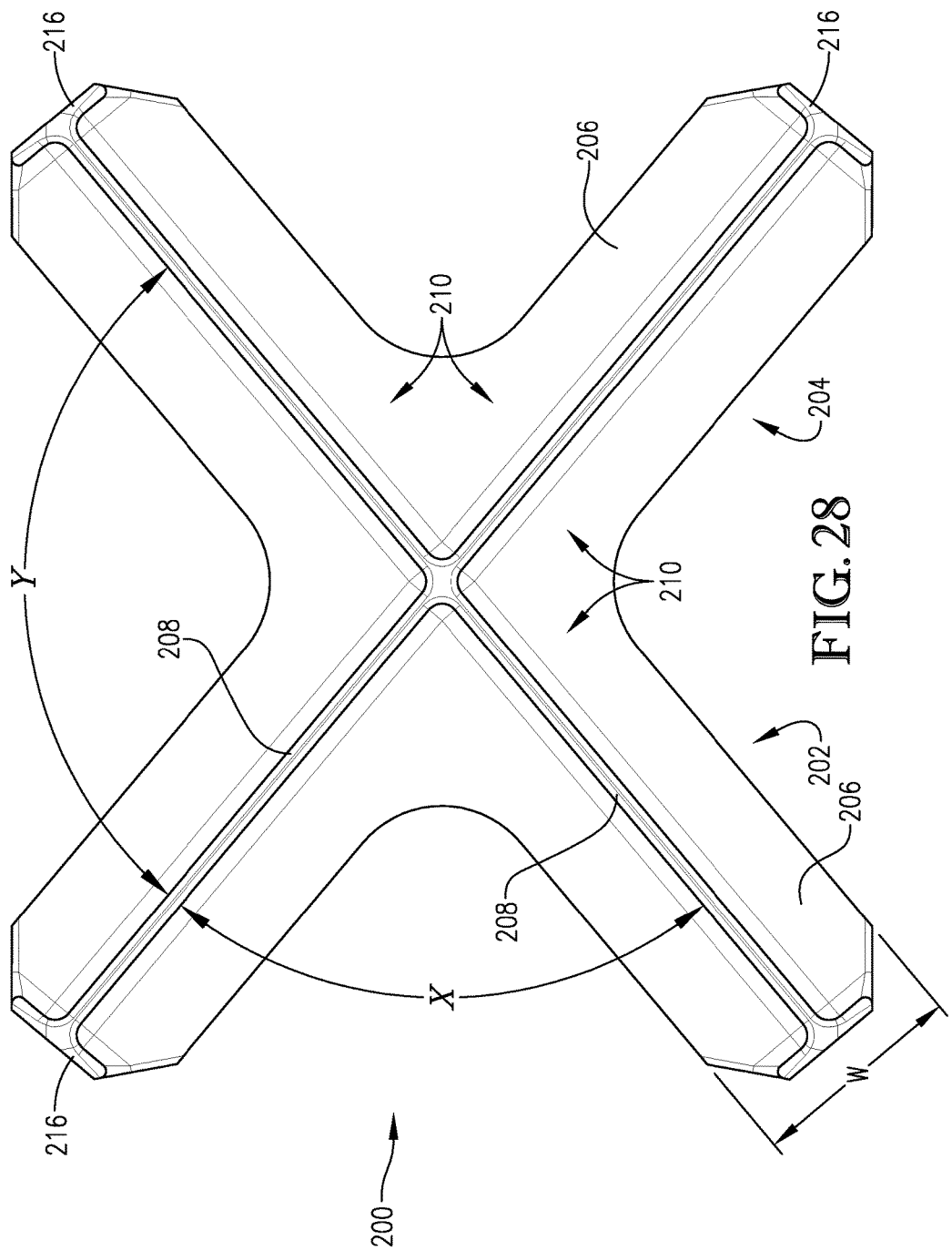
FIG. 28 is a top plan view of the tie system of FIG. 27.

In more detail, and with reference to FIGS. 25-26, to initiate manufacture of an insulated concrete panel, the panel maker can insert the tie system 120 into a tie opening 60 that has been formed in an insulation layer 62 (e.g., a panel or a board) so as to manufacture the insulated concrete panel. The tie opening 60 may be formed in a generally cylindrically shape using a hand drill and a core bit as previously described. The tie opening 60 may be formed spaced apart from a side edge of the insulation layer. The tie system 120 is inserted (first concrete engaging section 124 first) into tie opening 60 of the insulation layer 62 until the central section 122 of the tie system 120 is received in the tie opening 60 and at least a portion of each of the first and second concrete engaging sections 124, 128 are extending from opposite sides of the tie opening 60. Beneficially, the maximum width of the first concrete engaging section 124 is smaller than the diameter of the tie opening 60, so as to allow for such insertion. Furthermore, the tie system 120 will be positioned such that the end portions 130 of the second concrete engaging section 128 engage and/or contact the insulation layer 62 in two contact locations 68 located outside of, but proximate to, the tie opening 60. The two contact locations 68 are on one side of the insulation layer 62. As previously described, the end portions 130 of the second concrete engaging section 128 are enlarged relative to the central section 122. Such an enlargement provides for the heel 138 to engage a surface of the insulation layer 62 and the toe 140 to extend outwardly from the surface of the insulation layer 62. In such a configuration, the tie system 120 is ensured to be inserted into the tie opening 60 at the right depth because the tie system 120 is restricted from being inserted into the tie opening 60 past the point at which the end portions 130 of the second concrete engaging section 128 come into contact with the insulation layer 62. Furthermore, as described previously, the maximum width of the second concrete engaging section 128 is configured to inhibit rotation of the tie system 100 that may be induced by shear forces that exist between concrete layers positioned on either side of the insulation layer 62.

In some embodiments, the tie system 120 can be maintained within the tie opening 60 by having the width of the central section 122 generally the same size as the diameter of the tie opening 60, such that an interference fit is formed between the tie system 120 and the insulation material bounding the tie opening 60. In certain embodiments in which the central section 122 includes the tapered shim elements 136 on its side surfaces 132, the tapered shim elements 136 may engage with the insulation material bounding the tie opening 60 so as to further restrict the tie system 120 from being removed.

Furthermore, as illustrated in FIGS. 25-26, with the tie system 120 positioned in the tie opening 60 as described above, the barriers 146 will be generally parallel with the surfaces of the insulation layer 62. In some embodiments, the barriers 146 will be generally flush with a surface of the insulation layer. Furthermore, the rounded outer profiles of the barriers 146 will substantially conform to a cross-sectional shape of the tie opening 60. When the tie system 120 is received in the tie opening 60, the central section and the barriers 146, fill up a substantial portion of the cross-sectional area of the tie opening 60. In certain embodiments, central section 122 and the barriers 146, fill at least 80%, 90%, 95% or 100% of the cross-sectional area of the tie opening 60. By filling up a substantial portion of the cross-section area of the tie opening 60, the barriers 146 are configure to thermally isolate layers of concrete that will be placed on opposite sides of the insulation layer 62, as will be discussed in more detail below.

As illustrated in FIG. 26, after the tie system 120 has been inserted into a tie opening 60 of an insulation layer 62, an insulated concrete panel 150 can be manufactured by pouring top and bottom concrete layers 72, 74 on opposite sides of the insulation layer 62. The insulated concrete panel 150 can have a variety of sizes. For some insulated concrete panels, tie systems 120 will be positioned throughout the insulated concrete panels approximately every 5-15, every 6-12, or every 8 to 10 square feet (FIG. 26 may not be drawn to scale, but is provided for illustration of an insulated concrete panel 150 having a plurality tie systems 120 included therein). Typical insulated concrete panels can include between 10 to 100, between 20 to 80, or between 25 to 40 tie systems 120 within each insulated concrete panel. In some embodiments, the plurality of tie systems 120 can be arranged in rows or columns that are aligned along a longitudinal or transverse direction of the insulated concrete panel 150 or at any other angle as deemed necessary by an engineer. Furthermore, each of the individual tie systems 120 can be aligned (i.e., the first and second concrete engaging sections 124, 128 can be aligned) along a longitudinal or transverse direction of the insulated concrete panel 70 or at any other angle as deemed necessary by an engineer. In other embodiments, outer panels, such as facades may be positioned exterior of the top and bottom layers of concrete 72, 74.

With continued reference to FIG. 26, to form the insulated concrete panel 150, the bottom layer of concrete 74 is poured in a bottom concrete form. In some embodiments, the concrete form will have interlaced rows and/or columns of reinforcement materials, such as rebar, steel mesh, or prestress strand positioned therein so as to provide for additional support for the concrete panel 150. In some embodiments, the bottom layer of concrete 74 will undergo vibration to ensure proper settling of the concrete. Immediately following pouring the bottom layer of concrete 74, the insulation layer 62 with tie systems 120 inserted therein can be lowered into engagement with the bottom layer of concrete 74. The protrusion portions 126 of the first concrete engaging section 124 of the tie systems 120 that extend down from a bottom surface of the insulation layer 62 become inserted into and embedded in the bottom layer of concrete 74. In some embodiments, one or more of the tie systems 120 may need to be adjusted so as to avoid interference with reinforcements materials (e.g., rebar) that may be positioned in the bottom layer of concrete 74. Furthermore, pressure may be exerted on the insulation layer 62 (such as by walking on the insulation layer 62), such that the bottom surface of the insulation layer 62 will be placed into contact with and/or inserted within at least a top surface of the bottom layer of concrete 74.

Subsequent to placing the insulation layer 62 and tie systems 120 on and/or into engagement with the bottom layer of concrete 74, a top concrete form can be positioned over the insulation layer, and reinforcement materials can be positioned in the top form. Thereafter, the top layer of concrete 72 can be poured on a top surface of the insulation layer 62. In some embodiments, the top layer of concrete 72 will not be poured until the bottom layer of concrete 74 has time to cure, such as for at least three hours. When the top layer of concreted 72 is poured, the end portions 130 of the second concrete engaging section 128 of the tie systems 120 that extend up from the top surface of the insulation layer 62 become embedded in the top layer of concrete 72. During pouring of the top layer of concrete 72, the barriers 146 of the tie systems 120 inhibit passage of concrete from the top layer 72 through the tie opening 60 in the insulation layer 62 and into contact with the bottom layer of concrete 74. As such, a separation, including an air gap between the bottom layer of concrete 74 and the barriers 146, can be maintained in the tie opening 60. Such separation and air gap enhances thermal isolation between the top and bottom layers of concrete 72, 74, even with such top and bottom layers 72, 74 being indirectly connected via the tie systems 120.

As illustrated in the drawings, the tie systems 120 are generally formed with a rectangular shape, including a rectangular cross-section. As such the tie systems 120 can be presented in the form of a Vierendeel truss. The central section 122, the first concrete engaging section 124, and the second concrete engaging section 128 of the tie systems 120 are interconnected via rigid, fixed connections, so as to provide for the effective transfer of shear forces and the restriction of delamination forces between the layers of concrete 72, 74 without deforming the insulation layer 62 therebetween. Specifically, the first and second end portions 130 and the first and second protrusion portions 126 are configured to act as web members of a truss, with the layer of concrete 72, 74 acting as the flanges (i.e., truss cords). Thus, the first and second end portions 130 and the first and second protrusion portions 126 are configured to transfer tensile and compressive forces between the central section 122 and, thus, between the layers of concrete 72, 74. Furthermore, the central section 122, is configured to act as a shear plate capable of transferring shear forces and restricting delamination forces between the concrete layers. In some embodiments, the tie system 120 may also be configured to transfer bending moments between the concrete layers. In particular, the tie system 120 is configured to transfer at least 500 pounds, at least 1,000 pounds, at least 2,000 pounds, at least 5,000 pounds, at least 10,000 pounds, at least 15,000 pounds, or at least 20,000 pounds and/or between 500 to 20,000 pounds, between 1,000 and 15,000 pounds, or between 2,000 and 10,000 pounds of shear force between the layers of concrete. In addition, the tie system 120 is configured to resist at least 500 pounds, at least 1,000 pounds, at least 2,000 pounds, or at least 4,000 pounds and/or between 500 to 4,000 pounds or between 1,000 and 2,000 pounds of delamination force between the layers of concrete. In addition, the tie system 120 is configured to include a tensile strength of at least 10,000 psi, at least 20,000 psi, at least 30,000 psi, at least 40,000 psi, at least 50,000 psi, or at least 60,000 psi and/or between 10,000 and 60,000 psi, between 20,000 and 50,000 psi, or between 30,000 and 40,000 psi. Furthermore, the tie system 120 is configured to include a tensile modulus of at least 1 million psi, at least 2 million psi, at least 3 million psi, at least 5 million psi, at least 6 million psi, or at least 8 million psi and/or between 1 to 8 million psi, between 2 to 6 million psi, or between 3 and 5 million psi.

As such, the resulting insulated concrete panel 150 is configured as a composite panel, in which the tie system 120 prevents the top and bottom layers of concrete 72, 74 from delamination during lifting and shipping. Further, as mentioned, the insulated concrete panel 150 can be reinforced with rebar, steel mesh, post tension cables, prestress strand, or a combination of reinforcement as needed by the particular job requirements so as to further reinforce the insulated concrete panel 150.

Additional embodiments of the present invention comprising a generally X-shaped tie system 200 for use in making insulated concrete panels. For instance, FIGS. 27-30 illustrate various embodiments of the X-shaped tie system 200 that include a generally T-shaped cross-section. Nevertheless, it should be understood that embodiments of the preset invention contemplate the use of other shaped cross-sections, such as L-shaped, C-shaped, I-shaped, and U-shaped cross-sections. For example, FIG. 31 illustrates an Embodiment of an X-shaped tie system 200 that includes an L-shaped cross-section.

Remaining with FIGS. 27-30, the tie system 200 broadly comprises a generally X-shaped component. In certain embodiments, the tie system 200 may be described as comprising first and second elongated structural members 202, 204 that are integrally connected so as to form the X-shape. The first and second elongated structural members 202, 204 may each have lengths of between about 7 to 15 inches, between about 8 to 14 inches, or between about 9 to 13 inches. Nevertheless, it should be understood that the first and second elongated structural members 202, 204 may be formed with particular sizes as may be required for use of the tie system 200 with an insulation layer, as will be discussed in more detail below. Each of the elongated structural members 202, 204 includes ends, with such ends being spaced apart from a center of the tie system 200. In some embodiments, and with continued reference to FIGS. 27-30, the first and second structural members 202, 204 intersect to form first intersection angle X and a second intersection angle Y. In some embodiments, the first intersection angle X will be an acute angle, and the second intersection angle Y will be an obtuse angle. Certain specific magnitudes for the first intersection angle X will be described in more detail below. In other embodiments, the first and second intersection angles X, Y will be generally equal. As an alternative description, the tie system 200 may be defined as comprising four integrally connected legs, with such legs connected so as to form the X-shape. As a further alternative description, the tie system 200 may be defined as comprising a central section opposed by first and second concrete engaging sections, with each of the first and second concrete engaging sections defined by adjacent portions of the first and second elongated structural members 202, 204 separated by the second intersection angle Y.

With reference to FIGS. 27-30, the tie system 200 may comprise a top section 206 that presents a generally present a flat, planar surface. The top section 206 will provide support for the tie system 200 as it is inserted within an insulation layer. To facilitate such support, the top section 206 may have a width W (See FIG. 28) of between about 0.5 to 3 inches, between about 1 to 2 inches, or about 1.25 inches. The tie system 200 may include various features that extend from the top section 206, so as to form the T-shaped cross-section. For instance, the tie system 200 may include a projection 208 that extends generally perpendicularly from a bottom surface of the top section 206. In some embodiments, the projection 208 is oriented so as to extend parallel with a centerline of the first and second elongated structural members 202, 204. As such, the projection 208 correspondingly presents an X-shape. The tie system 200 includes a recessed area 210 that is presented between the projection 208 and the bottom surface of the top section 206. For clarity, the recessed area may be defined as the open space existing within corner areas of the tie system 200 as is presented by the intersection of the projection 208 and the top section 206. As such, the recessed area 210 is operable to increase the overall surface area presented by the tie system 200. During use of a tie system 200, portions of the recessed areas 210 become filled with concrete, adding to the overall strength of the tie system 200.

In some embodiments, a thickness of the projection 208 may vary at different positions about the tie system 200. For example, in some embodiments, a bottom-most portion of the projection may have a sharpened edge, which as will be described in more detail below, facilitates insertion of the tie system 200 within an insulation layer. In some embodiments, such as illustrated in FIG. 30, some bottom-most portions of the projection 208 may have sharpened, teeth-like elements 212 that further facilitate such insertions. In some embodiments, the teeth-like elements 212 will include an arcuate shape, with such arcuate shapes including a radius of curvature of about 0.25 inches, about 0.5 inches, about 0.75 inches, or about 1.0 inches. In other embodiments, the teeth-like elements 212 will comprise linear, triangular-shaped sections. In even further alternative embodiments, portions of the projection 208 near a center of the tie system 200 may have a smaller thickness than portions of the projection 208 near ends of the first and second elongated structural members 202, 204. Such reductions in thickness may facilitate the insertion of the tie system 200 into an insulation layer.

In some additional embodiments of the present invention, various portions of the projection 208 will extend different distances from the top section 206. In some embodiments, the entire projection 208 will extend a distance H (See FIG. 27) between about 0.5 and 4 inches, between about 1 and 3 inches, or about 2 inches from the top section 206. In other embodiments, portions of the projection near a center of the tie system 200 may extend a shorter distance from the top section 206 than portions of the projection 208 near the ends of the first and second elongated structural members 202, 204. For instance, the center of the tie system 200 may not include a projection 208 extending from the top section 206, while ends of the first and second elongated structural members 202, 204 may include a projection 208 extending therefrom a distance H. Similar to the reductions in thickness described previously, such reductions in extension distance may facilitate the insertion of the tie system 200 into an insulation layer. In certain embodiments, the variations in extension distances of the projection 208 will also facilitate proper positioning of the tie system 200 on an insulation panel. For example, the tie system 200 may be positioned on the insulation layer such that only the portions of the projection 208 that extend the shorter distance from the top section 206 (e.g., portions of the projection 208 adjacent to the center of the tie system 200) will be in contact with an insulation panel. As such, the portions of the projection 208 that extends the longer distance from the top section 206 (e.g., portions of the projection 208 adjacent to the ends of the tie system 200) will be positioned adjacently to the insulation panel, thereby acting as a guide to restrict improper positioning of the tie system 200.

Figure 29:
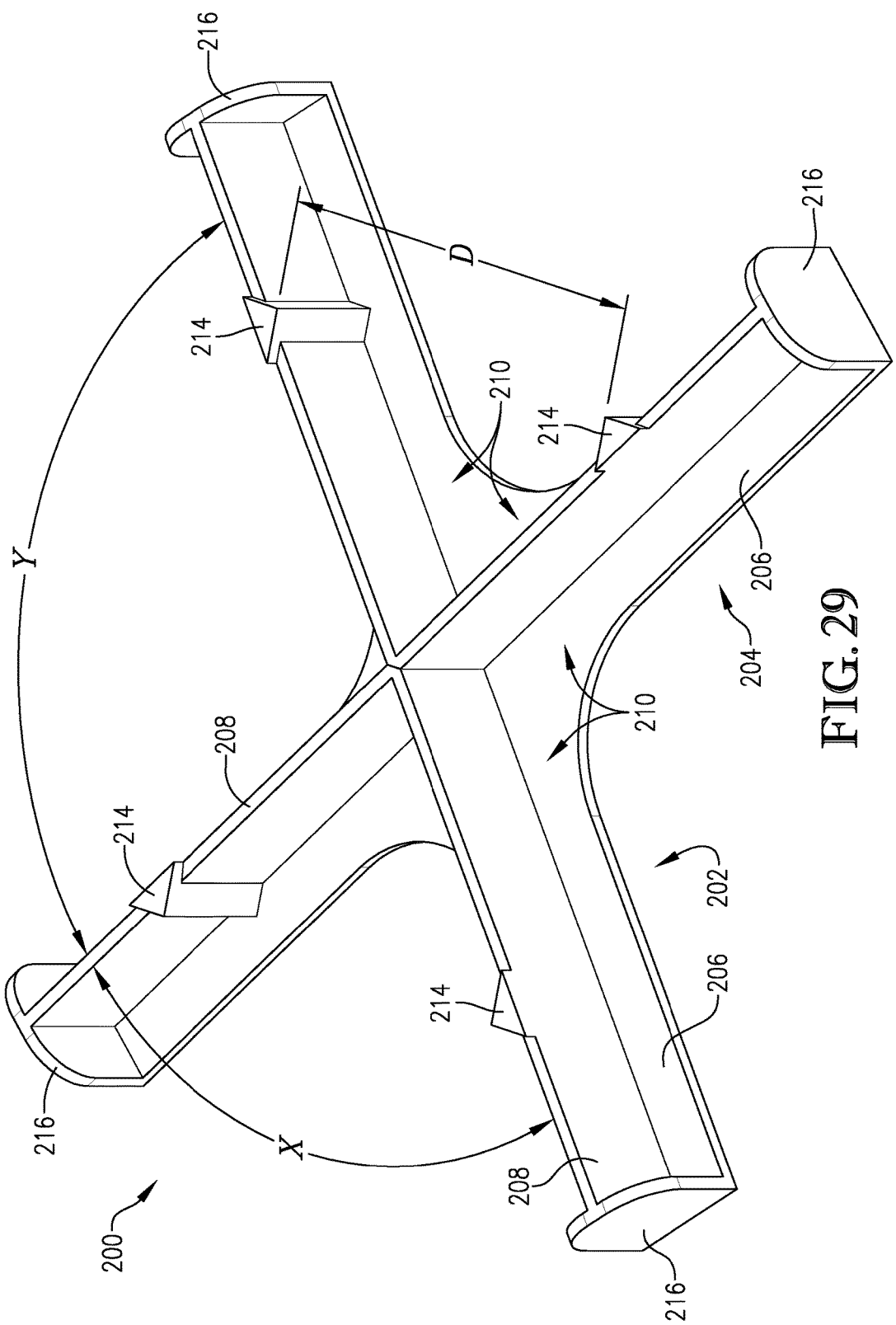
FIG. 29 is a perspective view of an additional embodiment of an X-shaped tie system with a T-shaped cross-section, particularly illustrating the tie system including one or more tabs extending from a projection of the tie system.
Figure 30:
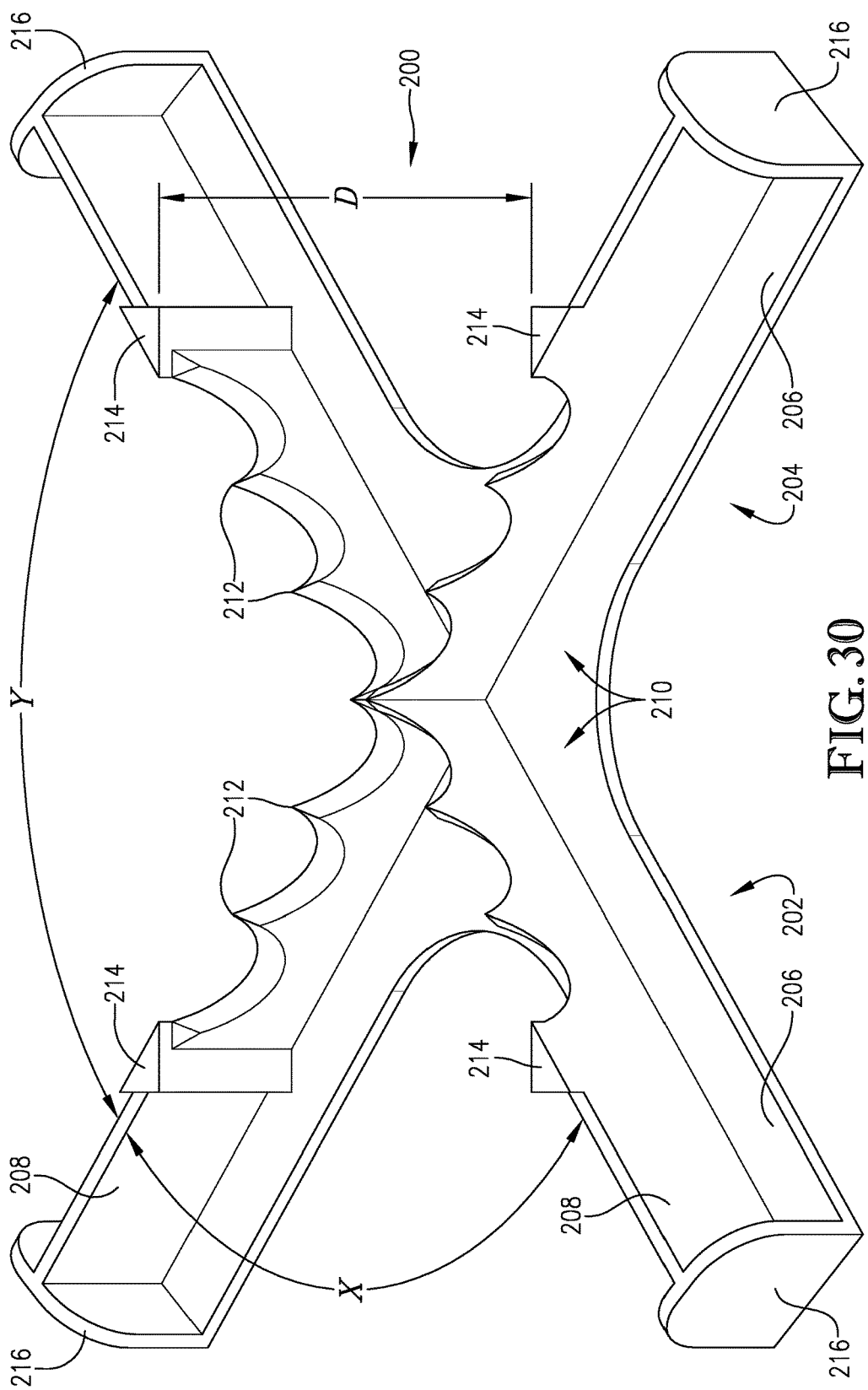
FIG. 30 is a perspective view of a further embodiment of an X-shaped tie system with a T-shaped cross-section, particularly illustrating the tie system including teeth-like portions on a projection of the tie system.
Figure 31:
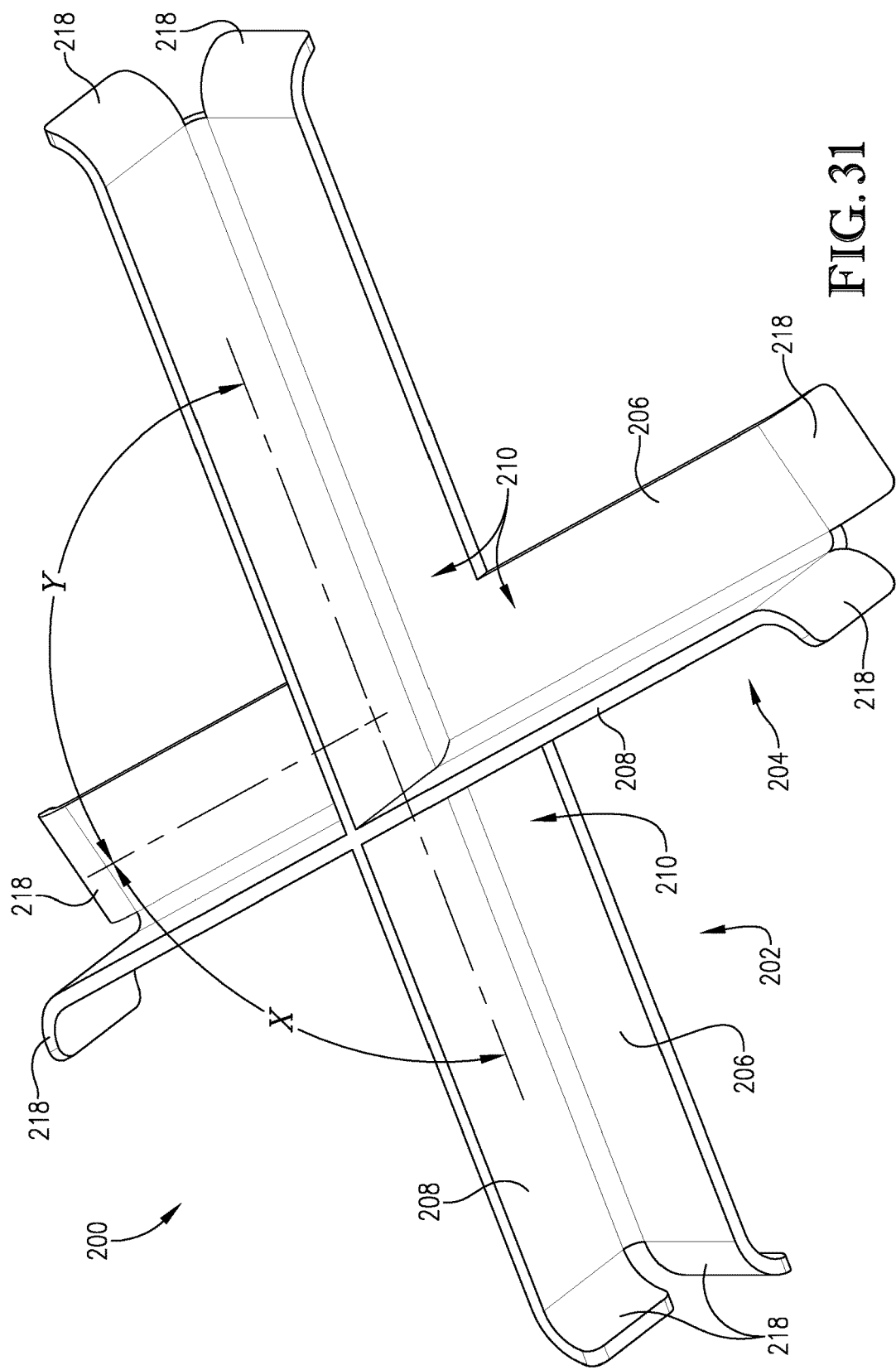
FIG. 31 is a perspective view of an X-shaped tie system with an L-shaped cross-section according to embodiments of the present invention.

In additional embodiments, as illustrated in FIGS. 29 and 30, the projection 208 of the tie system 200 may include one or more tabs 214 that project laterally from the projection 208. Certain embodiments will provide for two or more tabs 214 to be included with each of the first and second structural members 202, 204, such that the tie system 200 will include four tabs 214. In some embodiments, the tabs 214 on the first and second structural members 202, 204 that are separated by the first intersection angle X will be separated by a linear distance D. Embodiments of the present invention provide for the distance D to be generally equivalent to a depth of the insulation panel in which the tie system 200 will be inserted. As such, the tabs 214 can act as guides for proper placement of the tie system 200. In some embodiments, the distance D will be at least 2 inches, at least 3 inches, or at least 4 inches, so as to correspond with insulation layer having a thickness of at least 2 inches, at least 3 inches, or at least 4 inches. The tabs 214 may have various sizes and shapes, such as flat or rectangular shapes. In the embodiment shown in the figures for example, the illustrated tabs 214 are generally shaped as a triangular prism.

Furthermore, as shown in FIGS. 27-30 the tie system 200 may include flaps 216 that extend generally perpendicularly from the bottom surface of the top section 206 adjacent to the ends of each of the first and second structural members 202, 204. In some embodiments, the orientation of the flaps 216 will also provide for them to be generally perpendicular to the projection 208. The flaps 216 may be operable to provide for an increase the overall surface area presented by the tie system 200 so as to increase the overall strength of the tie system 200 when the tie system 200 is embedded in concrete.

Embodiments of the present invention provide for the tie system 200 to be formed in various sizes and shapes as may be appropriate for use with insulation layer of various sizes and shapes. For example, as previously described, the tie system 200 can be used with commonly-sized insulation layers having a thickness of 2 inches, 3 inches, or 4 inches. To facilitate the integration of the tie systems 200 with insulation layers of such thicknesses, the first intersection angle X of such tie systems may be approximately 35 degrees, approximately 37.5 degrees, and approximately 40 degrees, respectively. Nevertheless, it should be understood that the first intersection angle X of the tie system 200 may have other magnitudes, as may be appropriate for insulation layer of different thicknesses.

Embodiments of the present invention provide for the tie system 200 to be formed from and/or coated with a material having a thermal conductivity that is less than steel and less than concrete. For instance, the tie system 200 may be formed of, or coated with, a material having a thermal conductivity less than 10, 5, 1, 0.5, or 0.1 W/(m·K). In certain embodiment, the material will have a thermal conductivity of about 0.3 W/(m·K). In some embodiments, tie system 200 may formed from a resin, such as a vinyl resin. In further embodiments, the synthetic resin may include reinforcing fibers, such as glass fibers and/or carbon fibers. In some embodiments, the tie system 200 may be formed from a material having between 15 to 65 or between 20 to 50 percent vinyl ester resins and between 35 to 85 or between 50 to 80 percent long glass fibers, such that the tie system 200 comprises a strong, alkali resistant composite. In some specific embodiments, the tie system 200 may be formed from a material having 35 percent vinyl ester resins and 65 percent long glass fibers, such that the tie system 120 comprises a strong, alkali resistant composite. Such a tie system 200 can be formed from compression molding, in which the material is placed within a steel form and placed under high temperatures (e.g., over 300 degrees Fahrenheit) and high pressures (e.g., over 100 tons). In other embodiments, the tie system 200 may be injection molded.

As described above, the X-shaped tie systems 200 may be formed to include cross-sections other than T-shaped. For instance, FIG. 31 illustrates a tie system 200 having an L-shaped cross-section. In more detail, the tie system broadly comprising a generally X-shaped component, including first and second elongated structural members 202, 204 that are integrally connected so as to form the X-shape. As with the tie system 200 of FIGS. 27-30, the tie system 200 of FIG. 31 may similarly provide for the first and second structural members 202, 204 intersect to form an acute first intersection angle X and an obtuse intersection angle Y. Each of the elongated structural members 202, 204 include first and second ends, with such ends space apart from a center of said tie system. The tie system 200 includes top section 206, which may generally be presented as a flat surface. The tie system 200 of FIG. 31 may include various features that extend from the top section, so as to form the L-shaped cross-section. For instance, the tie system may include a projection 208 that extends generally perpendicularly from a bottom surface of the top section 206. In some embodiments, the projection 208 is aligned with the first and second elongated structural members 202, 204, such that the projection 208 is similarly presented in an X-shape. As such, from a bottom perspective, the tie system includes a recessed area 210 that exists between the projection 208 and the bottom surface of the top section 206.

In some embodiments, a portion of the projection 208 may have a sharpened edge, so as to facilitate the tie system 200 being inserted into an insulation layer, as will be discussed in more detail below. In additional embodiments, the tie system 200 may include one or more flaps 218 that extend perpendicularly away from the projection 208 and/or the top section 206. Furthermore, in some embodiments, one or more of the flaps 218 may extend away from the recessed area 210 of the tie system 200.

In certain embodiments, the tie system 200 with the L-shaped cross section, as illustrated in FIG. 31, can be formed by the following process: To begin, the first and second elongated structural members 202, 204 may be cut from a sheet of pliable material, such as a metals (i.e., steel, tin, aluminum, or the like) or certain thermoplastic polymers, such as polypropylene, polyethylene, polyethylene terephthalate, polyamide, vinyl-based polymers, the like, and combinations thereof. It being understood that such thermoplastic polymers my require the application of heat and/or pressure to become pliable. Next, an edge of each of the first and second elongated structural members 202, 204 may be bent to thereby form the projection 208 extending from the top section 206. As such, the first and second elongated structural members 202, 204 having an L-shaped cross-section are formed. In some additional embodiments, portions of the ends of the first and second elongated structural members 202, 204 may be bent to thereby form the flaps 218 on the ends. Finally, the first and second elongated structural members 202, 204 may be rigidly connected to form the tie system having the X-shape. Such a connection can be formed by welding, heat treatment, adhesives, or the like. As previously described, the recessed area 210 between the projection 208 and the top section 206 provides an open void/cavity operable to receive concrete so as to add to the overall strength of the tie system 200.

To form an insulated concrete panel, one or more of the X-shaped tie systems 200 may be used by a panel maker (e.g., a "pre-caster") to rigidly connect two layers of concrete that have an insulation layer, such as an expanded or extruded polystyrene board, sandwiched therebetween. In other embodiments, insulation layers can be formed from expanded polystyrene, polyisocyanurate, expanded polyethylene, extruded polyethylene, or expanded polypropylene. To initiate making of the insulated concrete panel, the panel maker can select a tie system 200 to be inserted into a side edge of an insulation layer. As described above, embodiments of the present invention provide for the tie system 200 to be formed in a plurality of sizes, so as to be compatible for use with insulation layers have a variety of thicknesses.

As illustrative examples, the tie systems 200 may be used with insulation layers having thicknesses of about 2 inches, about 3 inches, or about 4 inches. Insulation layers having thicknesses of 2 inches, 3 inches, and 4 inches may be compatible with tie systems having first and second structural members of various lengths and that form first intersection angles X (See FIGS. 27-31) of 35, 37.5, and 45 degrees, respectively. Nonetheless, it is understood that the tie systems 200 can be shaped and scaled as necessary for implementation with insulation layers of generally any size.

Figure 32:
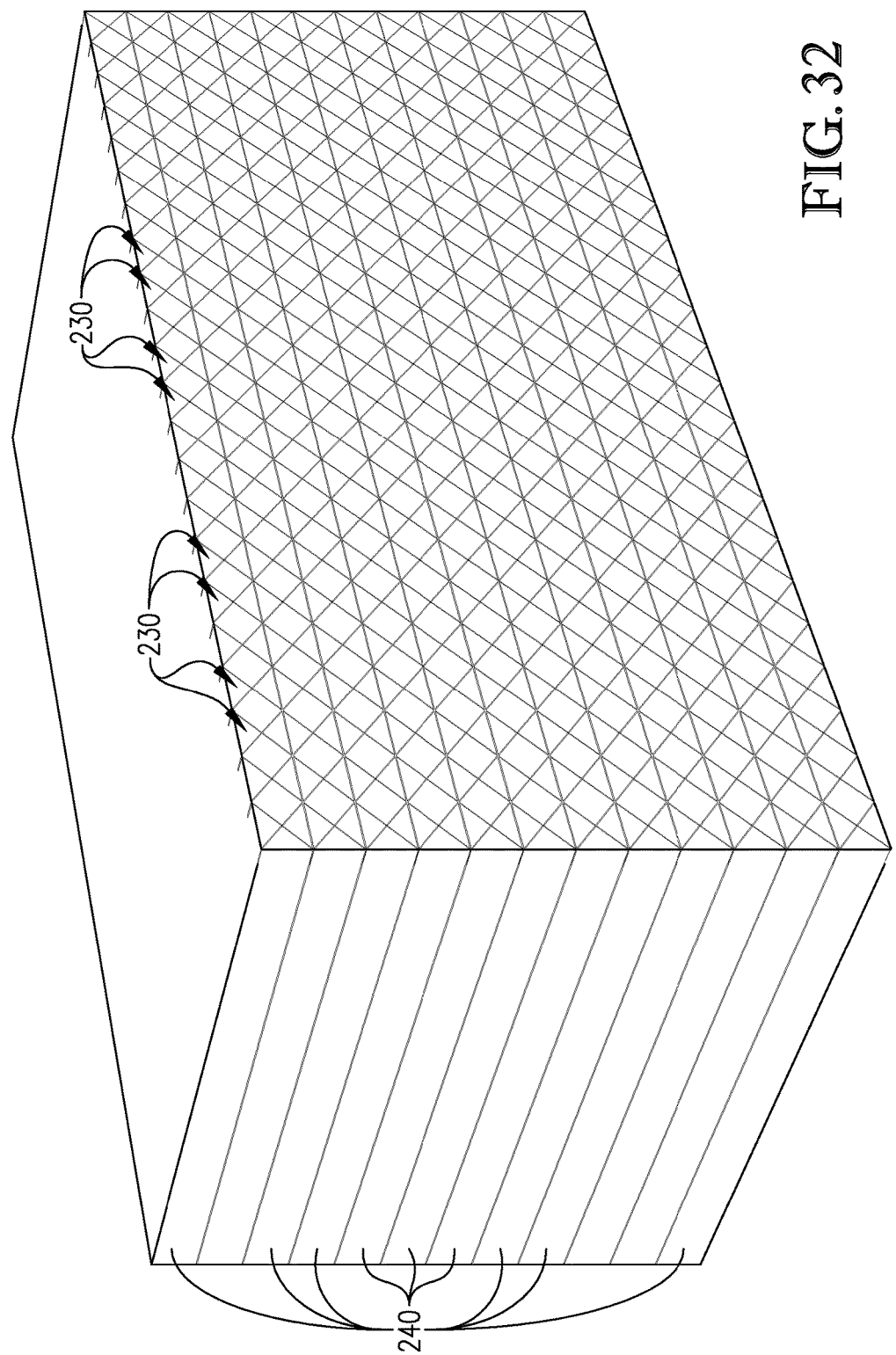
FIG. 32 is a perspective illustration of a stack of insulation layers, with each layer including a plurality of X-shaped grooves extending through a side edge of the layer.

Once an appropriately sized tie system 200 is selected, the tie system 200 can be inserted the into an insulation layer. In some embodiments, the tie system 200 can be driven into the insulation layer by force. Such insertions may be facilitated by embodiments of the tie system 200 that include the teeth-like elements 212 formed with the projection 208. Alternatively, or in conjunction, the insulation layers can be formed with pre-cut openings for installing the tie systems. As shown in FIG. 32, embodiments of the present invention provide for pre-cut openings in the form of X-shaped grooves 230 to be formed on the side edges of the insulation layers 240. It should be understood that FIG. 32 illustrates a stack of multiple insulation layers 240, with each of such insulation layers 240 each having a plurality of X-shaped grooves 230 formed along its side edge. The X-shaped grooves 230 can be sized and shaped so as to receive at least a portion of the projections 208 of the tie systems 200.

Figure 33:
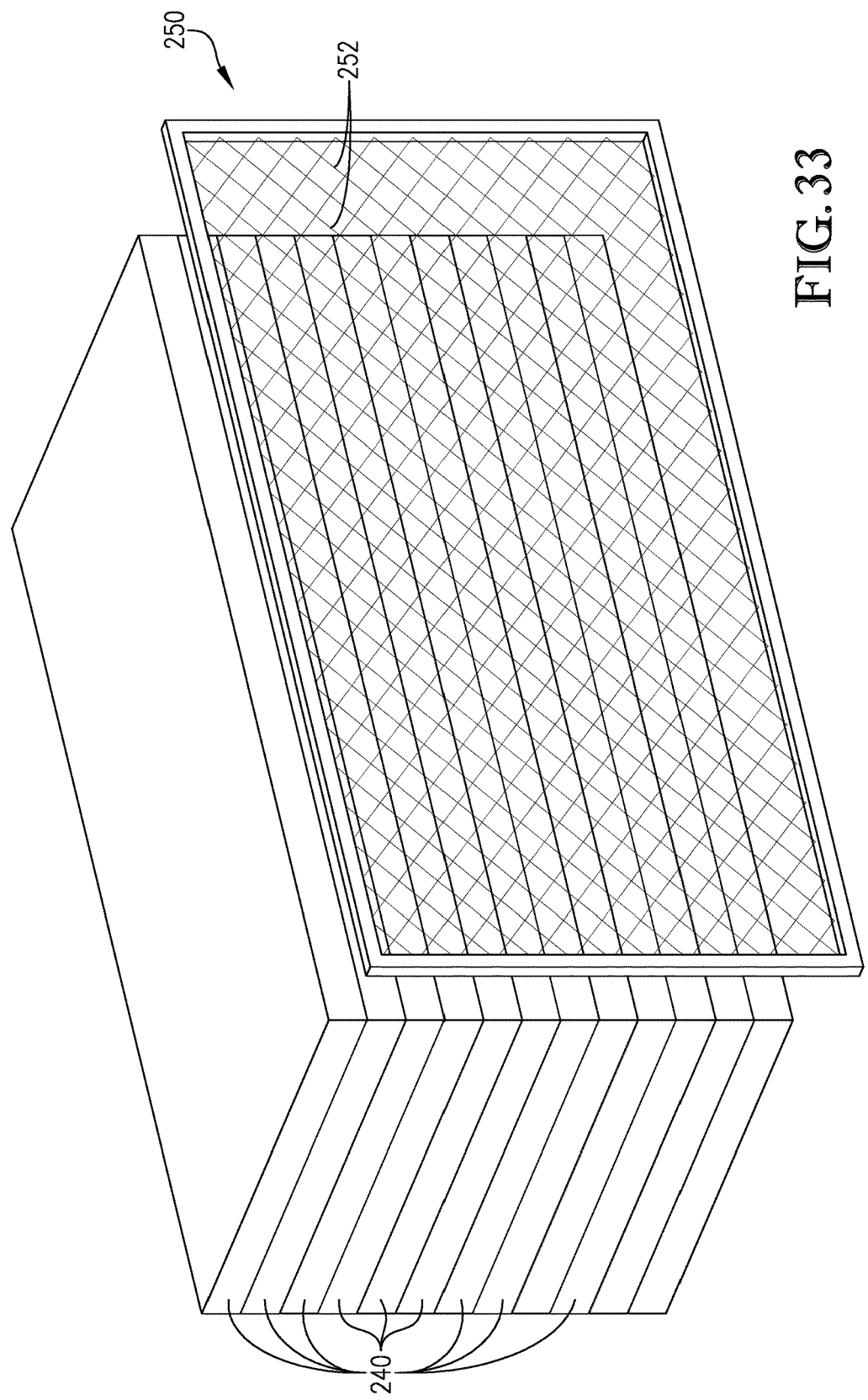
FIG. 33 is a perspective illustration of a hot-wire system used to form X-shaped grooves in insulation layers, with the hot-wire system particularly illustrating two planes of wires.

In some embodiments, as illustrated in FIG. 33, the X-shaped grooves 230 can be formed with a hot-wire system 250 (e.g., a hot-wire harp) comprising a plurality of electrical wires 252 that cross each other so as present a matrix of Xs when the hot-wire system 250 is viewed from a front and/or rear elevation view. In some embodiments, the wires 252 of the hot-wire system 250 will be arranged in two set apart planes, with the wires 252 in a first plane being angled in a first direction and the wires 252 in a second plane angle in a second direction. As such, the wires 252 that cross each other in the first and second directions can present the matrix of Xs. The hot-wire system 250 is configured to provide electric current through each of the wires 252, such that the wires 252 will be heated to a temperature that is above a melting point of the insulation material of the insulation layers 240. As such, the wires 252 of the hot-wire system 250 can be placed into contact with the side edges of one or more insulation layers 240 so as to melt a portion of the side edges to form the X-shaped grooves 230 in which the tie systems 200 can be inserted. It should be understood that although the individual wires 252 of the hot-wire system 250 cross each other, the planes in which the wires 252 are located are generally spaced apart such that the wires 252 do not come into contact each other so as to prevent the electrical current from "shorting out" between the wires 252.

The number of insulation layers 240 which can be simultaneously processed to include the X-shaped grooves 230 is dependent on the size of the insulation layers 240 and on the dimensions of the hot-wire system 250. Nevertheless, the hot-wire system 250 is generally configured so as to be capable of simultaneously processing multiple insulation layers 240. Furthermore, the wires 252 of the hot-wire system 250 can be orientated so as to form X-shaped grooves 230 that presenting specific intersection angles. Such intersection angles may correspond with each of the first intersection angles X of the tie systems 200 (e.g., 35, 37.5, and 45 degrees). However, in some embodiments, the wires 252 of the hot-wire system 250 can be orientated so as to form X-shaped grooves 230 that present other intersection angles. For instance, in some embodiments, the wires 252 of the hot wire system 250 may be configured to create X-shaped grooves 230 that present an intersection angle of 39.8 degrees. Such a precise intersection angle may be used with insulation layers 240 having side edges of about 8 feet in length. In such a configuration, exactly 20 X-shaped grooves 230 (each being about 4.8 inches in length) can be formed in the side edge of each of the insulation layers 240.

Once the hot-wire system 250 is appropriately configured to make X-shaped grooves 230 in one or more insulation layers 240, the X-shaped grooves 230 can be formed by holding the hot-wire system 250 stationary and moving a side edge of the insulation layers 240 into contact with the heated wires 252 of the hot-wire system 252. Alternatively, the insulation layers 240 can be held stationary and the hot-wire system 250 can be moved into contact with the side edges of the insulation layers 240. Regardless, the wires 252 of the hot-wire system 250 should be at least partially embedded into the side edges of the insulation layers 240 to a distance that corresponds with a size of the projections 208 of the tie systems 200 that are to be inserted in the X-shaped grooves 230. For instance, in embodiments in which the projections 208 of the tie system 200 extend about 2 inches from the top portion 206, the X-shape grooves 230 should be formed to correspondingly have a depth of about 2 inches.

Figure 34:
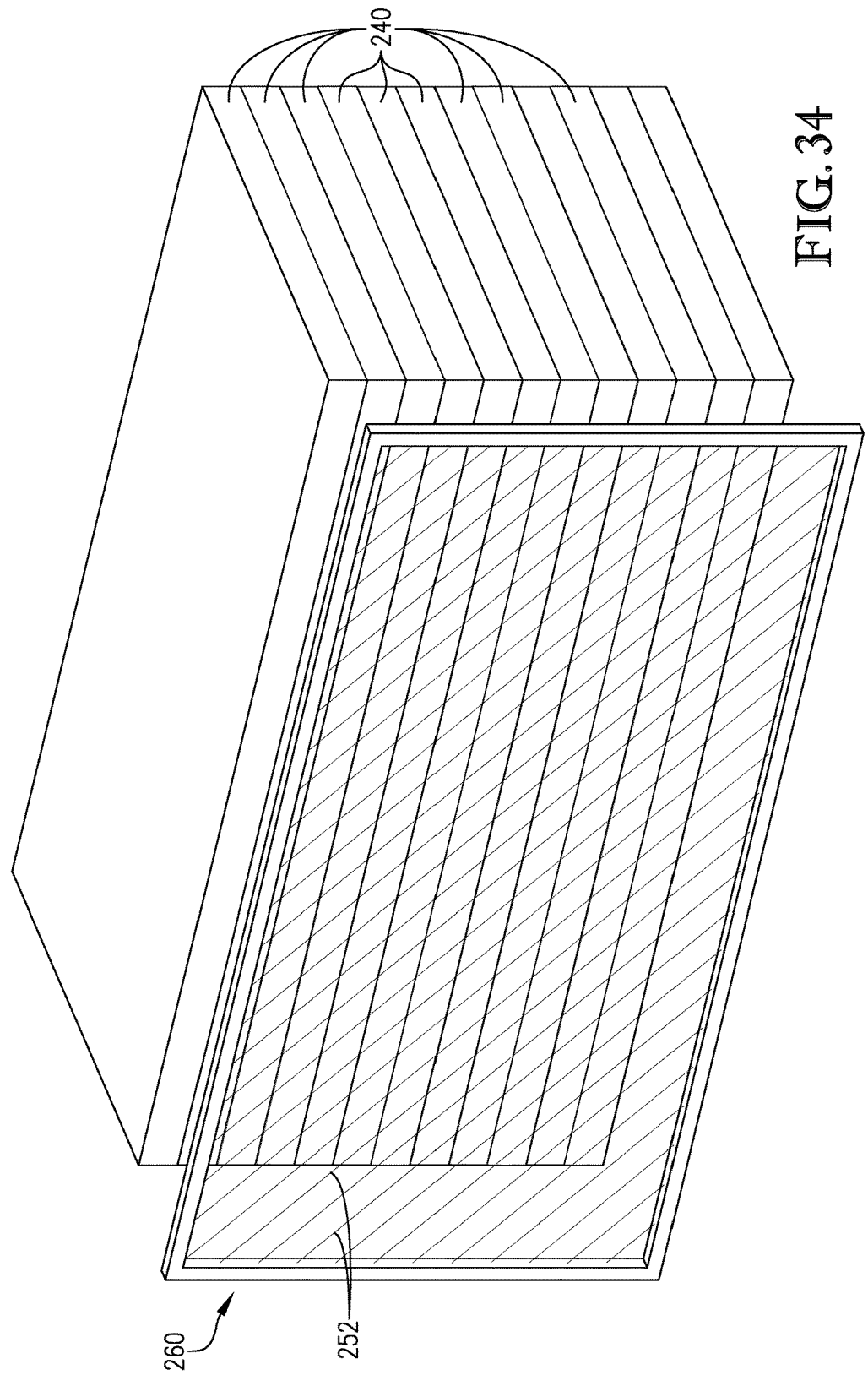
FIG. 34 is a perspective illustration of a single plane hot-wire system used to form X-shaped grooves in insulation layers, with the single plane hot-wire system particularly illustrating a single plane of wires.

Embodiments of the present invention may include a version of the hot-wire system 250 that only includes a single plane of wires 252. With reference to FIG. 34, a single plane hot-wire system 260 is shown that includes only a single plane of wires 252 that are angled only in a single direction. Such a hot-wire system 260 may be used so as to simplify the hot-wire system 250 and to reduce the possibility of short circuiting the wires 252. To create the X-shaped grooves 230 with the single plane hot-wire system 260, the heated wires 252 can be made to contact a side edge of one or more insulation layers 240, via a first side of the single plane hot wire system 260, so as to form a first portion of the X-shaped grooves 230. Next, the insulation layers 240 can be moved to the opposite, second side of the single plane hot-wire system 260 and the heated wires can be made to again contact the side edge of the insulation layers 240 so as to form a second portion of the X-shaped grooves 230. Alternatively, the insulation layers 240 can remain stationary, and after initially contacting the side edge of the insulation layers 240, the single plane hot-wire system 260 can be flipped and again be caused to contact the side edge of the insulation layers 240 so as form the X-shaped grooves 230. In even further alternatives, two separate single plane hot-wire systems 260 can be used, including a first system 260 having a single plane of wires 252 extending in a first angled direction and a second system 260 having a single plane of wires 252 extending in a second angled direction. As such, a side edge of one or more insulation layers 240 can be brought into successive contact with each of the first and second single plane hot-wire systems 260 so as to form the X-shaped grooves 230.

Figure 35:
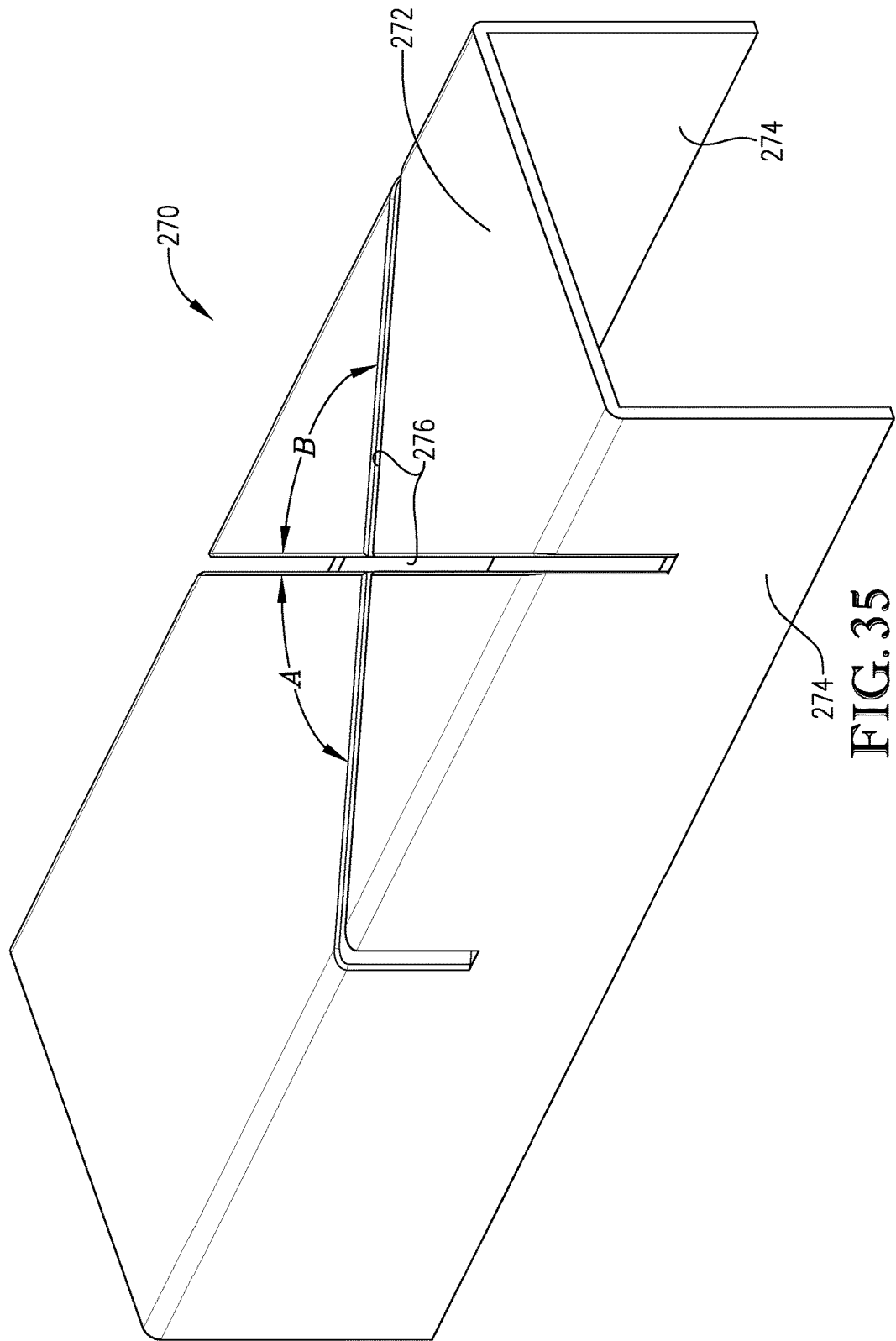
FIG. 35 is a perspective view of tie-positioning template according to embodiments of the present invention.

In addition to the hot-wire systems 250, 260 discussed above, some embodiments of the present invention additionally include a tie-positioning template 270 that facilitates creation of the X-shaped grooves 230 in the side edges of the insulation layers 240. With reference to FIG. 35, such a tie-positioning template 270 includes an elongated, U-shaped piece of material having a top section 272 and two side sections 274 extending down from edges of the top section 272. The tie-positioning template 270 additionally includes two elongated apertures 276 extending across the top section 272 and extending down at least a portion of the side sections 274. The two elongated apertures 276 are generally angled, such that they intersect each other at an intersection point that lies at a midpoint of a width of the top section 272. Furthermore, the elongated apertures 276 should be orientated such that they correspond with the orientation of the projections 208 of one or more of the tie systems 200. For instance, the elongated apertures 276 may intersect to form a first intersection angle A and second intersection angle B that correspond with intersection angles X and Y, respectively presented by the tie systems 200. For example, the elongated apertures 276 may intersect to form a first intersection angle A of about 35, 37.5, or 45 degrees, which corresponds with the first intersection angles X of the tie systems 200 illustrated in FIGS. 27-31.

Figure 36:
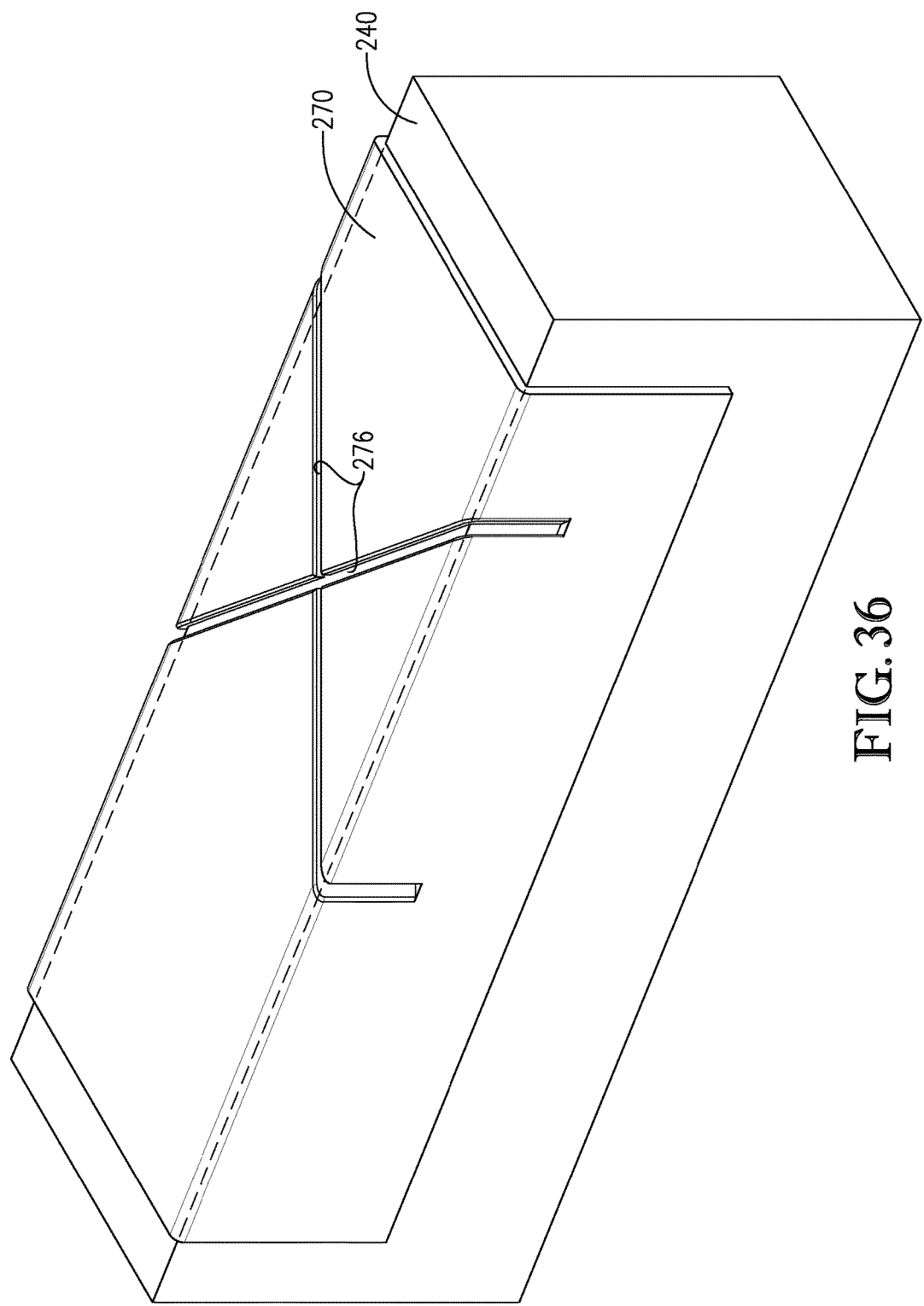
FIG. 36 is a partial perspective view of the tie-positioning template from FIG. 35 positioned on a side edge of an insulation layer.
Figure 37:
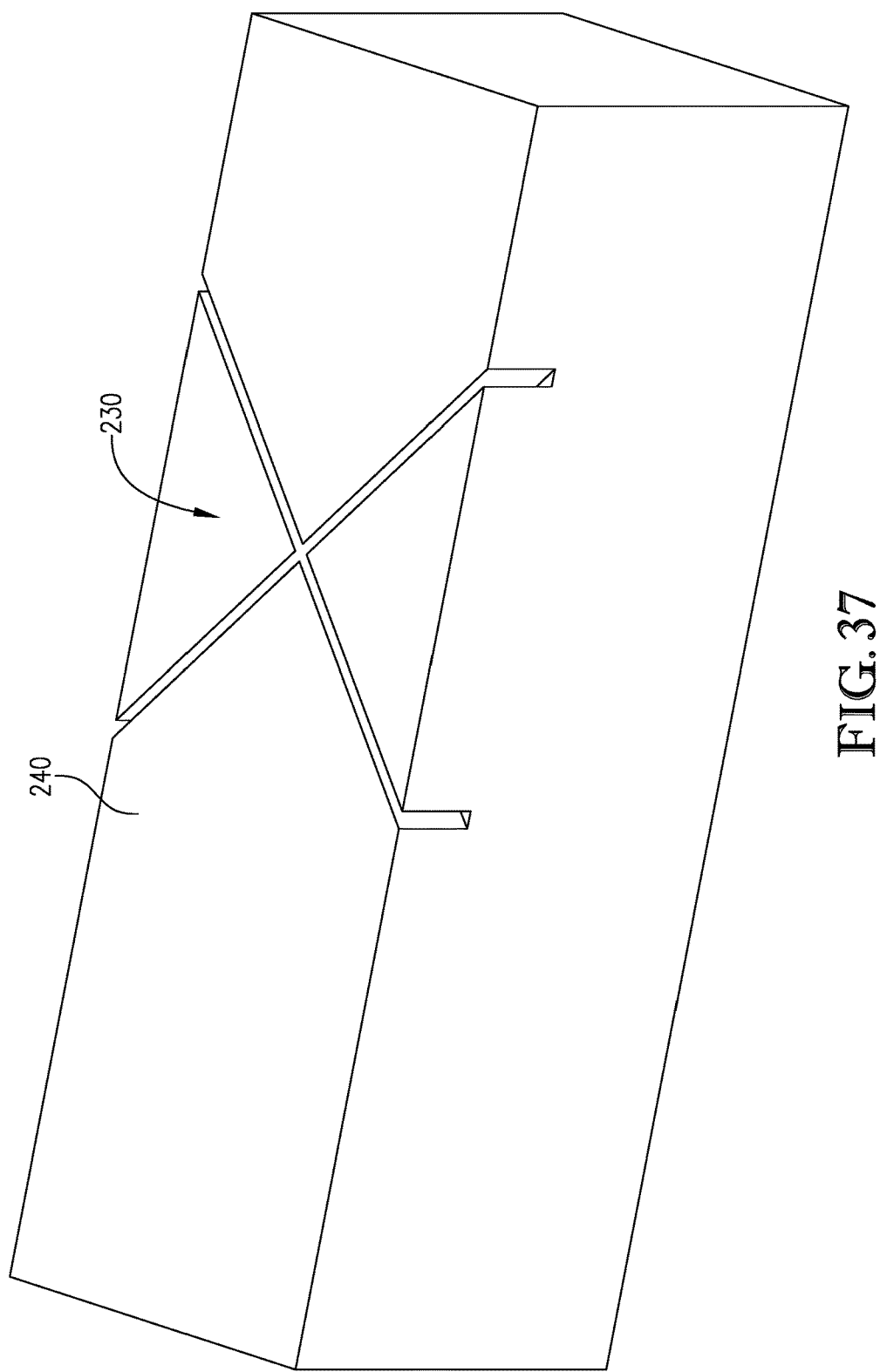
FIG. 37 is a partial perspective view of the insulation layer from FIG. 36, particularly illustrating an X-shaped groove that was formed via use of the tie-positioning template from FIG. 35.

With reference to FIG. 36, the tie-positioning template 270 may be constructed of generally any type of solid material, such as wood, metal, polymers, or the like. Furthermore, the tie-positioning template 270 should be sized so as to fit snuggly over a side edge of an insulation layer 240. For example, for an insulation layer 240 having a thickness of 4 inches, a width of the top section 272 of the tie positioning template 270 (which also corresponds to the distance separating the two side sections 274) should be approximately 4 inches. As such, the tie-positioning template 270 should be operable to fit onto a portion of the side edge of the insulation layer 240 such that the top section 272 of the tie-positioning template 270 lies substantially flat against the side edge of the insulation layer 240 and the two side sections 274 extend partway down the adjacent surfaces of the insulation layer 240 (See FIG. 36). As such, a center of the tie-positioning template 270 is aligned with a midpoint of the side edge, i.e., centered on the thickness of the insulation layer 240. With the tie-positioning template 270 properly positioned on the insulation layer 240, such as illustrated in FIG. 36, a panel maker can cut an X-shaped groove 230 into the insulation layer 240 by forming cuts along the elongated apertures 276. The resulting X-shaped groove 230 (See FIG. 37) can be formed by the use of hand-tools, such as knives, handsaws, or the like, or alternatively, by the use of power-tools, such as skill-saws, jig-saws, reciprocating saws, or the like.

Regardless of whether the X-shaped grooves 230 were formed with the hot-wire systems 250, 260 or with the tie-positioning template 270, after the X-shaped grooves are formed on an insulation layer 240, one or more tie systems 200 can be properly aligned within the insulation layer 240 by positioning the projections 208 of the tie systems 200 within the X-shaped grooves 230. With the tie systems 200 properly positioned on the insulation layer 240, pressure is applied against the top sections 206 of the tie systems 200. As such, the projections 208 of the tie systems 200 will be forced into the X-shape grooves 230 of the insulation layer 240, thereby driving the tie systems into the insulation layer 240, such as shown in FIGS. 38 and 39. Embodiments of the present invention that include the projections 208 having a sharpened edge and/or the teeth-like elements 212 will facilitate the ability of the tie systems 200 to be driven into the insulation layer 240. In some instances, in may be necessary to drive the tie systems 200 into the insulation layer 240 by striking the top sections 206 of the tie systems 200 with a hammer or mallet. In some embodiments, the process of driving in the tie system 200 into the insulation layer will form the X-shaped groove 230 into the side edge of the insulation layer. Regardless of the method used to drive the tie systems 200 into the insulation layer 240, the tie systems 200 are driven into the insulation layer 240 until the bottom surface of the top section 206 is adjacent to the surface of the insulation layer 240. As such, the tie systems 200 are nearly flush with the side edge of the insulation layer 240.

In some alternative embodiments, a tie system 200 can be inserted within a side edge of an insulation layer 240 without first forming an X-shaped groove 230. Such insertions may be facilitated when using embodiments of the tie system 200 that include the teeth-like elements 212 formed as part of the projection 208. To begin, a tie system 200 can be positioned on a side edge of the teeth-like elements 212 with the projection 208 of the tie system 20 in contact with the insulation panel. The tie system should 200 be centered on the insulation layer 240, such that a center of the tie system 200 is generally aligned with a midpoint of the thickness of the insulation layer 240. In embodiments of the tie system 200 that include the tabs 214, such as illustrated in FIGS. 38-39, the tabs 214 can be positioned on either side of the insulation layer 240. For example, for an insulation layer 240 having a thickness of 4 inches, a tie system 200 having tabs 214 separated by distance D of 4 inches may preferably be used. With the tie system 200 centered, a portion of the first and second structural members 202, 204, including the ends thereof, will overhang the side edge of the insulation layer 240. As such, the tie system 200 will be centered on the side edge such that the tie system 200 can be properly inserted into the insulation layer 240. Upon insertion of one or more tie systems 200 into the side edge of one or more insulation layers 240, the insulation layers 240 can be immediately used to create an insulated concrete panel.

Figure 40:
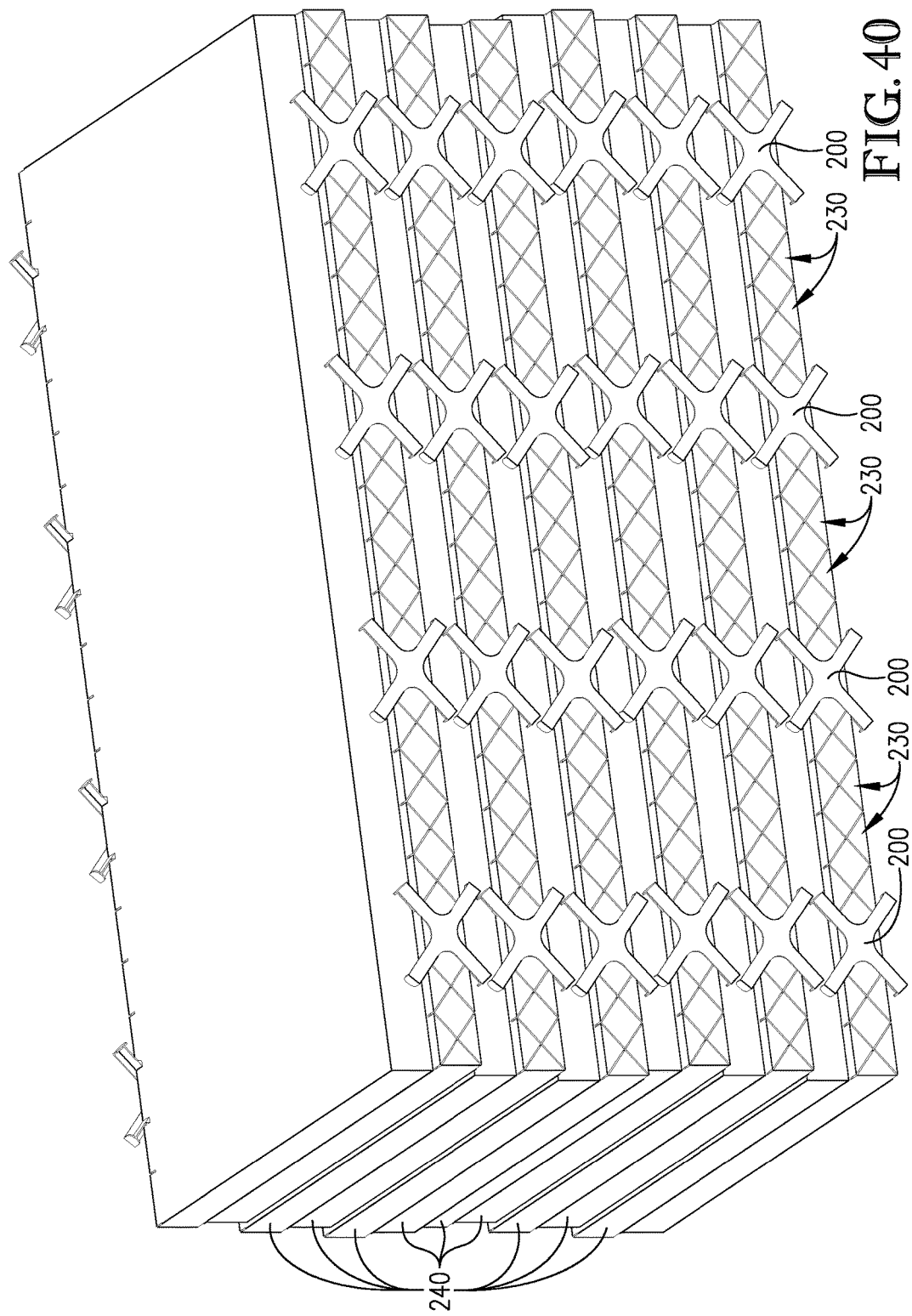
FIG. 40 is an illustration of a stack of insulation layers with tie systems pre-inserted on their side edges.

Alternatively, as illustrated in FIG. 40, the insulation layers 240 can be pre-inserted with tie systems 200 and stacked for storage, for shipping, and/or for future use. For instance, certain construction jobsites may require insulation layers 240 of particular sizes and/or may require tie systems 200 to be inserted within the insulation layers 240 at specific spacing intervals. As an illustrative example, an insulated concrete panel for use at a jobsite may require the use of three adjacent insulation layers 240, including a center insulation layer 240 opposed by two end insulation layers 240. The ends of the insulated concrete panel may require the use of four tie systems 200 to be inserted on the outer side edges of the two end insulation layers 240, while the center insulation layer 240 may only require use of two or three tie systems on its side edges (i.e., positioned between the central insulation layer 240 and each of the two end insulation layers 240). Beneficially, embodiments of the present invention provide for the specific arrangement of insulation layers 240 and tie systems 200 to be pre-made (i.e., tie systems 200 pre-inserted in the insulation layers 240) and shipped to the jobsite. In some embodiments, the insulation layers 240 and/or the tie systems 200 can be color coded to ensure the correct installation arrangement of the insulated concrete panel at the jobsite. In addition to increasing efficiency of jobsite construction, such pre-making of insulation layers and tie systems 200 ensure that the tie systems 200 are correctly installed/orientated in the insulation layers 240.

Figure 41:
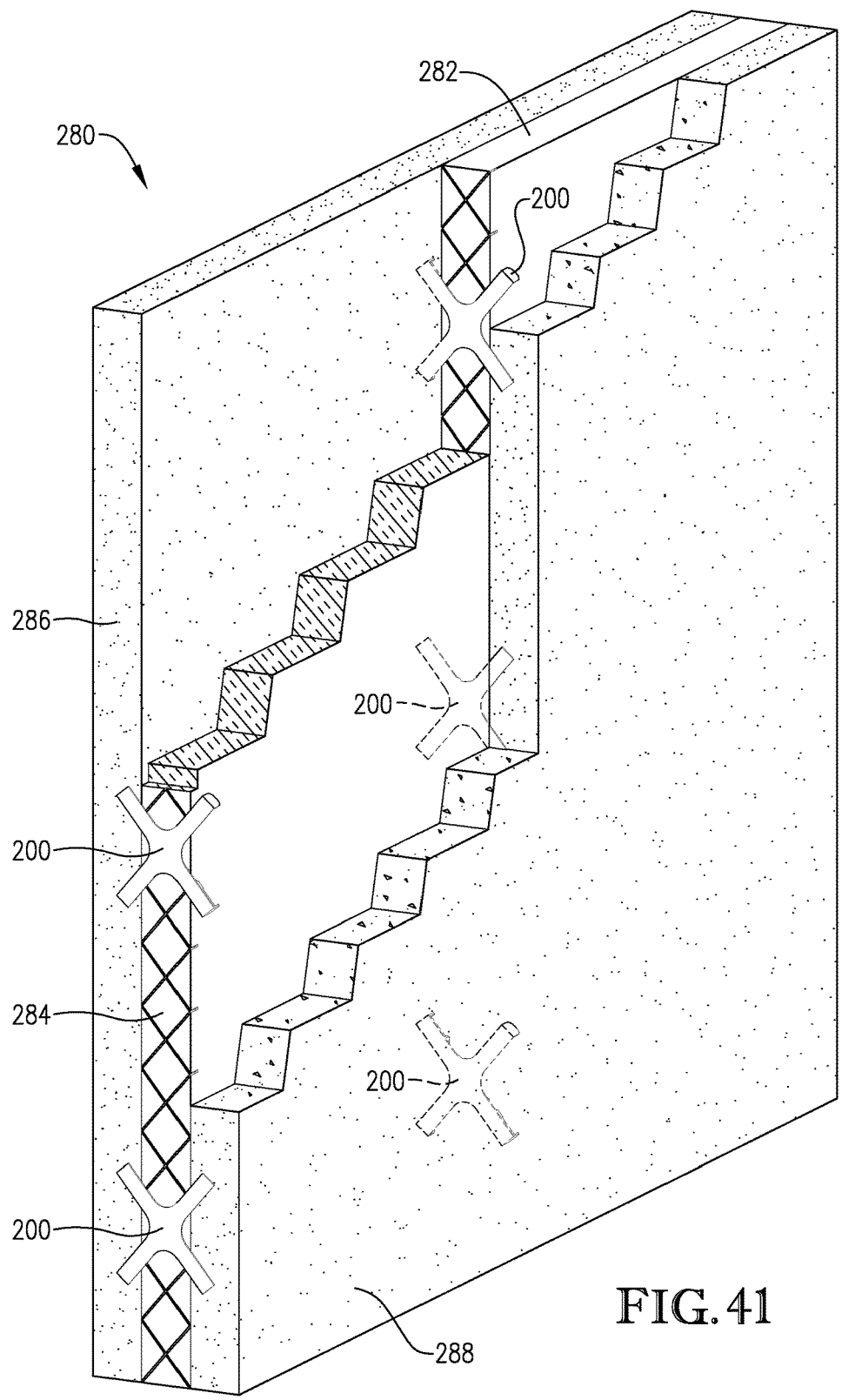
FIG. 41 is an illustration of an insulated concrete panel formed from two insulation layers, a top layer of concrete, a bottom layer of concrete, and a plurality of the tie systems from FIG. 29.

With reference to FIG. 41, to create an insulated concrete panel 280, a first insulation layer 282 can be formed with a set of one or more tie systems 200 integrated with its side edge, as was described above. For most insulated concrete panel 280, tie systems 200 will be located throughout the panel insulated concrete 280 approximately every 3 to 20 square feet, every 5 to 15 square feet, or every 8 to 10 square feet. In some cases of high loading the tie systems 200 will need to be positioned closer together. Typical insulated concrete panel 280 can include 10 to 100, 20 to 80, or 25 to 40 tie systems 200. The tie systems 200 can be aligned with the longitudinal or transverse direction or at any other angle as deemed necessary by the engineer. Next, a second insulation layer 284 may be positioned adjacent to the first insulation layer 282 and the tie systems 200 secured thereto (See FIG. 41). Because of the size and shape of the tie systems 200, the adjacent first and second insulation layers 282, 284 may have very small gaps therebetween. Specifically, such gaps will be generally equal to or less than a thickness of the top section 206 of the tie system 200. Next, a second set of one or more tie systems 200 may be inserted within an opposite side edge of the second insulation layer 284, in the same manner as described above, so as to create multiple adjacent insulation layers, with each adjacent insulation layer opposing a set of one or more tie systems 200. Multiple adjacent insulation layers can, thus, be arranged as such so as to form a wall of insulation layers (e.g., insulation layers 282, 284), with each insulation layer having sets of one or more tie systems therebetween. In such a configuration, the wall of insulation layers (e.g., insulation layers 282, 284) can be sandwiched between layers of concrete to form the insulated concrete panel 280, as described in more detail below. The insulation layers used in the insulated concrete panel 280 can be specifically formed in different sizes and shapes so as to conform the specific requirements of the insulated concrete panel 280 in which they will be used. In some embodiments, adjacent insulation layers may have different thicknesses, such that the insulated concrete panels can likewise be formed with different thicknesses and/or shapes, as may be required.

After the tie systems 200 has been inserted into the adjacent insulation layers (e.g., insulation layers 282, 284), the insulated concrete panel 280 can be made by forming concrete layers on opposite sides of the insulation layers 282, 284. In more detail, to form the insulated concrete panel 280, a bottom layer of concrete 286 is poured in a lower form. In some embodiments, the bottom layer of concrete 286 will undergo vibration so as to ensure proper settling of the concrete. Following pouring the bottom layer of concrete 286, the insulation layers 282, 284 with the tie systems 200 coupled thereto can be lowered into engagement with the bottom layer of concrete 286. The portions of the first and second structural members 202, 204 of the tie systems 200 that overhang the insulation layers 282, 284, including the ends and any associated flaps 216, become inserted into and embedded within the bottom layer of concrete 286. Furthermore, pressure may be exerted on the insulation layers 282, 284 (such as by walking on the insulation layers 282, 284) so that the bottom surface of the insulation layers 282, 284 will be inserted at least partially within a top surface of the bottom layer of concrete 286. Reinforcement in the form of rebar, steel mesh, or prestress strand may also be located in the bottom layer of concrete 286 so as to provide additional strength and support for the insulated concrete panel 280. Subsequent to placing the insulation layers 282, 284 and the tie systems 200 on/in the bottom layer of concrete 286, a top layer of concrete 288 can be poured on the opposite side of the insulation layers 282, 284. In some embodiments, the bottom layer of concrete 286 will need to cure for a period of time, such as 3 hours, before the top layer of concrete 288 can be poured. When the top layer of concreted 288 is poured, the portions of the first and second structural members 202, 204 of the tie systems 200 that overhang the insulation panels 282, 284, as well as the ends and any associated flaps 216, become embedded within the top layer of concrete 288.

Once the top and bottom layers of concrete 286, 288 have at least partially cured, the outside forms can be removed and the insulated concrete panel 280 is ready to be lifted and or shipped to the jobsite for installation. The X-shape of the tie systems 200 allow for the tie systems 200 to effectively transfer shear forces and restricting delamination forces between the first and second layers of concrete 286, 288 without deforming the insulation layers 282, 284. In some embodiments, the tie systems 200 will be configured to transfer bending moments between the concrete layers. In particular, the tie system 200 is configured to transfer at least 500 pounds, at least 1,000 pounds, at least 2,000 pounds, at least 5,000 pounds, at least 10,000 pounds, at least 15,000 pounds, or at least 20,000 pounds and/or between 500 to 20,000 pounds, between 1,000 and 15,000 pounds, or between 2,000 and 10,000 pounds of shear force between the layers of concrete. In addition, the tie system 200 is configured to resist at least 500 pounds, at least 1,000 pounds, at least 2,000 pounds, or at least 4,000 pounds and/or between 500 to 4,000 pounds or between 1,000 and 2,000 pounds of delamination force between the layers of concrete. In addition, the tie system 200 is configured to include a tensile strength of at least 10,000 psi, at least 20,000 psi, at least 30,000 psi, at least 40,000 psi, at least 50,000 psi, or at least 60,000 psi and/or between 10,000 and 60,000 psi, between 20,000 and 50,000 psi, or between 30,000 and 40,000 psi. Furthermore, the tie system 200 is configured to include a tensile modulus of at least 1 million psi, at least 2 million psi, at least 3 million psi, at least 5 million psi, at least 6 million psi, or at least 8 million psi and/or between 1 to 8 million psi, between 2 to 6 million psi, or between 3 and 5 million psi. Thus, the resulting insulated concrete panel 280 will comprise composite panel. The tie systems 200 will also act as tension members that will prevent the two layers of concrete 286, 288 from delamination during lifting and shipping. Further, as mentioned, the final insulated concrete panel can be reinforced with rebar, steel mesh, post tension cables, prestresss strand, or a combination of reinforcement as needed by the particular job requirements.

Given the above, embodiments of the present invention provide for the use of molded and/or formed 3-dimensional tie systems (i.e., wall ties), with cross-section in a C-shape, T-shape, I-shape, or L-shape, so as to construct insulated concrete panels in which the layers of the panels act in a composite or semi-composite fashion.

Having thus described various embodiments of the invention, what is claimed as new and desired to be protected by Letters Patent includes the following.

What is claimed is:

1. A method of making an insulated concrete panel, said method comprising:
    (a) creating a plurality of substantially cylindrical tie openings that each extend through an insulation layer from a first surface of said insulation layer to an opposite second surface of said insulation layer;
    (b) pouring a first layer of concrete;
    (c) placing said insulation layer on said first layer of concrete, such that said first surface of said insulation layer is in contact with said first layer of concrete;
    (d) inserting a wall tie into a plurality of said tie openings, with each of such wall ties comprising first and second end sections opposing a central section, wherein after said pouring of step (b) and said inserting of step (d), said first end section of each of said wall ties is at least partially embedded within said first layer of concrete; and
    (e) pouring a second layer of concrete over said second surface of said insulation layer, wherein after said pouring of step (e), said second end portion of said wall tie is at least partially embedded within said second layer of concrete.

2. The method of claim 1, wherein said openings are created using a core bit.

3. The method of claim 2, wherein said openings are created by powering said core bit with a hand drill.

4. The method of claim 1, wherein said central section has a rounded outer profile that fills up a substantial portion of said tie opening.

5. The method of claim 1, wherein said central section fills up at least 70 percent of the cross-sectional area of said tie opening.

6. The method of claim 1, wherein said central section fills up at least 90 percent of the cross-sectional area of said tie opening.

7. The method of claim 1, wherein said second end section has a maximum width that is larger than a maximum width of tie opening.

8. The method of claim 1, further comprising, after said inserting of step (d), shifting said tie system from a collapsed configuration, in which a maximum width of said first and second end sections is less than a maximum width of said tie opening, to an expanded configuration, in which said maximum width of said first and second end sections is greater than said maximum width of said tie opening.

9. The method of claim 8, wherein said central section of said wall tie is configured to transfer at least 2,000 pounds of shear force between said first and second concrete layers.

10. The method of claim 8, wherein said wall tie system comprises first and second structural members that cooperatively form said central section, said first end section, and said second end section, wherein said first and second structural members are rotatably coupled to one another in a scissor-like configuration.

11. The method of claim 10, wherein one of said first and second structural members comprises a hub projection and the other of said first and second structural members comprises a hub recess, wherein said hub projection is received in said hub recess and is configured to transfer shear forces between said first and second concrete layers.

12. The method of claim 10, wherein said central section of said wall tie is configured to transfer at least 500 pounds of shear force between said first and second concrete layers.

13. The method of claim 1, wherein said inserting step (d) is carried out after said placing step (c).

14. A method of making an insulated concrete panel, said method comprising:
    (a) forming one or more tie openings through an insulation layer, wherein the insulation layer includes a first surface and a second surface;
    (b) inserting a wall tie into each of said tie openings, with each of such wall ties comprising first and second end sections opposing a central section, wherein said second end section has a maximum width that is larger than a maximum width of said central section, and wherein said central section of said wall tie is configured to transfer both shear and moment stresses between said first and second end sections;
    (c) pouring a first layer of concrete;
    (d) placing said insulation layer on said first layer of concrete, such that said first surface of said insulation layer is in contact with said first layer of concrete;

wherein during said placing of step (d), said first end section of said wall tie is at least partially embedded within said first layer of concrete; and (e) pouring a second layer of concrete over said second surface of said insulation layer, wherein during said pouring of step (e), said second end portion of said wall tie is at least partially embedded within said second layer of concrete.

15. The method of claim 14, subsequent to said inserting of step (b), shifting said wall tie from a collapsed configuration to an expanded configuration, wherein said shifting causes said wall tie to shift into engagement with opposite sides of said insulation layer, thereby securing said tie system to said insulation layer.

16. The method of claim 14, wherein said inserting of step (b) is carried out prior to said pouring of step (c) and said placing of step (d).

17. The method of claim 14, wherein said tie openings are substantially cylindrical.

18. A method of making an insulated concrete panel, said method comprising:
   (a) creating a tie opening that extends through an insulation layer;
   (b) inserting an expandable tie system into said tie opening;
   (c) while said tie system is received in said tie opening with opposite end sections of said tie system extending out of said tie opening, shifting said tie system into an expanded configuration where the maximum width of said tie system is greater than the maximum width of said tie opening; and
   (d) while said tie system is in said expanded configuration, forming a layer of concrete on each side of said insulation layer so that the opposite end sections of said tie system are respectively embedded in opposite layers of concrete, thereby physically coupling the opposite layers of concrete to one another using said tie system;
   wherein said forming of step (d) includes (i) pouring a bottom layer of concrete, (ii) placing said insulation layer on said bottom layer of concrete, and (iii) pouring a top layer of concrete on said insulation layer.

19. The method of claim 18, wherein said shifting of step (c) causes said tie system to shift into engagement with opposite sides of said insulation layer, thereby securing said tie system to said insulation layer.

20. The method of claim 18, wherein said tie opening is substantially cylindrical.

21. The method of claim 18, wherein said inserting of step (b) is carried out prior to said forming of step (d).

* * * * *